United States Patent
Watanabe et al.

(10) Patent No.: US 12,403,711 B2
(45) Date of Patent: Sep. 2, 2025

(54) LAMINATE, CARD, AND HOUSING

(71) Applicant: Sony Group Corporation, Tokyo (JP)

(72) Inventors: Maho Watanabe, Tokyo (JP); Hirohisa Amago, Tokyo (JP); Yuriko Kaino, Tokyo (JP); Kenji Takagi, Tokyo (JP); Ryota Yamano, Tokyo (JP); Hiroshi Mizuno, Tokyo (JP); Aya Tejima, Tokyo (JP)

(73) Assignee: Sony Group Corporation, Tokyo (JP)

( * ) Notice: Subject to any disclaimer, the term of this patent is extended or adjusted under 35 U.S.C. 154(b) by 49 days.

(21) Appl. No.: 18/268,882

(22) PCT Filed: Dec. 22, 2021

(86) PCT No.: PCT/JP2021/047702
§ 371 (c)(1),
(2) Date: Jun. 21, 2023

(87) PCT Pub. No.: WO2022/138766
PCT Pub. Date: Jun. 30, 2022

(65) Prior Publication Data
US 2024/0042784 A1    Feb. 8, 2024

(30) Foreign Application Priority Data

Dec. 22, 2020 (JP) .................. 2020-212981

(51) Int. Cl.
*B41M 5/42* (2006.01)
*B41M 5/323* (2006.01)
(Continued)

(52) U.S. Cl.
CPC ............. *B41M 5/42* (2013.01); *B41M 5/323* (2013.01); *B41M 5/41* (2013.01); *B41M 5/46* (2013.01);
(Continued)

(58) Field of Classification Search
CPC .. B41M 5/323; B41M 5/3275; B41M 5/3335; B41M 5/34; B41M 5/41; B41M 5/42;
(Continued)

(56) References Cited

U.S. PATENT DOCUMENTS

| | | |
|---|---|---|
| 5,534,372 A | 7/1996 | Koshizuka et al. |
| 2021/0316563 A1 | 10/2021 | Shuto et al. |

FOREIGN PATENT DOCUMENTS

| | | |
|---|---|---|
| CN | 1663814 A | 9/2005 |
| CN | 101468564 A | 7/2009 |

(Continued)

OTHER PUBLICATIONS

International Search Report from corresponding PCT application PCT/JP2021/047702, dated Mar. 8, 2022.

*Primary Examiner* — Gerard Higgins
(74) *Attorney, Agent, or Firm* — K&L Gates LLP

(57) ABSTRACT

The laminate includes: a base material; an intermediate layer provided on the base material and having an accommodation part; a recording medium provided in the accommodation part; and an overlay layer provided on the intermediate layer. The accommodation part is provided in a part of a plane of the intermediate layer, and the accommodation part is a through hole penetrating in the thickness direction of the intermediate layer or a recess recessed in the thickness direction of the intermediate layer. The recording medium includes a color development layer containing: a coloring compound having an electron donating property; a developer having an electron accepting property; and a matrix resin. The base material, the intermediate layer, and the overlay layer contain the same type of resin material. The base material and the intermediate layer are bonded to each other by fusion, and the intermediate layer and the overlay layer are bonded to each other by fusion.

16 Claims, 21 Drawing Sheets

(51) Int. Cl.
  *B41M 5/41* (2006.01)
  *B41M 5/44* (2006.01)
  *B41M 5/46* (2006.01)
  *B42D 25/41* (2014.01)
  *B41M 5/327* (2006.01)
  *B41M 5/333* (2006.01)
  *B41M 5/34* (2006.01)
  *B42D 25/23* (2014.01)

(52) U.S. Cl.
  CPC ........... *B42D 25/41* (2014.10); *B41M 5/3275* (2013.01); *B41M 5/3335* (2013.01); *B41M 5/34* (2013.01); *B41M 5/44* (2013.01); *B41M 2205/04* (2013.01); *B41M 2205/38* (2013.01); *B41M 2205/42* (2013.01); *B42D 25/23* (2014.10)

(58) Field of Classification Search
  CPC ...... B41M 5/44; B41M 5/46; B41M 2205/04; B41M 2205/38; B41M 2205/42; B42D 25/23; B42D 25/41
  See application file for complete search history.

(56) References Cited

FOREIGN PATENT DOCUMENTS

| | | |
|---|---|---|
| CN | 101529451 A | 9/2009 |
| CN | 102481754 A | 5/2012 |
| CN | 103065546 A | 4/2013 |
| CN | 109689394 A | 4/2019 |
| CN | 111051076 A | 4/2020 |
| EP | 1491354 A1 | 12/2004 |
| EP | 1669208 A1 | 6/2006 |
| EP | 3674099 A1 | 7/2020 |
| JP | 2003118233 A * | 4/2003 |

\* cited by examiner

A

B

LAMINATE, CARD, AND HOUSING

TECHNICAL FIELD

The present disclosure relates to a laminate, a card, and a housing.

BACKGROUND ART

In recent years, studies have been made on cards such as a security card, a financial settlement card (for example, a credit cart, a cash card, and the like), an identification (ID) card (for example, an employee ID card, a membership card, a student ID card, and the like), and a personal transaction card (for example, a prepaid card, a point card, and the like), the cards including a recording medium configured to be capable of changing the colored state thereof by an external stimulus in order to prevent forgery. For example, Patent Document 1 discloses a forgery preventing structure in which a security device and a transparent protective sheet are sequentially disposed on a color development layer having a laser color development part.

CITATION LIST

Patent Document

Patent Document 1: Japanese Patent Application Laid-Open No. 2019-38141

SUMMARY OF THE INVENTION

Problems to be Solved by the Invention

In recent years, while improvement in convenience due to the spread of the various cards described above is expected, the forgery of the card has been a major problem. Furthermore, distribution of forged products of medical supplies, automobile parts, toys, foods, cosmetics, and electronic devices, and the like has also been a problem. Distribution of these forged products not only lowers the brand and image of companies, but also may affect the health and safety of users. Therefore, it is strongly desired to improve the forgery preventing property of cards and products.

An object of the present disclosure is to provide a laminate, a card, and a housing that can improve the forgery preventing property.

Solutions to Problems

In order to solve the above-described problem, a laminate according to the present disclosure includes:

a base material;
an intermediate layer provided on the base material and having an accommodation part;
a recording medium provided in the accommodation part; and
an overlay layer provided on the intermediate layer, in which
the accommodation part is provided in a part of a plane of the intermediate layer,
the accommodation part is a through hole penetrating in a thickness direction of the intermediate layer or a recess recessed in a thickness direction of the intermediate layer,
the recording medium includes a color development layer containing: a coloring compound having an electron donating property; a developer having an electron accepting property; and a matrix resin,
the base material, the intermediate layer, and the overlay layer contain the same type of resin material, and
the base material and the intermediate layer are bonded to each other by fusion, and the intermediate layer and the overlay layer are bonded to each other by fusion.

A laminate according to the present disclosure includes:
a base material;
an intermediate layer provided on the base material and having an accommodation part;
a recording medium provided in the accommodation part; and
an overlay layer provided on the intermediate layer, in which
the accommodation part is provided in a part of a plane of the intermediate layer,
the accommodation part is a through hole penetrating in a thickness direction of the intermediate layer or a recess recessed in a thickness direction of the intermediate layer,
the recording medium includes a color development layer containing: a coloring compound having an electron donating property; a developer having an electron accepting property; and a matrix resin,
the base material, the intermediate layer, and the overlay layer contain the same type of resin material, and
the base material and the intermediate layer are bonded to each other by a thermal adhesive, and the intermediate layer and the overlay layer are bonded to each other by a thermal adhesive.

MODE FOR CARRYING OUT THE INVENTION

Figure 1:
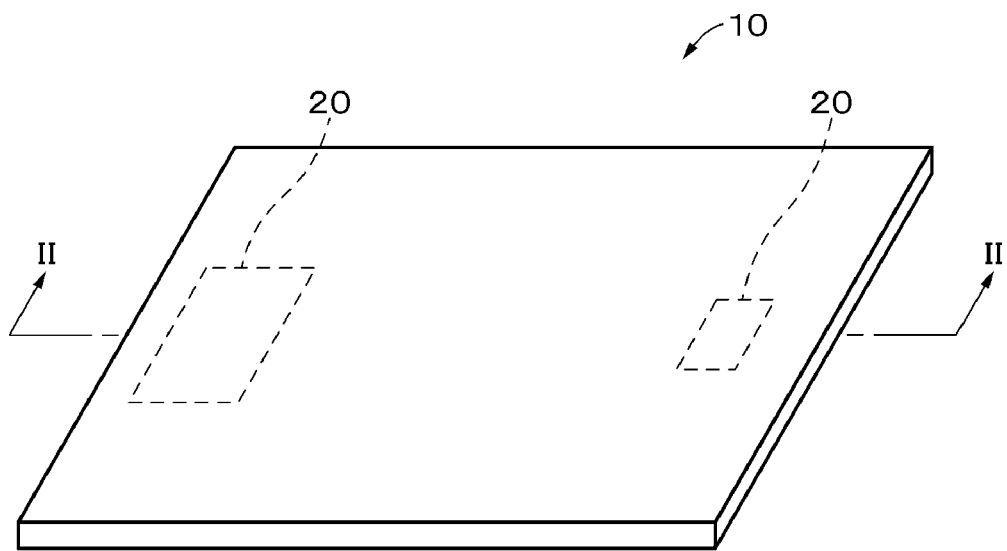
FIG. 1 is a perspective view of a laminate according to a first embodiment of the present disclosure.

Embodiments of the present disclosure will be described in the following order. Note that, in all the drawings of the following embodiments, the same or corresponding portions are denoted by the same reference numerals.
1 First Embodiment (example of laminate)
1.1 Configuration of laminate
1.2 Method for producing laminate
1.3 Recording method of laminate
1.4 Action and effect
2 Second Embodiment (example of laminate)
2.1 Configuration of laminate
2.2 Method for producing laminate
2.3 Action and effect
3 Third Embodiment (example of laminate)
3.1 Configuration of laminate
3.2 Action and effect
4 Fourth Embodiment (example of laminate)
4.1 Configuration of laminate
4.2 Action and effect
5 Modification examples
6 Reference examples and examples

1 First Embodiment

1.1 Configuration of Laminate

Figure 2:
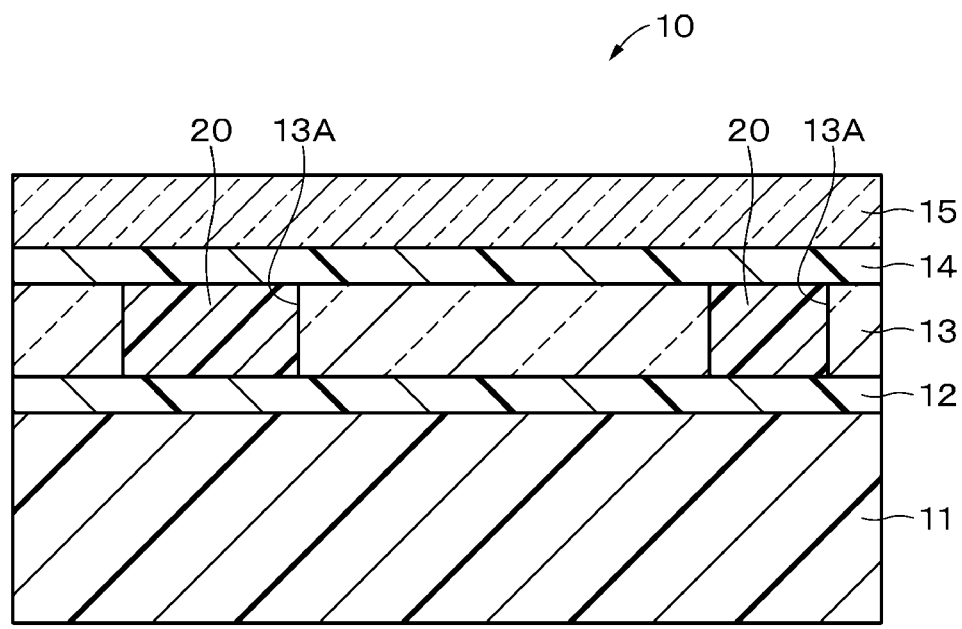
FIG. 2 is a cross-sectional view taken along line II-II of FIG. 1.

FIG. 1 is a perspective view of a laminate 10 according to a first embodiment of the present disclosure. FIG. 2 is a cross-sectional view taken along line II-II of FIG. 1. The laminate 10 includes a base material 11, an adhesive layer 12, an intermediate layer 13, an adhesive layer 14, an overlay layer 15, and a recording medium 20. The laminate 10 may be a card (hereinafter, referred to as "security card or the like"), such as a security card, a financial settlement card (for example, a credit cart, a cash card, and the like), an ID card (for example, an employee ID card, a membership card, a student ID card, and the like), or a personal transaction card (for example, a prepaid card, a point card, and the like).
(Base Material)
The base material 11 is a support that supports the recording medium 20 and the intermediate layer 13. The base material 11 may be a card. The base material 11 may have a color such as white. In the base material 11, a pattern, a picture, a photograph, a character, a combination of two or more thereof, or the like (hereinafter, referred to as "pattern or the like") may be printed on one main surface of the base material 11 on a side on which the intermediate layer 13, the recording medium 20, and the like are provided.
The base material 11 contains, for example, plastic. The base material 11 may contain at least one selected from the group consisting of a colorant, an antistatic agent, a flame retardant, a surface modifier, and the like, as necessary.

The plastic includes, for example, at least one selected from the group consisting of an ester-based resin, an amide-based resin, an olefin-based resin, a vinyl-based resin, an acrylic resin, an imide-based resin, a styrene-based resin, engineering plastic, and the like. In a case where the base material 11 contains two or more resins, the two or more resins may be mixed, copolymerized, or laminated.

The ester-based resin includes, for example, at least one selected from the group consisting of polyethylene terephthalate (PET), polybutylene terephthalate (PBT), polyethylene naphthalate (PEN), a polyethylene terephthalate-isophthalate copolymer, a terephthalic acid-cyclohexanedimethanol-ethylene glycol copolymer, and the like. The amide-based resin includes, for example, at least one selected from the group consisting of nylon 6, nylon 66, nylon 610, and the like. The olefin-based resin includes, for example, at least one selected from the group consisting of polyethylene (PE), polypropylene (PP), polymethylpentene (PMP), and the like. The vinyl-based resin includes, for example, polyvinyl chloride (PVC).

The acrylic resin includes, for example, at least one selected from the group consisting of polyacrylate, polymethacrylate, polymethyl methacrylate (PMMA), and the like. The imide-based resin includes, for example, at least one selected from the group consisting of polyimide (PI), polyamideimide (PAI), polyetherimide (PEI), and the like. The styrene-based resin includes, for example, at least one selected from the group consisting of polycarbonate (PC), polystyrene (PS), high-impact polystyrene, an acrylonitrile-styrene resin (AS resin), an acrylonitrile-butadiene-styrene resin (ABS resin), and the like. The engineering plastic includes, for example, at least one selected from the group consisting of polycarbonate (PC), polyarylate (PAR), polysulfone (PSF), polyethersulfone (PES), polyphenylene ether (PPE), polyphenylene sulfide (PPS), polyether ketone (PEK), polyether-ether ketone (PEEK), polyphenylene oxide (PPO), polyether sulfite, and the like.
(Intermediate Layer)
The intermediate layer 13 is provided on one main surface of the base material 11, and the adhesive layer 12 is sandwiched between the base material 11 and the intermediate layer 13. The intermediate layer 13 includes an accommodation part 13A for accommodating the recording medium 20. The accommodation part 13A is provided in a part of the plane of the intermediate layer 13. The accommodation part 13A may be a through hole penetrating in the thickness direction of the intermediate layer 13. The intermediate layer 13 is a layer for suppressing steps formed by the recording medium 20 when the recording medium 20 is sandwiched between the base material 11 and the overlay layer 15. The intermediate layer 13 has substantially the same thickness as the recording medium 20, and covers an area other than the area provided with the recording medium 20 in one main surface of the base material 11.

The intermediate layer 13 has a film shape. The intermediate layer 13 may have transparency. The intermediate layer 13 contains plastic. As the plastic, materials similar to those of the base material 11 can be exemplified.
(Overlay Layer)
The overlay layer 15 is provided above the intermediate layer 13 and the recording medium 20, and covers the intermediate layer 13 and the recording medium 20. The adhesive layer 14 is sandwiched between the intermediate layer 13 and the recording medium 20, and the overlay layer 15. The overlay layer 15 protects the members (that is, the recording medium 20 and the intermediate layer 13) inside the laminate 10 and maintains the mechanical reliability of the laminate 10.

The overlay layer 15 has a film shape. The overlay layer 15 has transparency. The overlay layer 15 contains plastic. As the plastic, materials similar to those of the base material 11 can be exemplified. A pattern or the like may be printed on at least one main surface of the overlay layer 15.

(Adhesive Layer)

The adhesive layer 12 is provided between the base material 11 and the intermediate layer 13 accommodating the recording medium 20, and bonds the base material 11 and the intermediate layer 13 accommodating the recording medium 20 to each other. The adhesive layer 14 is provided between the intermediate layer 13 accommodating the recording medium 20 and the overlay layer 15, and bonds the intermediate layer 13 accommodating the recording medium 20 and the overlay layer 15 to each other. The adhesive layers 12 and 14 have transparency. The adhesive layers 12 and 14 contain a thermal adhesive. The thermal adhesive contains a thermosetting resin. The thermosetting resin includes, for example, at least one selected from the group consisting of an epoxy-based resin, a urethane-based resin, and the like. The curing temperature of the thermal adhesive is preferably in a temperature range of 100° C. or higher and 120° C. or lower from the viewpoint of reducing damage to the recording medium 20.

(Recording Medium)

Figure 3:
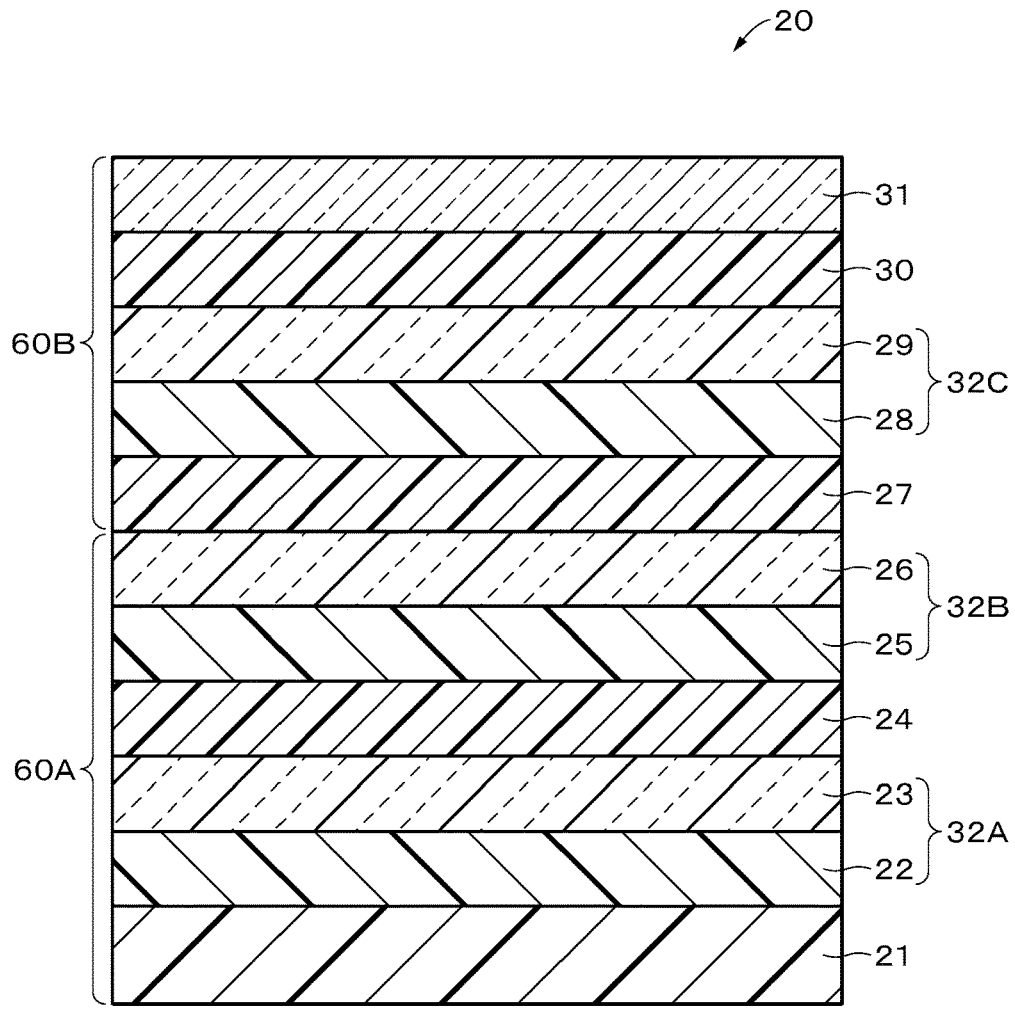
FIG. 3 is a cross-sectional view of a recording medium.

FIG. 3 is a cross-sectional view of the recording medium 20. The recording medium 20 is configured to be capable of changing the colored state thereof by an external stimulus. By this change in the colored state, for example, a pattern or the like can be recorded on the recording medium 20. The external stimulus is laser light. The change in the colored state is preferably an irreversible change from the viewpoint of improving the forgery preventing property. That is, the system of the recording medium 20 is preferably a write once system in which a pattern or the like can be written only once. It is preferable that the recording medium 20 be fitted in the accommodation part 13A of the intermediate layer 13, and the recording medium 20 and the intermediate layer 13 be integrated. As a result, it is possible to make it difficult to visually recognize the boundary between the recording medium 20 and the intermediate layer 13 in the in-plane direction of the laminate 10. Therefore, the forgery preventing property can be improved.

Figure 10:
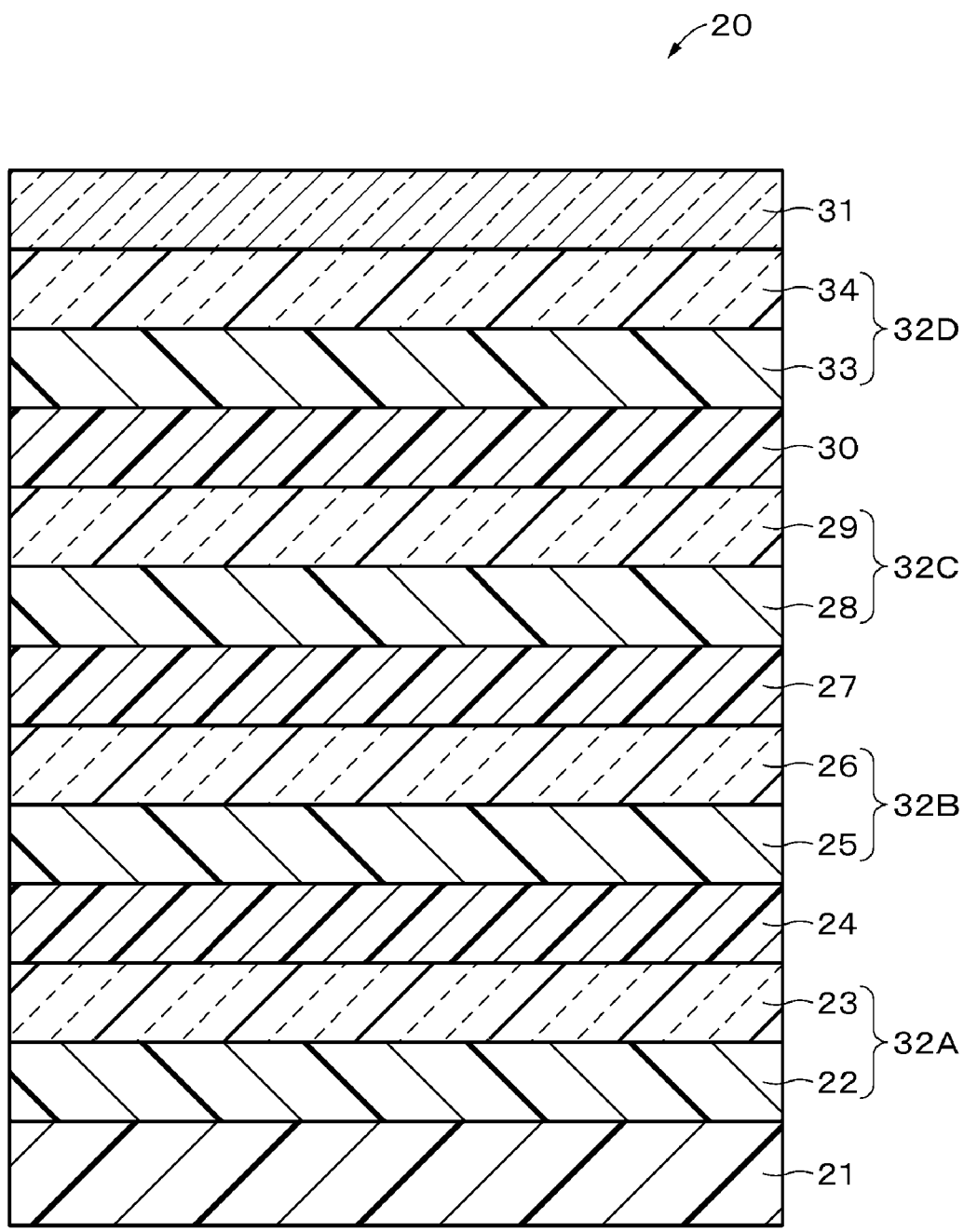
FIG. 10 is a cross-sectional view of a recording medium.

The recording medium 20 includes a base material 21, an intermediate layer 32A, a color development layer 24, an intermediate layer 32B, a color development layer 27, an intermediate layer 32C, and a color development layer 30 in this order. More specifically, the recording medium 20 includes the base material 21, a pressure-sensitive adhesive layer 22, a heat insulating layer 23, the color development layer 24, a pressure-sensitive adhesive layer 25, a heat insulating layer 26, the color development layer 27, a pressure-sensitive adhesive layer 28, a heat insulating layer 29, and the color development layer 30 in this order. As illustrated in FIG. 3, the recording medium 20 may further include a protective layer 31 on the color development layer 30. As illustrated in FIG. 10, the recording medium 20 may further include an intermediate layer 32D between the color development layer 30 and the protective layer 31. The heat insulating layers 23, 26, and 29 are provided as necessary, and thus are not necessarily provided.

(Base Material)

The base material 21 is a support for supporting the color development layers 24, 27, 30, and the like. The base material 21 preferably contains a material having excellent heat resistance and excellent dimensional stability in the planar direction. The base material 21 may have either a light transmitting property or a non-light transmitting property. The base material 21 may be, for example, a rigid substrate such as a wafer, or may be a flexible thin glass, film, paper, or the like. By using a flexible substrate as the base material 21, a flexible (bendable) recording medium can be realized.

Examples of the constituent material of the base material 21 include inorganic materials, metal materials, plastics, and the like. The inorganic material includes, for example, at least one selected from the group consisting of silicon (Si), silicon oxide ($SiO_x$), silicon nitride ($SiN_x$), aluminum oxide ($AlO_x$), and the like. Silicon oxide includes glass, spin-on-glass (SOG), and the like. The metal material includes, for example, at least one selected from the group consisting of aluminum (Al), nickel (Ni), stainless steel, and the like. As the plastic, materials similar to those of the base material 11 can be exemplified.

Note that a reflective layer (not illustrated) may be provided on at least one main surface of the base material 21, or the base material 21 itself may have a function as a reflective layer. The base material 21 having such a configuration enables clearer color display.

(Intermediate Layer)

The intermediate layer 32A is provided between the base material 21 and the color development layer 24. The intermediate layer 32A can bond the base material 21 and the color development layer 24. The intermediate layer 32A may be able to heat-insulate the base material 21 and the color development layer 24, and suppress diffusion of the constituent material between the base material 21 and the color development layer 24. The intermediate layer 32A includes the pressure-sensitive adhesive layer 22 and the heat insulating layer 23. The pressure-sensitive adhesive layer 22 is adjacent to the base material 21, and the heat insulating layer 23 is adjacent to the color development layer 24. However, the intermediate layer 32A may include only the pressure-sensitive adhesive layer 22.

The intermediate layer 32B is provided between the color development layer 24 and the color development layer 27. The intermediate layer 32B can bond the color development layer 24 and the color development layer 27. The intermediate layer 32B may be able to heat-insulate the color development layer 24 and the color development layer 27, and suppress diffusion of the constituent material between the color development layer 24 and the color development layer 27. The intermediate layer 32B includes the pressure-sensitive adhesive layer 25 and the heat insulating layer 26. However, the intermediate layer 32B may include only the pressure-sensitive adhesive layer 25.

The intermediate layer 32C is provided between the color development layer 27 and the color development layer 30. The intermediate layer 32C can bond the color development layer 27 and the color development layer 30. The intermediate layer 32C may be able to heat-insulate the color development layer 27 and the color development layer 30, and suppress diffusion of the constituent material between the color development layer 27 and the color development layer 30. The intermediate layer 32C includes the pressure-sensitive adhesive layer 28 and the heat insulating layer 29. However, the intermediate layer 32C may include only the pressure-sensitive adhesive layer 28.

The intermediate layer 32D is provided between the color development layer 30 and the protective layer 31. The intermediate layer 32D can bond the color development layer 30 and the protective layer 31. The intermediate layer 32D may be able to heat-insulate the color development layer 30 and the protective layer 31, and suppress diffusion of the constituent material between the color development layer 30 and the protective layer 31. The intermediate layer 32D includes a pressure-sensitive adhesive layer 33 and a heat insulating layer 34. However, the intermediate layer 32D may include only the pressure-sensitive adhesive layer 33.

(Color Development Layer)

The color development layers 24, 27, and 30 are configured to be capable of changing the colored state thereof by an external stimulus such as laser light or heat. The color development layers 24, 27, and 30 are formed using a material that enables stable recording and controlling of the color development state. The color development layers 24, 27, and 30 contain a coloring compound having an electron donating property, a developer having an electron accepting property and corresponding to the coloring compound, a matrix polymer (binder), and a photothermal conversion material. The color development layers 24, 27, and 30 may contain, as necessary, for example, at least one additive selected from the group consisting of a sensitizer, an ultraviolet absorbing material, and the like in addition to the above-described materials.

The color development layers 24, 27, and 30 contain coloring compounds developing colors of different hues from one another. That is, the coloring compounds contained in the color development layers 24, 27, and 30 exhibit different colors in the color development state. The coloring compound contained in the color development layer 24 exhibits, for example, a cyan color in the color development state. The coloring compound contained in the color development layer 27 exhibits, for example, a magenta color in the color development state. The coloring compound contained in the color development layer 30 exhibits, for example, a yellow color in the color development state. The photothermal conversion materials contained in the color development layers 24, 27, and 30 absorb laser light in different wavelength ranges (for example, near-infrared laser light different from each other) and generate heat.

The thickness of each of the color development layers 24, 27, and 30 is preferably 1 μm or more and 20 μm or less, and more preferably 2 μm or more and 15 μm or less. When the thickness of each of the color development layers 24, 27, and 30 is 1 μm or more, a sufficient color development density can be obtained. On the other hand, when the thickness of each of the color development layers 24, 27, and 30 is 20 μm or less, it is possible to suppress the heat utilization amount of each of the color development layers 24, 27, and 30 from becoming too large. Therefore, deterioration of color developability can be suppressed.

(Coloring Compound)

The coloring compound is, for example, leuco dye. The leuco dye may be, for example, an existing dye for heat-sensitive paper. Specific examples thereof include a compound including a group having an electron donating property in the molecule, represented by the following Formula (1).

[Chemical Formula 1]

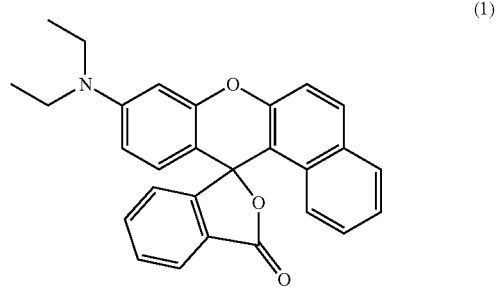

(1)

The coloring compound is not particularly limited, and can be selected as appropriate according to the purpose. Specific examples of the coloring compound include, in addition to the compound represented by Formula (1) described above, a fluoran-based compound, a triphenylmethane phthalide-based compound, an azaphthalide-based compound, a phenothiazine-based compound, a leucoauramine-based compound, an indolinophthalide-based compound, and the like. Other examples thereof include 2-anilino-3-methyl-6-diethylaminofluoran, 2-anilino-3-methyl-6-di(n-butylamino)fluoran, 2-anilino-3-methyl-6-(N-n-propyl-N-methylamino)fluoran, 2-anilino-3 methyl-6-(N-isopropyl-N-methylamino)fluoran, 2-anilino-3-methyl-6-(N-isobutyl-N-methylamino)fluoran, 2-anilino-3-methyl-6-(N-n-amyl-N-methylamino)fluoran, 2-anilino-3-methyl-6-(N-sec-butyl-N-methylamino)fluoran, 2-anilino-3-methyl-6-(N-n-amyl-N-ethylamino)fluoran, 2-anilino-3-methyl-6-(N-iso-amyl-N-ethylamino)fluoran, 2-anilino-3-methyl-6-(N-n-propyl-N-isopropylamino) fluoran, 2-anilino-3-methyl-6-(N-cyclohexyl-N-methylamino)fluoran, 2-anilino-3-methyl-6-(N-ethyl-p-toluidino) fluoran, 2-anilino-3-methyl-6-(N-methyl-p-toluidino)fluoran, 2-(m-trichloromethylanilino)-3-methyl-6-diethylaminofluoran, 2-(m-trifluromethylanilino)-3-methyl-6-diethylaminofluoran, 2-(m-trichloromethylanilino)-3-methyl-6-(N-cyclohexyl-N-methylamino)fluoran, 2-(2,4-dimethylanilino)-3-methyl-6-diethylaminofluoran, 2-(N-ethyl-p-toluidino)-3-methyl-6-(N-ethylanilino)fluoran, 2-(N-ethyl-p-toluidino)-3-methyl-6-(N-propyl-p-toluidino)fluoran, 2-anilino-6-(N-n-hexyl-N-ethylamino)fluoran, 2-(o-chloroanilino)-6-diethylaminofluoran, 2-(o-chloroanilino)-6-dibutylaminofluoran, 2-(m-trifluoromethylanilino)-6-diethylaminofluoran, 2,3-dimethyl-6-dimethylaminofluoran, 3-methyl-6-(N-ethyl-p-toluidino)fluoran, 2-chloro-6-diethylaminofluoran, 2-bromo-6-diethylaminofluoran, 2-chloro-6-dipropylaminofluoran, 3-chloro-6-cyclohexylaminofluoran, 3-bromo-6-cyclohexylaminofluoran, 2-chloro-6-(N-ethyl-N-isoamylamino)fluoran, 2-chloro-3-methyl-6-diethylaminofluoran, 2-anilino-3-chloro-6-diethylaminofluoran, 2-(o-chloroanilino)-3-chloro-6-cyclohexylaminofluoran, 2-(m-trifluoromethylanilino)-3-chloro-6-diethylaminofluoran, 2-(2,3-dichloroanilino)-3-chloro-6-diethylaminofluoran, 1,2-benzo-6-diethylaminofluoran, 3-diethylamino-6-(m-trifluoromethylanilino)fluoran, 3-(1-ethyl-2-methylindol-3-yl)-3-(2-ethoxy-4-diethylaminophenyl)-4-azaphthalide, 3-(1-ethyl-2-methylindol-3-yl)-3-(2-ethoxy-4-diethylaminophenyl)-7-azaphthalide, 3-(1-octyl-2-methylindol-3-yl)-3-(2-ethoxy-4-diethylaminophenyl)-4-azaphthalide, 3-(1-ethyl-2-methylindol-3-yl)-3-(2-methyl-4-diethylaminophenyl)-4-azaphthalide, 3-(1-ethyl-2- methylindol-3-yl)-3-(2-methyl-4-diethylaminophenyl)-7-azaphthalide, 3-(1-ethyl-2-methylindol-3-yl)-3-(4-diethylaminophenyl)-4-azaphthalide, 3-(1-ethyl-2-methylindol-3-yl)-3-(4-N-n-amyl-N-methylaminophenyl)-4-azaphthalide, 3-(1-methyl-2-methylindol-3-yl)-3-(2-hexyloxy-4-diethylaminophenyl)-4-azaphthalide, 3,3-bis(2-ethoxy-4-diethylaminophenyl)-4-azaphthalide, 3,3-bis(2-ethoxy-4-diethylaminophenyl)-7-azaphthalide, 2-(p-acetylanilino)-6-(N-n-amyl-N-n-butylamino)fluoran, 2-benzylamino-6-(N-ethyl-p-toluidino)fluoran, 2-benzylamino-6-(N-methyl-2,4-dimethylanilino)fluoran, 2-benzylamino-6-(N-ethyl-2,4-dimethylanilino)fluoran, 2-benzylamino-6-(N-methyl-p-toluidino)fluoran, 2-benzylamino-6-(N-ethyl-p-toluidino)fluoran, 2-(di-p-methylbenzylamino)-6-(N-ethyl-p-toluidino)fluoran, 2-(α-phenylethylamino)-6-(N-ethyl-p-toluidino)fluoran, 2-methylamino-6-(N-methylanilino)fluoran, 2-methylamino-6-(N-ethylanilino)fluoran, 2-methylamino-6-(N-propylanilino)fluoran, 2-ethylamino-6-(N-methyl-p-toluidino)fluoran, 2-methylamino-6-(N-methyl-2,4-dimethylanilino)fluoran, 2-ethylamino-6-(N-ethyl-2,4-dimethylanilino)fluoran, 2-dimethylamino-6-(N-methylanilino)fluoran, 2-dimethylamino-6-(N-ethylanilino)fluoran, 2-diethylamino-6-(N-methyl-p-toluidino)fluoran, 2-diethylamino-6-(N-ethyl-p-toluidino)fluoran, 2-dipropylamino-6-(N-methylanilino)fluoran, 2-dipropylamino-6-(N-ethylanilino)fluoran, 2-amino-6-(N-methylanilino)fluoran, 2-amino-6-(N-ethylanilino)fluoran, 2-amino-6-(N-propylanilino)fluoran, 2-amino-6-(N-methyl-p-toluidino)fluoran, 2-amino-6-(N-ethyl-p-toluidino)fluoran, 2-amino-6-(N-propyl-p-toluidino)fluoran, 2-amino-6-(N-methyl-p-ethylanilino)fluoran, 2-amino-6-(N-ethyl-p-ethylanilino)fluoran, 2-amino-6-(N-propyl-p-ethylanilino)fluoran, 2-amino-6-(N-methyl-2,4-dimethylanilino)fluoran, 2-amino-6-(N-ethyl-2,4-dimethylanilino)fluoran, 2-amino-6-(N-propyl-2,4-dimethylanilino)fluoran, 2-amino-6-(N-methyl-p-chloroanilino)fluoran, 2-amino-6-(N-ethyl-p-chloroanilino)fluoran, 2-amino-6-(N-propyl-p-chloroanilino)fluoran, 1,2-benzo-6-(N-ethyl-N-isoamylamino)fluoran, 1,2-benzo-6-dibutylaminofluoran, 1,2-benzo-6-(N-methyl-N-cyclohexylamino)fluoran, 1,2-benzo-6-(N-ethyl-N-toluidino)fluoran, and the like. Each of the color development layers 24, 27, and 30 may contain one of the above-described coloring compounds alone or two or more thereof.

(Developer)

The developer is, for example, for causing a colorless coloring compound to develop color. The developer may have a particulate shape. Examples of the developer include at least one selected from the group consisting of a phenol derivative, a salicylic acid derivative, a urea derivative, and the like. Specific examples thereof include a hydroxybenzoic acid type compound including an electron-accepting group in the molecule, represented by the following Formula (2). The hydroxybenzoic acid type compound may be a bis(hydroxybenzoic acid) type compound.

[Chemical Formula 2]

(2)

(where X is any one of —NHCO—, —CONH—, —NHCONH—, —CONHCO—, —NHNHCO—, —CONHNH—, —CONHNHCO—, —NHCOCONH—, —NHCONHCO—, —CONHCONH—, —NHNHCONH—, —NHCONHNH—, —CONHNHCONH—, —NHCONHNHCO—, and —CONHNHCONH—, and R is a linear hydrocarbon group having from 25 to 34 carbon atoms.)

The bonding positions of the hydroxy group (—OH), the carboxyl group (—COOH) and the —X—R group in Formula (2) are not limited. For example, the hydroxybenzoic acid type compound may have a structure in which a hydroxy group and a carboxyl group are bonded at the ortho position of benzene, that is, a salicylic acid skeleton.

(Matrix Polymer)

The matrix polymer (matrix resin) preferably has a function as a binder. The matrix polymer is preferably one with which the coloring compound, the developer, and the photothermal conversion material are easily homogeneously dispersed. Examples of the matrix polymer include at least one selected from the group consisting of a thermosetting resin and a thermoplastic resin. Specific examples thereof include at least one selected from the group consisting of a polyvinyl chloride-based resin, a polyvinyl acetate-based resin, a vinyl chloride-vinyl acetate copolymer resin, an ethyl cellulose-based resin, a polystyrene-based resin, a styrene-based copolymer resin, a phenoxy resin-based resin, a polyester-based resin, an aromatic polyester-based resin, a polyurethane-based resin, a polycarbonate-based resin, a polyacrylic acid ester-based resin, a polymethacrylic acid ester-based resin, an acrylic acid-based copolymer resin, a maleic acid-based polymer resin, a polyvinyl alcohol-based resin, a modified polyvinyl alcohol-based resin, a hydroxyethyl cellulose-based resin, a carboxymethyl cellulose-based resin, starch, and the like.

The matrix polymer preferably contains a polycarbonate-based resin. When the matrix polymer contains a polycarbonate-based resin, the light resistance of the background of the recording medium 20 can be improved. Here, the polycarbonate-based resin is a resin having a carbonate group (—O—(C=O)—O—) as a structural unit at least in the main chain. Therefore, other structural units may be included in the main chain in addition to the carbonate group.

The proportion of the developer in the total amount of the developer and the matrix resin is preferably 16 mass % or less. When the proportion of the developer is 16 mass % or less, the adhesion between the color development layers 24, 27, and 30 and layers adjacent to the color development layers 24, 27, and 30 (particularly, heat insulating layers 23, 26, 29) can be improved.

The proportion of the developer in the total amount of the developer and the matrix resin is measured as follows. The compositions of the developer and the matrix polymer of the color development layer are measured by performing mapping using a Fourier transform infrared spectrophotometer (micro FTIR). Alternatively, the proportion of the developer is calculated utilizing the difference in solubility between the developer and the matrix polymer as follows: each of the developer and the matrix polymer is dissolved in an appropriate organic solvent and the weight thereof is measured.

From the viewpoint of improving the adhesion between the color development layers 24, 27, and 30 and layers adjacent to the color development layers 24, 27, and 30 (particularly, heat insulating layers 23, 26, 29), the content of the matrix polymer in the color development layers 24, 27, and 30 is preferably 84 mass % or more. From the viewpoint of suppressing a decrease in color developability of the color development layers 24, 27, and 30, the content of the matrix polymer is preferably 50 mass % or more and 70 mass % or less, and more preferably 58 mass % or more and 65 mass % or less. In a case where the content of the matrix polymer is 50 mass % or more and 70 mass % or less, it is preferable to select a layer adjacent to the color development layers 24, 27, and 30 so as to obtain good adhesion.

The content of the matrix polymer in the color development layers 24, 27, and 30 is measured as follows. The compositions of the developer and the matrix polymer of the color development layers 24, 27, and 30 are measured by performing mapping using a Fourier transform infrared spectrophotometer (micro FTIR). Alternatively, the content of the matrix polymer is calculated utilizing the difference in solubility among the contents of the color development layers 24, 27, and 30 as follows: each of the contents is dissolved in an appropriate organic solvent and the weight thereof is measured.

(Photothermal Conversion Material)

The photothermal conversion material absorbs light in a predetermined wavelength range of the near-infrared region and generates heat, for example. As the photothermal conversion material, for example, a near-infrared absorbing dye having an absorption peak in a wavelength range of 700 nm or more and 2,000 nm or less and having almost no absorption in the visible region is preferably used. Specific examples of the photothermal conversion material include at least one selected from the group consisting of a compound having a phthalocyanine skeleton (phthalocyanine-based dye), a compound having a squarylium skeleton (squarylium-based dye), an inorganic compound, and the like. Examples of the inorganic compound include at least one selected from the group consisting of a metal complex such as a dithio complex, a diimmonium salt, an aminium salt, an inorganic compound, and the like. Examples of the inorganic compound include at least one selected from the group consisting of graphite, carbon black, metal powder particles, metal oxides such as tricobalt tetraoxide, iron oxide, chromium oxide, copper oxide, titanium black, and indium tin oxide (ITO), metal nitrides such as niobium nitride, metal carbides such as tantalum carbide, metal sulfides, various magnetic powders, and the like. In addition, a compound having a cyanine skeleton (cyanine-based dye), the compound having excellent light resistance and heat resistance, may be used. Note that, here, the excellent light resistance means that the compound is not decomposed by, for example, irradiation with light of a fluorescent lamp or the like under a use environment. The excellent heat resistance means that, for example, when a film is formed using the compound together with a polymer material and the film is stored at 150° C. for 30 minutes, the maximum absorption peak value of the absorption spectrum does not change by 20% or more. Examples of such a compound having a cyanine skeleton include compounds having, in the molecule, at least one of a counter ion of any of $SbF_6$, $PF_6$, $BF_4$, $ClO_4$, $CF_3SO_3$, and $(CF_3SO_3)_2N$, or a methine chain including a 5-membered ring or a 6-membered ring. Note that the compound having a cyanine skeleton, used for the recording medium 20 in the first embodiment, preferably has both any one of the counter ions described above and a cyclic structure such as a 5-membered ring and a 6-membered ring in a methine chain, and when the compound has at least one of the counter ion or the cyclic structure, sufficient light resistance and heat resistance are secured.

Note that, as the photothermal conversion material, it is preferable to select, for example, a photothermal conversion material having a narrow light absorption band in a wavelength range of 700 nm or more and 2,000 nm or less, and having a light absorption band not overlapping among the color development layers 24, 27, and 30. As a result, a desired layer among the color development layers 24, 27, and 30 can be selectively caused to develop color.

(Heat Insulating Layer)

The heat insulating layer 23 is provided between the base material 21 and the color development layer 24, and heat-insulates the base material 21 and the color development layer 24. The heat insulating layer 26 is provided between the color development layer 24 and the color development layer 27, and heat-insulates the color development layer 24 and the color development layer 27. The heat insulating layer 29 is provided between the color development layer 27 and the color development layer 30, and heat-insulates the color development layer 27 and the color development layer 30. The heat insulating layer 34 is provided between the color development layer 30 and the protective layer 31, and heat-insulates the color development layer 30 and the protective layer 31. The heat insulating layers 23, 26, 29, and 34 contain, for example, a general polymer material having translucency. Specific examples of the material include at least one selected from the group consisting of an acrylic resin, a polyvinyl chloride-based resin, a polyvinyl acetate-based resin, a vinyl chloride-vinyl acetate copolymer resin, an ethyl cellulose-based resin, a polystyrene-based resin, a styrene-based copolymer resin, a phenoxy resin-based resin, a polyester-based resin, an aromatic polyester-based resin, a polyurethane-based resin, a polycarbonate-based resin, a polyacrylic acid ester-based resin, a polymethacrylic acid ester-based resin, an acrylic acid-based copolymer resin, a maleic acid-based polymer resin, a polyvinyl alcohol-based resin, a modified polyvinyl alcohol-based resin, a hydroxyethyl cellulose-based resin, a carboxymethyl cellulose-based resin, starch, and the like. Note that the heat insulating layers 23, 26, 29, and 34 may contain, for example, various additives such as an ultraviolet absorber.

The heat insulating layers 23, 26, 29, and 34 may be ultraviolet curable resin layers. The ultraviolet curable resin layer contains an ultraviolet curable resin composition solidified by a polymerization reaction. More specifically, for example, the ultraviolet curable resin layer contains a polymer of a polymerizable compound and a polymerization initiator whose structure has been changed due to an active species generated by irradiation with external energy (ultraviolet rays). The ultraviolet curable resin composition includes, for example, at least one selected from the group consisting of a radically polymerizable ultraviolet curable resin composition, cationically polymerizable ultraviolet curable resin composition, and the like. The ultraviolet curable resin composition may contain, as necessary, at least one selected from the group consisting of a sensitizer, a filler, a stabilizer, a leveling agent, an antifoaming agent, a viscosity modifier, and the like. The ultraviolet curable resin composition may be an ultraviolet curable resin composition for a hard coat. The ultraviolet curable resin composition may be an acrylic ultraviolet curable resin composition.

The heat insulating layers 23, 26, 29, and 34 may contain an inorganic material having translucency. For example, when porous silica, alumina, titania, carbon, a composite thereof, or the like is used, the thermal conductivity is lowered, and the heat insulating effect is high, which is preferable. The heat insulating layers 23, 26, and 29 can be formed by, for example, a sol-gel method.

The formation of physical steps may be suppressed by adjusting the thickness of the heat insulating layers 23, 26, 29, and 34 to thereby make the thickness of the recording medium 20 equal to the thickness of the intermediate layer 13. The thickness of the heat insulating layers 23, 26, 29, and 34 is preferably 3 µm or more and 100 µm or less, and more preferably 5 µm or more and 50 µm or less. When the thickness of the heat insulating layers 23, 26, 29, and 34 is 3 µm or more, a sufficient heat insulating effect can be obtained. On the other hand, when the thickness of the heat insulating layers 23, 26, 29, and 34 is 100 µm or less, deterioration of translucency can be suppressed. In addition, a decrease in bending resistance of the recording medium 20 can be suppressed, and defects such as cracks can be made less likely to occur.

The pencil hardness of the surfaces of the heat insulating layers 23, 26, 29, and 34 is preferably 2B or more, and more preferably H or more. When the pencil hardness of the surfaces of the heat insulating layers 23, 26, 29, and 34 is 2B or more, the density of the heat insulating layers 23, 26, 29, and 34 is high, so that diffusion of substances via the intermediate layers 32A, 32B, 32C, and 32D can be further suppressed. For example, in a case where the pencil hardness of the surfaces of the heat insulating layers 26 and 29 is 2B or more, diffusion of the coloring compound via the intermediate layers 32B and 32C can be further suppressed. Therefore, the hue change of the color development layers 24, 27, and 30 during long-term storage and the like can be further suppressed. As the heat insulating layers 23, 26, 29, and 34 having the above-described pencil hardness, an ultraviolet curable resin layer is preferable.

The pencil hardness of the surface of the heat insulating layer 23 is measured as follows. First, the laminate 10 is disassembled to expose the surface of the heat insulating layer 23. Next, the pencil hardness of the surface of the heat insulating layer 23 is measured in accordance with JIS K5600-5-4. The measurement is performed in an atmosphere in a standard state at a temperature of 23±1° C. and a relative humidity of 50±5%. The pencil hardness of the surfaces of the heat insulating layers 26, 29, and 34 is also measured in a similar procedure to the pencil hardness of the surface of the heat insulating layer 23.

(Pressure-Sensitive Adhesive Layer)

The pressure-sensitive adhesive layer 22 is provided between the base material 21 and the heat insulating layer 23, and bonds the base material 21 and the heat insulating layer 23 to each other. The pressure-sensitive adhesive layer 25 is provided between the color development layer 24 and the heat insulating layer 26, and bonds the color development layer 24 and the heat insulating layer 26 to each other. The pressure-sensitive adhesive layer 28 is provided between the color development layer 27 and the heat insulating layer 29, and bonds the color development layer 27 and the heat insulating layer 29 to each other. The pressure-sensitive adhesive layer 33 is provided between the color development layer 30 and the heat insulating layer 34, and bonds the color development layer 30 and the heat insulating layer 34 to each other. In a case where the recording medium 20 does not include the heat insulating layer 23, the pressure-sensitive adhesive layer 22 bonds the base material 21 and the color development layer 24. In this case, the pressure-sensitive adhesive layer 22 may have a function as a heat insulating layer and/or a diffusion preventing layer. In a case where the recording medium 20 does not include the heat insulating layer 26, the pressure-sensitive adhesive layer 25 bonds the color development layer 24 and the color development layer 27. In this case, the pressure-sensitive adhesive layer 25 may have a function as a heat insulating layer and/or a diffusion preventing layer. In a case where the recording medium 20 does not include the heat insulating layer 29, the pressure-sensitive adhesive layer 28 bonds the color development layer 27 and the color development layer 30. In this case, the pressure-sensitive adhesive layer 28 may have a function as a heat insulating layer and/or a diffusion preventing layer. In a case where the recording medium 20 does not include the heat insulating layer 34, the pressure-sensitive adhesive layer 33 bonds the color development layer 30 and the protective layer 31. In this case, the pressure-sensitive adhesive layer 33 may have a function as a heat insulating layer and/or a diffusion preventing layer. In the present specification, the term "and/or" means at least one, and for example, in the case of "X and/or Y", it means three ways of only X, only Y, X and Y.

The pressure-sensitive adhesive layers 22, 25, 28, and 33 contain a pressure-sensitive adhesive. The pressure-sensitive adhesive includes, for example, at least one selected from the group consisting of an acrylic resin, a silicone-based resin, a urethane-based resin, an epoxy-based resin, and an elastomer-based material.

(Protective Layer)

The protective layer 31 is a layer for protecting the surface of the recording medium 20, and is formed using, for example, at least one of an ultraviolet curable resin or a thermosetting resin. The protective layer 31 is preferably a hard coat layer. The thickness of the protective layer 31 is, for example, 0.1 µm or more and 20 µm or less.

(Average Peel Strength Between Layers)

The average peel strength at the interface between the layers constituting the laminate 10 is preferably 3.5 N/cm or more, more preferably 4.0 N/cm or more, still more preferably 4.5 N/cm or more, and particularly preferably 5.0 N/cm or more. When the average peel strength at the interface between the layers is 3.5 N/cm or more, peeling at the interface between the layers constituting the laminate 10 can be suppressed. Therefore, the forgery preventing property and the falsification preventing property of the laminate 10 can be improved. Here, the layers constituting the laminate 10 may include the layers constituting the recording medium 20.

The average peel strength at the interface between the layers is determined by performing a 90 degree peel test. Since the method for measuring the average peel strength at the interface between the layers is similar, only the method for measuring the average peel strength at the interface between the heat insulating layer 26 and the color development layer 27 will be described below with reference to FIG. 11.

First, the laminate 10 is cut into a band shape having a width of 10 mm and a length of 100 mm to prepare a test piece 60, and the test piece 60 is left for 24 hours or more in an atmosphere in a standard state at a temperature of 23±1° C. and a relative humidity of 50±5%. Note that, in a case where the average peel strength at the interface included in the recording medium 20 is measured, the test piece 60 is cut out so as to include the recording medium 20. Hereinafter, in the test piece 60, a laminate on the lower side of the interface between the heat insulating layer 26 and the color development layer 27 is referred to as an adherend 60A, and a laminate on the upper side of the interface is referred to as an adherend 60B (see, FIG. 3). Next, at one end in the longitudinal direction of the test piece 60, a cut is made between the adherend 60A and the adherend 60B with a sharp blade such as a cutter, the adherend 60B is peeled off by a length of 20 mm in the longitudinal direction to make a gripping margin, and then the surface of the test piece 60 on the adherend 60A side is fixed to a test stand 71 with a strong pressure-sensitive adhesive. As the pressure-sensitive adhesive, a pressure-sensitive adhesive having sufficiently high pressure-sensitive adhesive force, for example, a strong pressure-sensitive adhesive tape, scotch (registered trademark) manufactured by 3M Company, is selected so that the test piece 60 is not peeled off from the test stand 71 in the measurement of the peeling strength between the heat insulating layer 26 and the color development layer 27.

Figure 11:
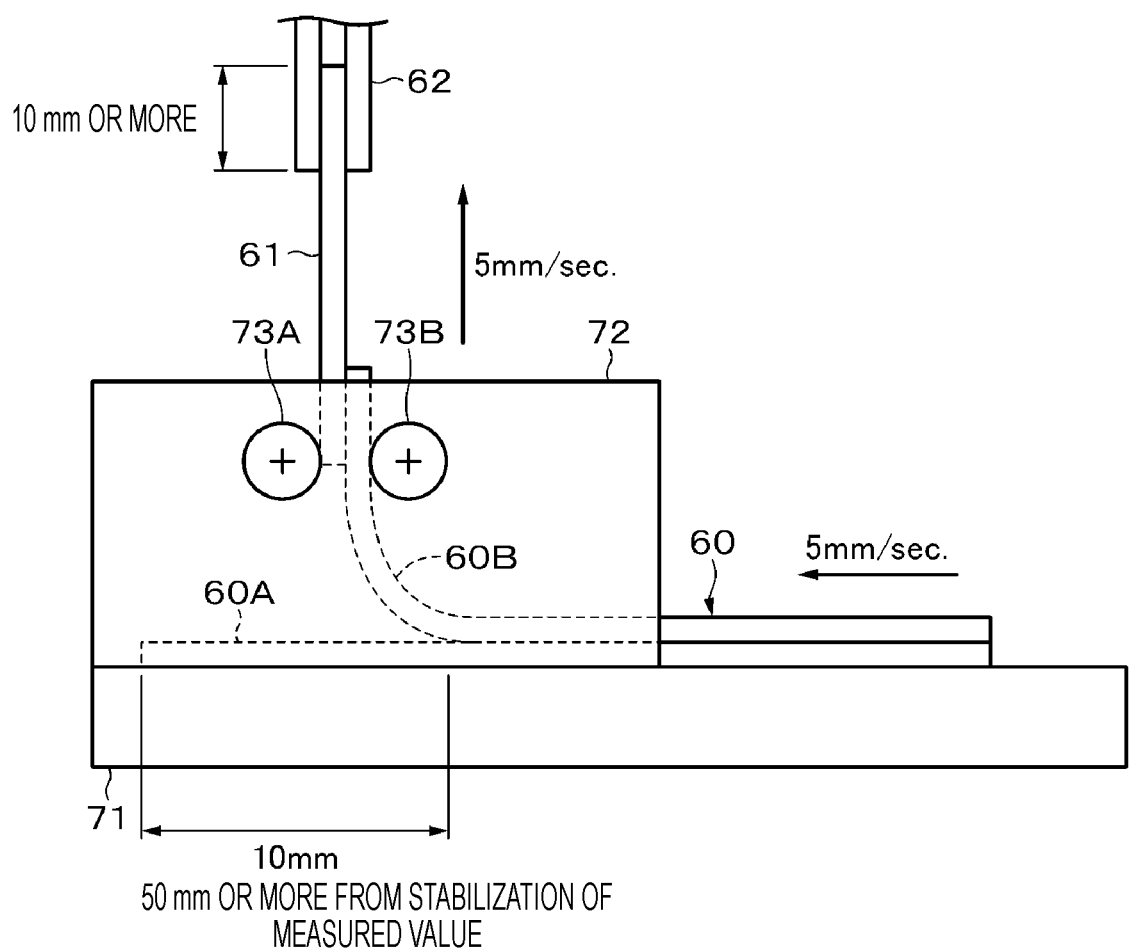
FIG. 11 is a view of a test apparatus for a 90 degree peel test.

Next, one end of a tension member 61 is bonded to the surface of the adherend 60B on the color development layer 27 side. As the tension member 61, a band-shaped film having a strength enough to prevent elongation or breakage in the measurement of the peeling strength is used. In addition, one end of the tension member 61 is bonded to the adherend 60B with a sufficiently high adhesive force so that the tension member 61 is not peeled off from the adherend 60A in the measurement of the peeling strength. FIG. 11 illustrates an example in which the tension member 61 is used as a gripping margin, but in a case where there is a sufficient stroke for which the adherend 60B is sandwiched with a clamp apparatus (metal plate) 62, the adherend 60B may be directly clamped without using the tension member 61.

Next, the gripping margin of the tension member 61 is passed between a pair of movable rolls 73A and 73B of a jig 72, and the gripping margin is then sandwiched and fixed by 10 mm or more with the clamp apparatus (metal plate) 62 of a tensile compression tester SV-55C 2H manufactured by IMADA-SS Corporation. The movable rolls 73A and 73B serve as fulcrums of peeling in the 90 degree peel test. Next, the 90 degree peel test is performed with a tensile compression tester, the test force [N/10 mm] and the stroke [mm] are monitored as voltage values in, for example, a data logger manufactured by Keyence Corporation, and the voltage values are converted into forces and stored in a memory as CSV output data. Note that the 90 degree peel test is performed at a tensile speed of 5 mm/sec in a standard state of a temperature of 23±1° C. and a relative humidity of 50±5%. The stroke is set to 50 mm or more.

The 90 degree peel test is performed three times in total, a position where the peeling strength is stabilized (a position where the rising of the force becomes gentle) is set as a start point (0 mm), and CSV output data from the start point to a position at a distance of 50 mm relatively away from the start point is arithmetically averaged to calculate an average value. As a result, the average peel strength between the heat insulating layer 26 and the color development layer 27 is determined. Provided that, in a case where there is a point (spike) at which the peel force suddenly decreases in the CSV output data, the average peel strength is calculated excluding the point (spike).

The average value of the minimum peel strengths among the peel strengths between the layers constituting the laminate 10 is preferably 3.5 N/cm or more, more preferably 4.0 N/cm or more, still more preferably 4.5 N/cm or more, and particularly preferably 5.0 N/cm or more. When the average value of the minimum peel strength is 3.5 N/cm or more as described above, peeling between the layers constituting the laminate 10 can be suppressed. Therefore, the forgery preventing property and the falsification preventing property of the laminate 10 can be improved. Here, the layers constituting the laminate 10 may include the layers constituting the recording medium 20.

The average value of the minimum peel strengths among the peel strengths between the layers constituting the laminate 10 is determined by performing a 90 degree peel test. Hereinafter, a method for measuring the average value of the minimum peel strengths among the peel strengths between the layers will be described with reference to FIGS. 12A and 12B.

Figure 12:
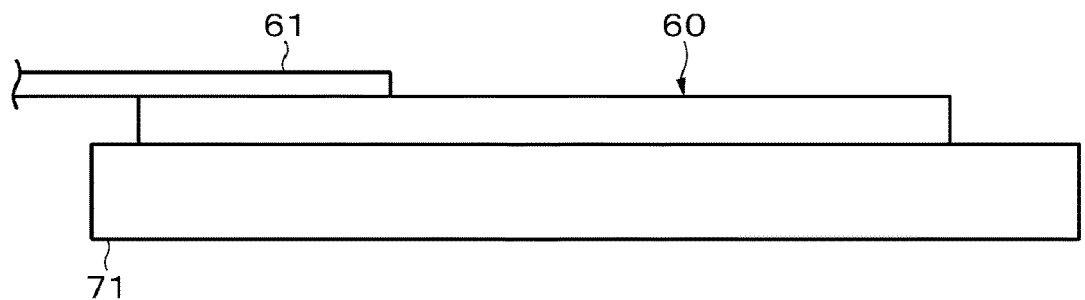
FIG. 12A is a view for explaining a preparation process of a 90 degree peel test.
FIG. 12B is a view of a test apparatus for a 90 degree peel test.
Figure 12:
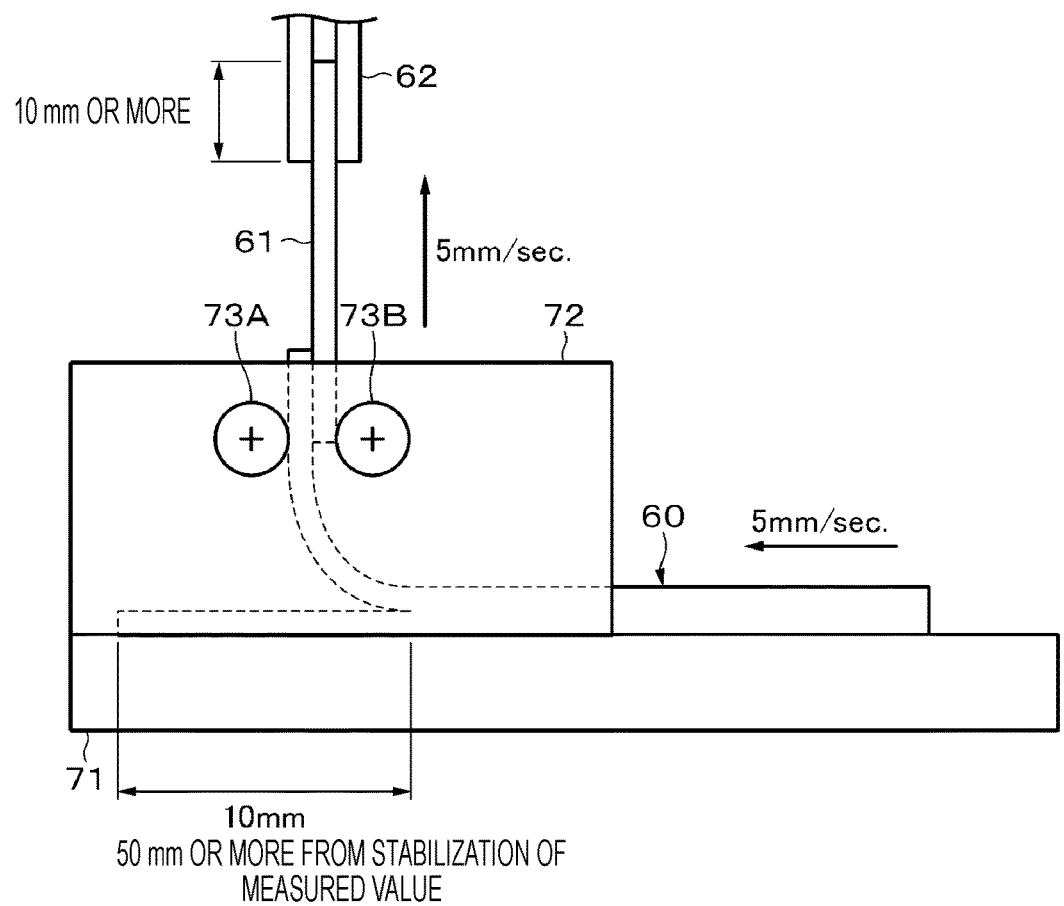

First, the laminate 10 is cut into a band shape having a width of 10 mm and a length of 100 mm to prepare the test piece 60, and the test piece 60 is left for 24 hours or more in an atmosphere in a standard state at a temperature of 23±1° C. and a relative humidity of 50±5%. Next, as illustrated in FIG. 12A, the surface of the test piece 60 on the base material 11 side is fixed to the test stand 71 with a strong pressure-sensitive adhesive, and the tension member 61 is bonded to the surface of the test piece 60 on the overlay layer 15 side. As the tension member 61, a band-shaped film having a strength enough to prevent elongation or breakage in the measurement of the average peel strength is used. In addition, one end of the tension member 61 is bonded to the adherend 60B with a sufficiently high adhesive force so as not to be peeled off from the adherend 60B in the measurement of the average peel strength.

Next, as illustrated in FIG. 12B, the gripping margin of the tension member 61 is passed between the pair of movable rolls 73A and 73B of the jig 72, and the gripping margin is then sandwiched and fixed by 10 mm or more with the clamp apparatus (metal plate) 62 of a tensile compression tester SV-55C 2H manufactured by IMADA-SS Corporation. Subsequent processes are similar to the method for measuring the average peel strength at the interface between the heat insulating layer 26 and the color development layer 27. As described above, the average value of the minimum peel strengths among the peel strengths between the layers constituting the laminate 10 is determined.

An interface having the lowest average peel strength among the interfaces of the laminate 10 is preferably located between the color development layer 24 and the color development layer 27 or between the color development layer 27 and the color development layer 30. When the laminate 10 is disassembled, the recording medium 20 is disassembled, so that it becomes difficult to take out and use the recording medium 20. Therefore, the forgery preventing property of the laminate 10 can be improved.

(Combination of Materials of Base Material, Intermediate Layer, and Overlay Layer)

The base material 11, the intermediate layer 13, and the overlay layer 15 preferably contain the same type of resin material from the viewpoint of improving adhesion. The resin material may be a thermoplastic resin. The base material 11, the intermediate layer 13, and the overlay layer 15 preferably contain a polycarbonate (PC)-based resin or a polyethylene terephthalate (PET)-based resin from the viewpoint of environmental consideration. The base material 11, the intermediate layer 13, and the overlay layer 15 preferably contain a polycarbonate (PC)-based resin or a polyvinyl chloride (PVC)-based resin from the viewpoint of improving durability. The base material 11, the intermediate layer 13, and the overlay layer 15 preferably contain a polycarbonate (PC)-based resin from the viewpoint of improving adhesion, environmental consideration, and improving durability.

It can be confirmed, for example, as follows that the base material 11, the intermediate layer 13, and the overlay layer 15 contain the same type of resin material. First, the base material 11, the intermediate layer 13, and the overlay layer 15 are taken out from the laminate 10. Next, IR spectra of the base material 11, the intermediate layer 13, and the overlay layer 15 are acquired by infrared absorption spectrometry (IR). Next, by comparing the acquired IR spectra of the respective layers, it is confirmed that the base material 11, the intermediate layer 13, and the overlay layer 15 contain the same type of resin material.

In addition, the type of the resin material contained in each of the base material 11, the intermediate layer 13, and the overlay layer 15 can be confirmed using the acquired IR spectrum of each layer.

1.2 Method for Producing Laminate

Hereinafter, an example of a method for producing the laminate 10 according to the first embodiment of the present disclosure will be described.

First, a thermosetting resin is applied as a thermal adhesive to one main surface of the base material 11 to form the adhesive layer 12. Next, after the intermediate layer 13 is placed on the adhesive layer 12, the recording medium 20 is fitted in the accommodation part 13A of the intermediate layer 13. Note that the intermediate layer 13, in which the recording medium 20 is fitted in the accommodation part 13A in advance, may be placed on the adhesive layer 12. In addition, the adhesive layer 12 may be formed by applying a thermosetting resin onto the intermediate layer 13 in which the recording medium 20 is fitted in the accommodation part 13A in advance, and then placing the intermediate layer 13 on the main surface of the base material 11 with the coating film interposed therebetween. Alternatively, the adhesive layer 12 may be formed by bonding a sheet formed in advance by, for example, applying a thermosetting resin to a separator, to the main surface of the base material 11 or the intermediate layer 13 in which the recording medium 20 is fitted in the accommodation part 13A in advance, by means of thermal lamination or the like.

Next, a thermosetting resin as a thermal adhesive is applied onto the intermediate layer 13 to form the adhesive layer 14, and then the overlay layer 15 is placed on the adhesive layer 14. Next, the obtained laminate is sandwiched between metal plates and pressurized while being heated, thereby thermally curing the adhesive layer 12 and the adhesive layer 14. The temperature applied to the laminate at the time of thermal curing is preferably 100° C. or higher and 120° C. or lower from the viewpoint of reducing damage to the recording medium 20. As a result, the intended laminate 10 is obtained. The adhesive layer 14 may be formed by applying a thermosetting resin to the overlay layer 15 and then placing the overlay layer 15 on the intermediate layer 13 with the coating film interposed therebetween. Alternatively, the adhesive layer 14 may be formed by bonding a sheet formed in advance by, for example, applying a thermosetting resin to a separator to the overlay layer 15 or the intermediate layer 13 by means of thermal lamination or the like.

1.3 Recording Method of Laminate

In the laminate 10 according to the first embodiment, for example, a pattern or the like can be recorded on the recording medium 20 as follows. Here, a case where the color development layers 24, 27, and 30 exhibit cyan, magenta, and yellow colors, respectively, will be described as an example.

For example, the recording medium 20 is irradiated with infrared rays having a prescribed wavelength and a prescribed output via the overlay layer 15 by a semiconductor laser or the like. Here, in the case of causing the color development layer 24 to develop color, an infrared ray having a wavelength $\lambda_1$ is applied to the color development layer 24 with energy to the extent that the color development layer 24 reaches the color development temperature. As a result, the photothermal conversion material contained in the color development layer 24 generates heat to cause a color reaction (color development reaction) between the coloring compound and the developer, and thus a cyan color is developed in the irradiated portion. Similarly, in the case of causing the color development layer 27 to develop color, an infrared ray having a wavelength $\lambda_2$ is applied to the color development layer 27 with energy to the extent that the color development layer 27 reaches the color development temperature. In the case of causing the color development layer 30 to develop color, an infrared ray having a wavelength $\lambda_3$ is applied to the color development layer 30 with energy to the extent that the color development layer 30 reaches the color development temperature. As a result, the photothermal conversion materials contained in the color development layer 27 and the color development layer 30 each generate heat to cause a color reaction between the coloring compound and the developer, and thus a magenta color and a yellow color are developed in the irradiated portions, respectively. In this manner, it is possible to record a pattern or the like (for example, a full-color pattern or the like) by irradiating a randomly selected portion with infrared rays having a corresponding wavelength.

1.4 Action and Effect

As described above, in the laminate 10 according to the first embodiment, the base material 11 and the intermediate layer 13 are bonded to each other by the adhesive layer 12 containing a thermal adhesive, and the intermediate layer 13 and the overlay layer 15 are bonded to each other by the adhesive layer 12 containing a thermal adhesive. As a result, the base material 11 and the intermediate layer 13, and the intermediate layer 13 and the overlay layer 15 can be firmly bonded to each other. Therefore, the forgery preventing property of the laminate 10 can be improved. Furthermore, the falsification preventing property of the laminate 10 can be improved. Therefore, the security of the laminate 10 can be improved.

Since the recording medium 20 includes the color development layers 24, 27, and 30, a full-color photographic image or the like of the laminate 10 such as a plastic security card can be obtained.

Since the laminate 10 includes the full-color recording medium 20 in a part of the plane of the laminate 10, the cost can be reduced as compared with a case where the full-color recording medium 20 is provided on the entire surface of the laminate 10.

Since the recording medium 20 is fitted in the accommodation part 13A of the intermediate layer 13, it is possible to make it difficult to visually recognize the boundary between the recording medium 20 and the intermediate layer 13 in the in-plane direction of the laminate 10. Therefore, it is difficult to identify a portion where the recording medium 20 is provided in the plane of the laminate 10. Therefore, the forgery preventing property can be improved.

Since the recording medium 20 is sealed in the laminate 10, the influence of moisture on the recording medium 20 can be reduced.

Since the recording medium 20 includes the heat insulating layers 23, 26, and 29, the thickness of the recording medium 20 can be made equal to the thickness of the intermediate layer 13 by adjusting the thickness of the heat insulating layers 23, 26, and 29. Therefore, it is possible to suppress the formation of physical steps at the boundary between the recording medium 20 and the intermediate layer 13.

2 Second Embodiment

2.1 Configuration of Laminate

Figure 4:
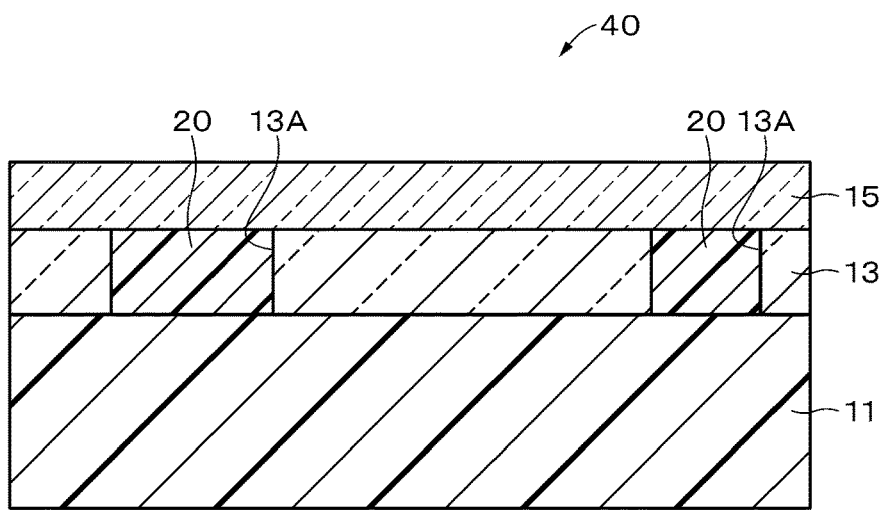
FIG. 4 is a cross-sectional view of a laminate according to a second embodiment of the present disclosure.

FIG. 4 is a cross-sectional view of a laminate 40 according to a second embodiment of the present disclosure. The laminate 40 is different from the laminate 10 according to the first embodiment in that the laminate 40 does not include the adhesive layer 12 or the adhesive layer 14, the base material 11 and the intermediate layer 13 are bonded to each other by fusion, and the intermediate layer 13 and the overlay layer 15 are bonded to each other by fusion.

In the second embodiment, the base material 11, the intermediate layer 13, and the overlay layer 15 preferably contain a thermoplastic resin as plastic. Since the base material 11, the intermediate layer 13, and the overlay layer 15 contain a thermoplastic resin, it is possible to enhance the interlayer adhesion strength by fusion. From the viewpoint of reducing damage to the recording medium 20, the thermoplastic resin is preferably one that can thermally fuse the layers of the laminate 40 in a temperature range of 130° C. or higher and 200° C. or lower.

The base material 11, the intermediate layer 13, and the overlay layer 15 may contain the same type of thermoplastic resin, or the base material 11, the intermediate layer 13, and the overlay layer 15 do not necessarily contain the same type of thermoplastic resin. In a case where the base material 11, the intermediate layer 13, and the overlay layer 15 do not contain the same type of thermoplastic resin, one layer of the base material 11, the intermediate layer 13, and the overlay layer 15 may contain a different type of thermoplastic resin from resins of the other two layers, or the base material 11, the intermediate layer 13, and the overlay layer 15 may contain different types of thermoplastic resins.

In a case where the base material 11, the intermediate layer 13, and the overlay layer 15 contain the same type of thermoplastic resin, the base material 11, the intermediate layer 13, and the overlay layer 15 preferably contain at least one selected from the group consisting of a semi-crystalline thermoplastic resin and an amorphous thermoplastic resin from the viewpoint of improving the interlayer adhesion strength by fusion.

The semi-crystalline thermoplastic resin includes, for example, at least one selected from the group consisting of polypropylene (PP), polyethylene (PE), polyacetal (POM), polyethylene terephthalate (PET), polybutylene terephthalate (PBT), polyphenylene sulfide (PPS), polyether ether ketone (PEEK), and the like.

The amorphous thermoplastic resin includes, for example, at least one selected from the group consisting of ABS resin, polycarbonate (PC), a polymer alloy of ABS resin and PC (hereinafter, referred to as "ABS/PC polymer alloy"), AS resin, polystyrene (PS), polymethyl methacrylate (PMMA), polyphenylene oxide (PPO), polysulfone (PSU), polyvinyl chloride (PVC), polyetherimide (PEI), polyethersulfone (PES), and the like.

In a case where the base material 11, the intermediate layer 13, and the overlay layer 15 do not contain the same type of thermoplastic resin, the base material 11, the intermediate layer 13, and the overlay layer 15 preferably contain an amorphous thermoplastic resin from the viewpoint of improving the interlayer adhesion strength by fusion.

The combination of the amorphous thermoplastic resins contained in the two adjacent layers of the laminate 40 is preferably the following combinations. In a case where one of two adjacent layers of the laminate 40 contains ABS resin, the other layer preferably contains at least one selected from the group consisting of an ABS/PC polymer alloy, polycarbonate (PC), AS resin, polystyrene (PS), polymethyl methacrylate (PMMA), and polyvinyl chloride (PVC).

In a case where one of two adjacent layers of the laminate 40 preferably contains an ABS/PC polymer alloy, the other layer preferably contains at least one selected from the group consisting of ABS resin, polycarbonate (PC), and polymethyl methacrylate (PMMA). In a case where one of two adjacent layers of the laminate 40 contains polycarbonate (PC), the other layer preferably contains at least one selected from the group consisting of an ABS resin, an ABS/PC polymer alloy, and polymethyl methacrylate (PMMA).

In a case where one of two adjacent layers of the laminate 40 contains AS resin, the other layer preferably contains at least one selected from the group consisting of ABS resin, polystyrene (PS), polymethyl methacrylate (PMMA), and polyphenylene oxide (PPO). In a case where one of two adjacent layers of the laminate 40 contains polystyrene (PS), the other layer preferably contains at least one selected from the group consisting of AS resin and polyphenylene oxide (PPO).

In a case where one of two adjacent layers of the laminate 40 contains polymethyl methacrylate (PMMA), the other layer preferably contains at least one selected from the group consisting of ABS resin, an ABS/PC polymer alloy, AS resin, and polyphenylene oxide (PPO). In a case where one of two adjacent layers of the laminate 40 contains polyphenylene oxide (PPO), the other layer preferably contains at least one selected from the group consisting of polycarbonate (PC), AS resin, polystyrene (PS), and polymethyl methacrylate (PMMA).

In a case where one of two adjacent layers of the laminate 40 contains polysulfone (PSU), the other layer preferably contains polycarbonate (PC). In a case where one of two adjacent layers of the laminate 40 contains polyvinyl chloride (PVC), the other layer preferably contains ABS resin.

2.2 Method for Producing Laminate

Hereinafter, an example of a method for producing the laminate 10 according to the second embodiment of the present disclosure will be described.

First, the intermediate layer 13 is placed on one main surface of the base material 11, and then the recording medium 20 is fitted in the accommodation part 13A of the intermediate layer 13. Note that the intermediate layer 13 in which the recording medium 20 is fitted in the accommodation part 13A in advance may be placed on one main surface of the base material 11. Next, the overlay layer 15 is placed on the intermediate layer 13. Next, the obtained laminate is sandwiched between metal plates, and pressurized while being heated, thereby thermally fusing the base material 11 and the intermediate layer 13, and thermally fusing the intermediate layer 13 and the overlay layer 15. The temperature applied to the laminate at the time of thermal fusion is preferably 130° C. or higher and 200° C. or lower from the viewpoint of reducing damage to the recording medium 20 and from the viewpoint of exhibiting sufficient fusion strength. As a result, the intended laminate 40 is obtained.

2.3 Action and Effect

As described above, in the laminate 40 according to the second embodiment, the base material 11 and the intermediate layer 13, and the intermediate layer 13 and the overlay layer 15 are fused, respectively. As a result, the base material 11 and the intermediate layer 13, and the intermediate layer 13 and the overlay layer 15 can be firmly bonded to each other. Therefore, the forgery preventing property of the laminate 40 can be improved. Furthermore, the falsification preventing property of the laminate 40 can be improved. Therefore, the security of the laminate 40 can be improved.

3 Third Embodiment

3.1 Configuration of Laminate

Figure 13:
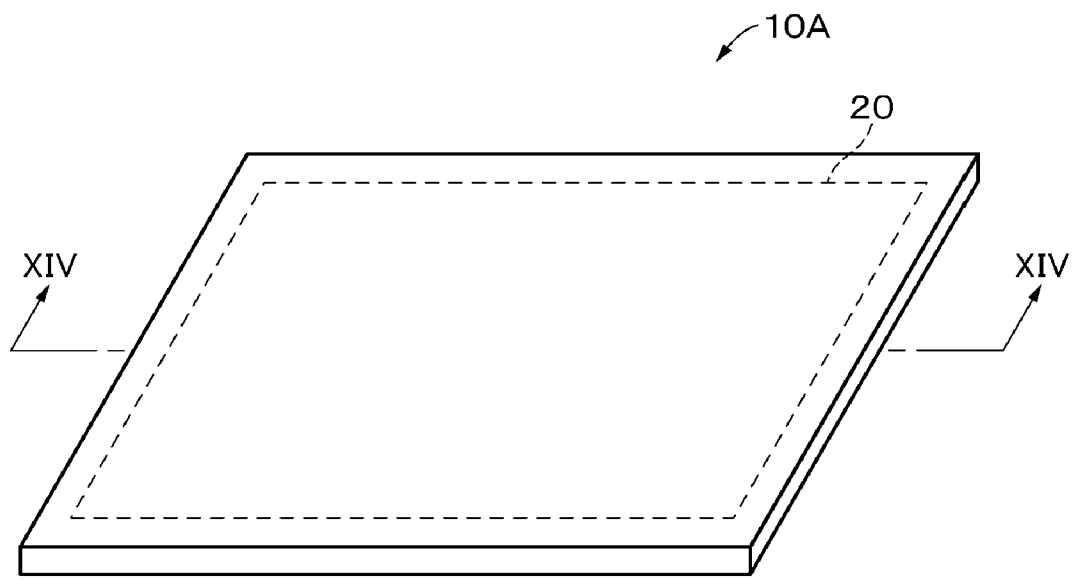
FIG. 13 is a perspective view of a laminate according to a third embodiment of the present disclosure.
Figure 14:
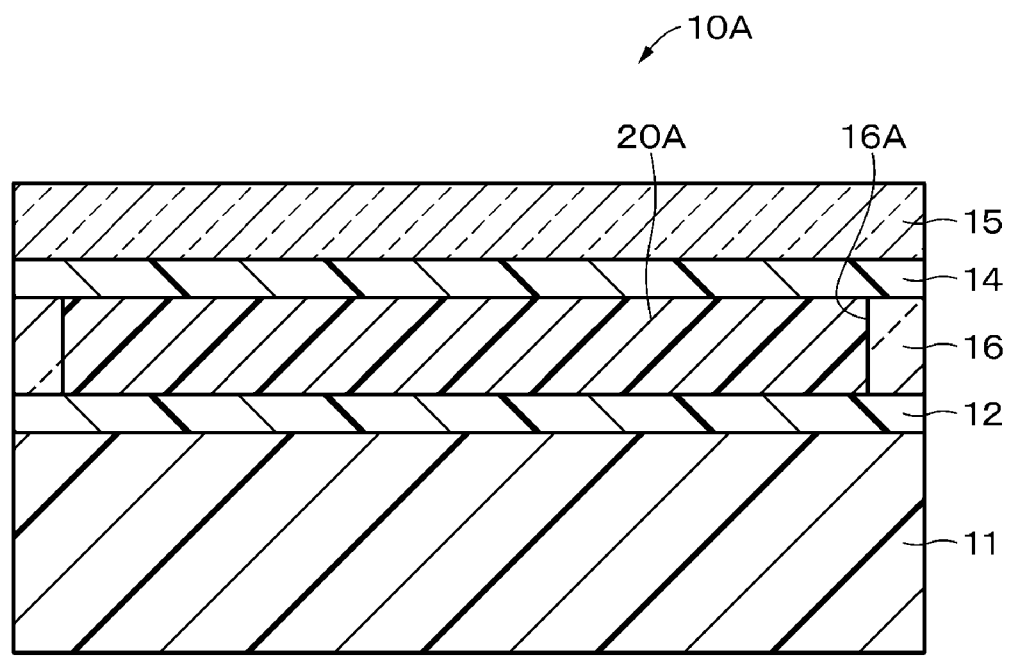
FIG. 14 is a cross-sectional view taken along line XIV-XIV of FIG. 13.

FIG. 13 is a perspective view of a laminate 10A according to a third embodiment of the present disclosure. FIG. 14 is a cross-sectional view taken along line XIV-XIV of FIG. 13. The laminate 10A includes the base material 11, the adhesive layer 12, the intermediate layer 16, the adhesive layer 14, the overlay layer 15, and a recording medium 20A. Note that, in the third embodiment, the parts similar to those in the first embodiment are denoted by the same reference numerals, and the description thereof will be omitted.

(Intermediate Layer)

The intermediate layer 16 can protect a side surface of the recording medium 20A. The intermediate layer 16 surrounds a peripheral edge portion of one main surface of the base material 11. The intermediate layer 16 has a frame shape in a plan view. In the present specification, the peripheral edge portion of one main surface refers to a region having a predetermined width from the peripheral edge of one main surface toward the inside. In addition, in the present specification, a plan view means a plan view when an object is viewed from a direction perpendicular to one main surface of the base material 11.

The intermediate layer 16 has an accommodation part 16A. The recording medium 20A is accommodated in the accommodation part 16A. The accommodation part 16A is a through hole penetrating in the thickness direction of the recording medium 20A. The intermediate layer 16 and the recording medium 20A preferably have substantially the same thickness. As a result, it is possible to suppress the formation of steps at the boundary between the intermediate layer 16 and the recording medium 20A in a state where the recording medium 20A is in the accommodation part 16A.

The intermediate layer 16 has a film shape. The intermediate layer 16 may have transparency. The intermediate layer 16 contains plastic. As the plastic, materials similar to those of the base material 11 can be exemplified.

(Recording Medium 20A)

Figure 15:
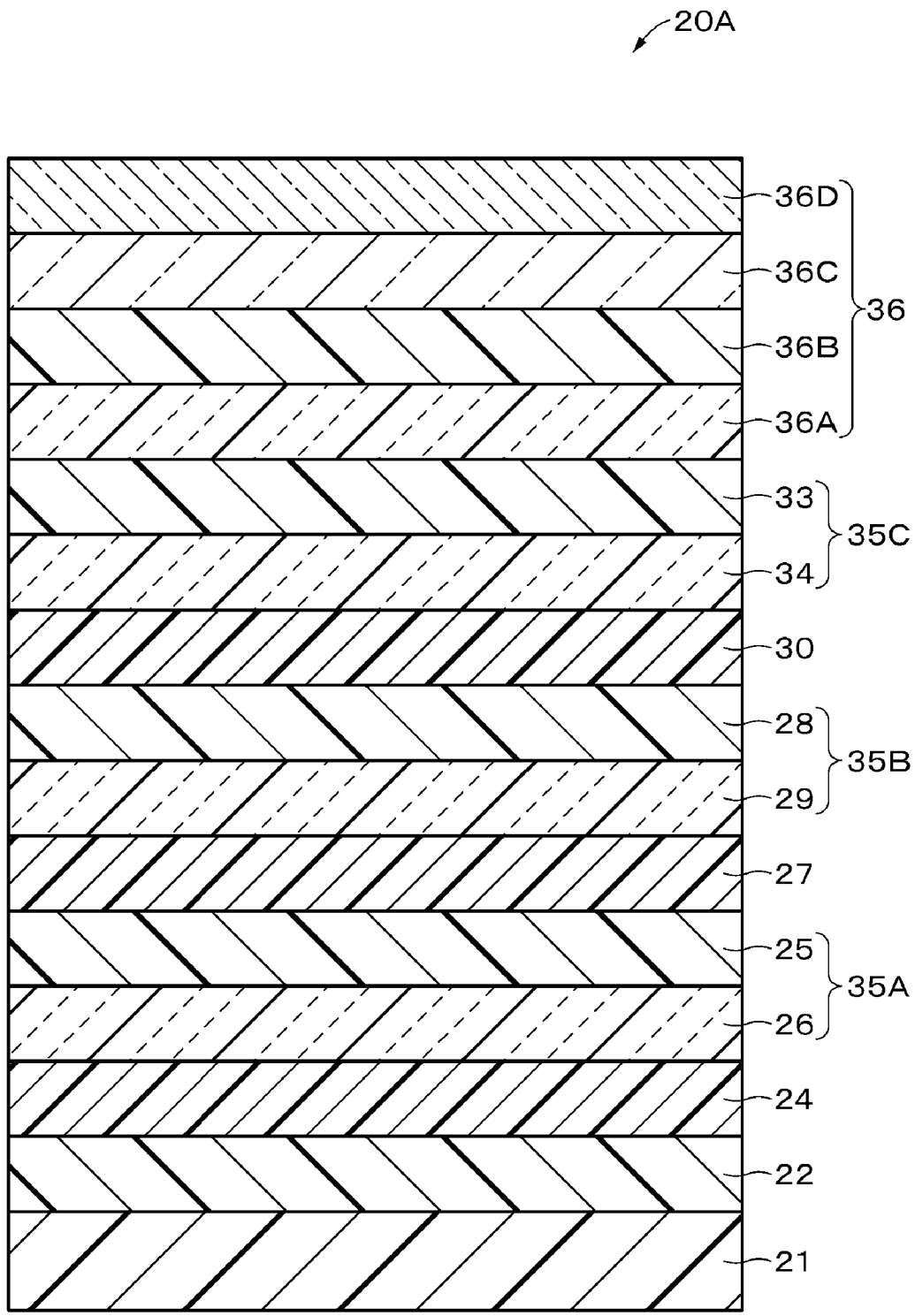
FIG. 15 is a cross-sectional view of a recording medium.

FIG. 15 is a cross-sectional view of the recording medium 20A. The recording medium 20A includes the base material 21, the pressure-sensitive adhesive layer 22, the color development layer 24, an intermediate layer 35A, the color development layer 27, an intermediate layer 35B, the color development layer 30, an intermediate layer 35C, and a protective layer 36 in this order. More specifically, the recording medium 20A includes the base material 21, the pressure-sensitive adhesive layer 22, the color development layer 24, the heat insulating layer 26, the pressure-sensitive adhesive layer 25, the color development layer 27, the heat insulating layer 29, the pressure-sensitive adhesive layer 28, the color development layer 30, the heat insulating layer 34, the pressure-sensitive adhesive layer 33, and the protective layer 36 in this order. The heat insulating layers 26, 29, and 34 are provided as necessary, and thus are not necessarily provided. The recording medium 20A is accommodated in the accommodation part 16A of the intermediate layer 16 such that the base material 21 is on the adhesive layer 12 side and the protective layer 31 is on the adhesive layer 14 side.

(Intermediate Layer)

The intermediate layer 35A is similar to the intermediate layer 32B of the recording medium 20 except that the heat insulating layer 26 is adjacent to the color development layer 24 and the pressure-sensitive adhesive layer 25 is adjacent to the color development layer 27. The intermediate layer 35B is similar to the intermediate layer 32C of the recording medium 20 except that the heat insulating layer 29 is adjacent to the color development layer 27 and the pressure-sensitive adhesive layer 28 is adjacent to the color development layer 30. The intermediate layer 35C is similar to the intermediate layer 32D of the recording medium 20 except that the heat insulating layer 34 is adjacent to the color development layer 30 and the pressure-sensitive adhesive layer 33 is adjacent to the protective layer 36.

(Protective Layer 36)

The protective layer 36 includes an ultraviolet curable resin layer 36A, a UV cut layer 36B, a pressure-sensitive adhesive layer 36C, and a base material 36D in order on one main surface of the intermediate layer 35C. The ultraviolet curable resin layer 36A can protect the surface of the recording medium 20A. The ultraviolet curable resin layer 36A may have a function as a heat insulating layer and/or a diffusion preventing layer. The UV cut layer 36B can cut ultraviolet rays incident on the color development layers 24, 27, and 30.

The pressure-sensitive adhesive layer 36C can bond the UV cut layer 36B and the base material 36D to each other. As the material of the pressure-sensitive adhesive layer 36C, materials similar to those of the pressure-sensitive adhesive layers 22, 25, and 28 can be exemplified. The base material 36D can support the ultraviolet curable resin layer 36A, the UV cut layer 36B, and the pressure-sensitive adhesive layer 36C. The base material 36D can protect the surface of the recording medium 20A. As the material of the base material 36D, for example, materials similar to those of the base material 11 can be exemplified.

3.2 Action and Effect

The laminate 10A according to the third embodiment can provide an action and effect similar to those of the laminate 10 according to the first embodiment.

4 Fourth Embodiment

4.1 Configuration of Laminate

Figure 16:
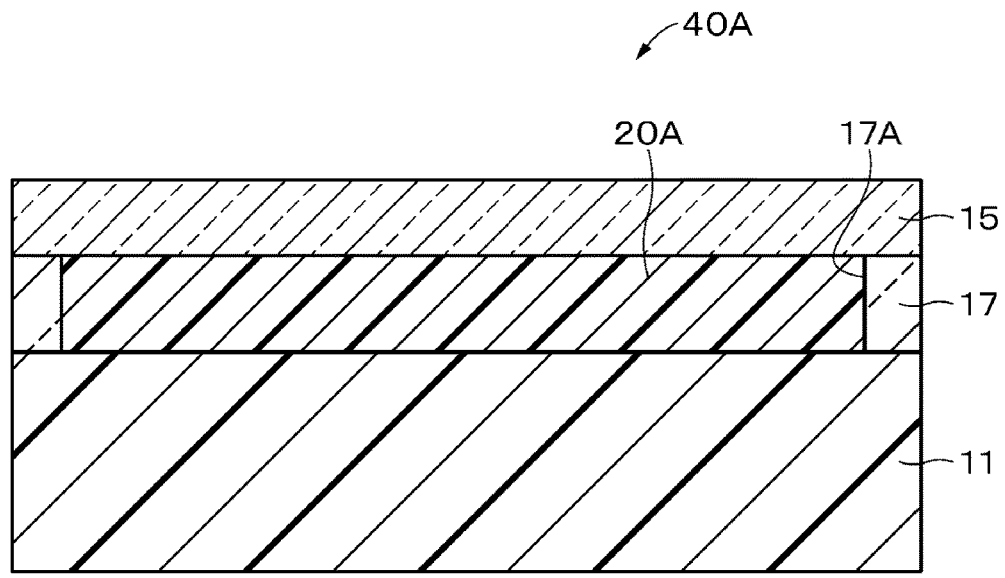
FIG. 16 is a cross-sectional view of a laminate according to a fourth embodiment of the present disclosure.

FIG. 16 is a cross-sectional view of a laminate 40A according to a fourth embodiment of the present disclosure. The laminate 40A is different from the laminate 40 according to the second embodiment in that the laminate 40A includes the intermediate layer 16 and the recording medium 20A instead of the intermediate layer 13 and the recording medium 20 (see, FIG. 4). The intermediate layer 16 and the recording medium 20A are as described in the third embodiment.

4.2 Action and Effect

The laminate 40A according to the fourth embodiment can provide an action and effect similar to those of the laminate 40 according to the second embodiment.

5 Modification Examples

Modification Example 1

Figure 5:
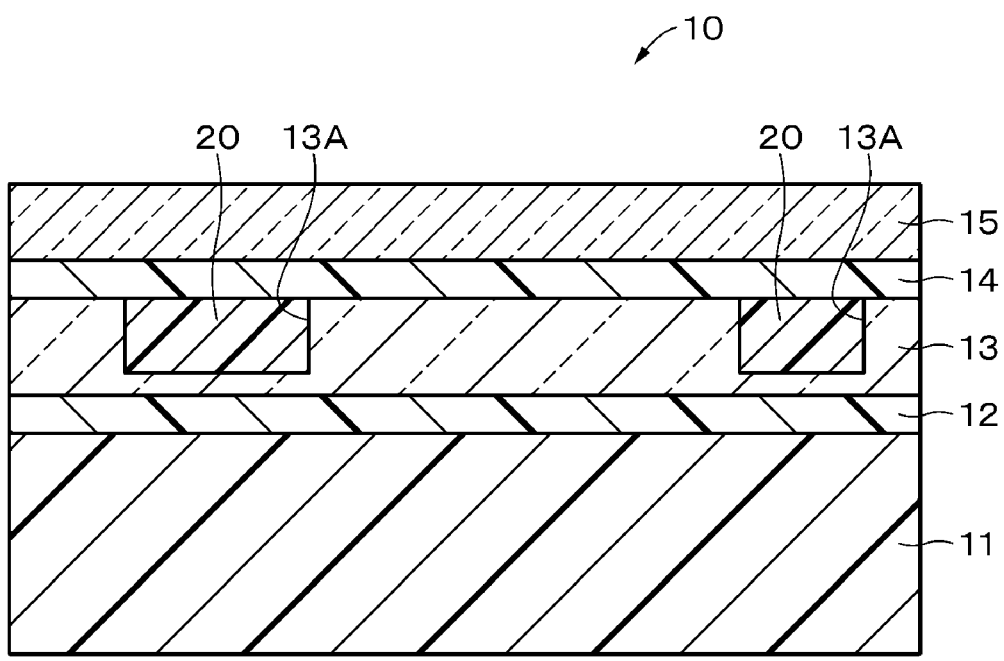
FIG. 5 is a cross-sectional view of a laminate according to a modification example of the first embodiment of the present disclosure.
Figure 17:
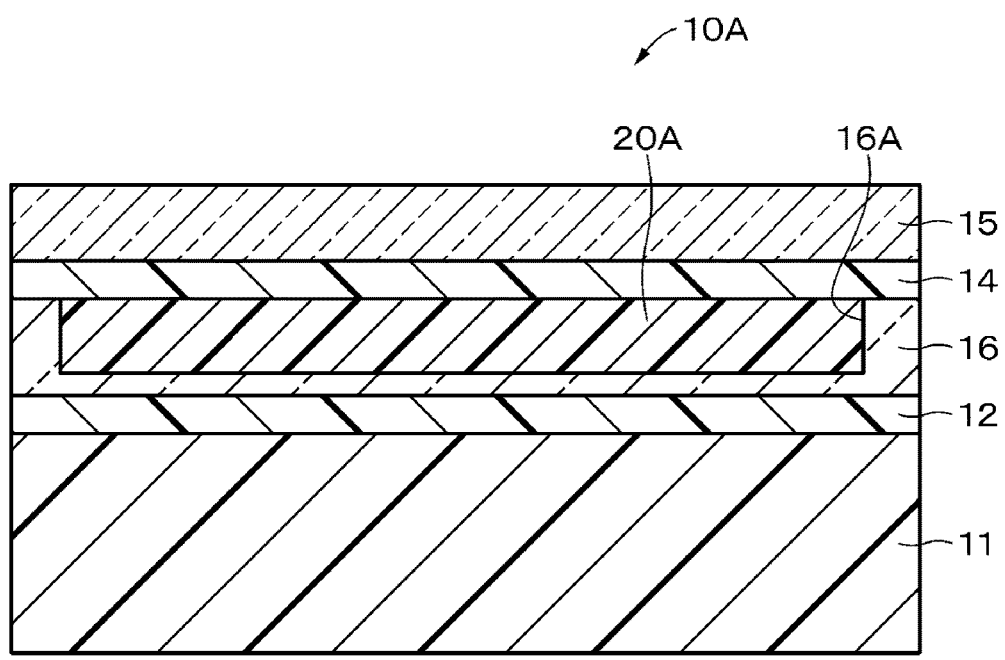
FIG. 17 is a cross-sectional view of a laminate according to a modification example of the third embodiment of the present disclosure.

In the first embodiment, an example in which the accommodation part 13A is a through hole penetrating in the thickness direction of the intermediate layer 13 has been described. However, as illustrated in FIG. 5, the accommodation part 13A may be a recess recessed in the thickness direction of the intermediate layer 13. In this case, the recess may be provided on the main surface on the side facing the overlay layer 15 among both main surfaces of the intermediate layer 13, or may be provided on the main surface on the side facing the base material 11. Similarly, in the second embodiment, a recess may be provided as the accommodation part 13A instead of the through hole. Similarly, in the third embodiment, as illustrated in FIG. 17, a recess may be provided as the accommodation part 16A instead of the through hole. Similarly, in the fourth embodiment, a recess may be provided as an accommodation part 17A instead of the through hole.

Modification Example 2

In the first, second, third, and fourth embodiments, examples in which each of the laminates 10, 40, 10A, and 40A includes the recording medium 20 or 20A including three color development layers (color development layers 24, 27, and 30) developing colors of different hues from one another have been described, but these laminates may include a recording medium including a color development layer capable of performing multicolor display in a single layer structure.

Figure 6:
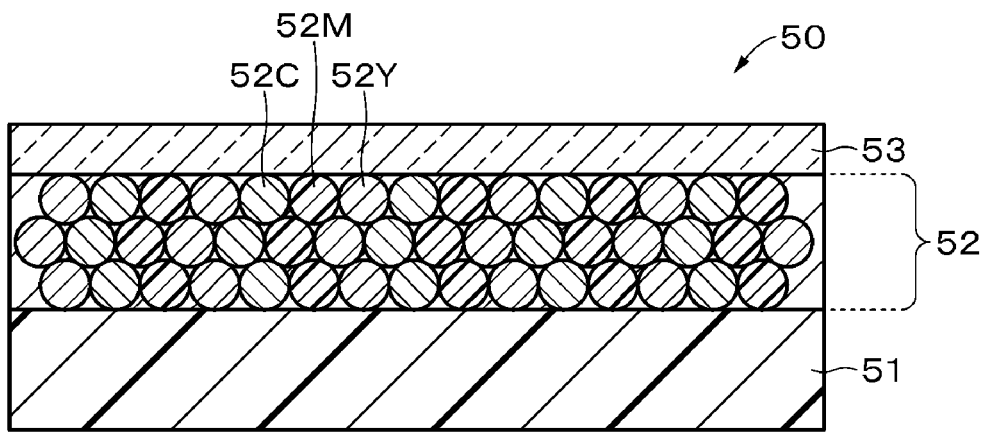
FIG. 6 is a cross-sectional view of a modification example of the recording medium.

FIG. 6 is a cross-sectional view of a recording medium 50 that enables multicolor display even in a single layer structure. The recording medium 50 includes a base material 51, a color development layer 52, and a protective layer 53 in this order. The base material 51 and the protective layer 53 are similar to the base material 21 and the protective layer 31 in the first embodiment, respectively.

The color development layer 52 includes three types of microcapsules 52C, 52M, and 52Y developing colors of different hues from one another. That is, the color development layer 52 includes three types of microcapsules 52C, 52M, and 52Y that exhibit different colors in the color development state. The color development layer 52 may contain a first matrix polymer as necessary. Each of the three types of microcapsules 52C, 52M, and 52Y contains: for example, a coloring compound exhibiting different colors (for example, cyan (C), magenta, (M) and yellow (Y)); a developer corresponding to each of the coloring compounds; a photothermal conversion material that absorbs light in different wavelength ranges and generates heat; and a second matrix polymer. As the material of the microcapsule wall containing the above-described materials, for example, it is preferable to use materials similar to the materials constituting the heat insulating layers 23, 26, and 29.

Modification Example 3

In the first, second, third, and fourth embodiments, examples in which each of the recording media 20 and 20A includes three color development layers (color development layers 24, 27, and 30) have been described, but the recording media 20 and 20A may include a single color development layer. In this case, the recording media 20 and 20A may include a base material, a pressure-sensitive adhesive layer, a color development layer, and a protective layer in this order. The color development layer may exhibit black color in the color development state.

Furthermore, the recording media 20 and 20A may include the first color development layer to the nth color development layer (here, n is an integer of 2 or more). In this case, the first color development layer to the nth color development layer may contain coloring compounds developing colors of different hues from one another.

Modification Example 4

In the first and second embodiments, the intermediate layer 13 may include a recording medium capable of rewriting the pattern or the like by an external stimulus such as laser light or heat. More specifically, the intermediate layer 13 may include a recording medium capable of reversibly changing the colored state by an external stimulus such as laser light or heat. The recording medium may have a configuration capable of performing full-color recording, or may be capable of recording a single color such as monochrome.

Modification Example 5

In the first, second, third, and fourth embodiments, the developer may contain a compound represented by the following Formula (3):

[Chemical Formula 3]

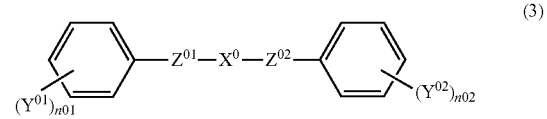

(3)

(where $X^0$ is a divalent group including at least one benzene ring, $Y^{01}$ and $Y^{02}$ are each independently a monovalent group, n01 and n02 are each independently an integer of 0 to 5, in a case where n01 is an integer of 2 to 5, $Y^{01}$s may be the same as or different from each other, in a case where n02 is an integer of 2 to 5, $Y^{02}$s may be the same as or different from each other, and $Z^{01}$ and $Z^{02}$ are each independently a hydrogen bonding group.)

When $X^0$ includes at least one benzene ring, the melting point can be increased as compared with the case where $X^0$ is an aliphatic hydrocarbon group (for example, a normal alkyl chain), so that the color development retention characteristics (hereinafter, referred to as "high temperature and high humidity storage characteristics") at the time of high temperature and high humidity storage can be improved. $X^0$ preferably includes at least two benzene rings, from the viewpoint of improving the high temperature and high humidity storage characteristics and heat resistance. The high temperature and high humidity storage characteristics are, for example, storage characteristics under an environment of 80° C. and 60% RH. When the heat resistance is improved, the resistance of the recording medium 20 against severe processes (for example, heat pressing, and integral molding using, for example, a molten resin or the like) is improved. In a case where $X^0$ includes at least two benzene rings, the at least two benzene rings may be condensed. For example, the condensed benzene rings may be naphthalene or anthracene, or the like.

Since $Z^{01}$ and $Z^{02}$ are each independently a hydrogen bonding group, the developer is likely to exist in a state of being gathered to some extent via a hydrogen bond, so that the stability of the developer in the color development layers 24, 27, and 30 is improved. In the present specification, the hydrogen bonding group means a functional group including an atom that can be bonded to an atom present in another functional group, another compound, or the like via a hydrogen bond.

The developer preferably contains a compound represented by the following Formula (4):

[Chemical Formula 4]

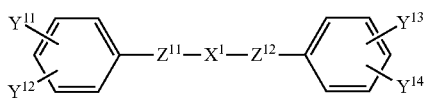
(4)

(where $X^1$ is a divalent group including at least one benzene ring, $Y^{11}$, $Y^{12}$, $Y^{13}$, and $Y^{14}$ are each independently a monovalent group, and $Z^{11}$ and $Z^{12}$ are each independently a hydrogen bonding group.)

When $X^1$ includes at least one benzene ring, the melting point can be increased as compared with the case where $X^1$ is an aliphatic hydrocarbon group (for example, a normal alkyl chain), so that the high temperature and high humidity storage characteristics can be improved. $X^1$ preferably includes at least two benzene rings, from the viewpoint of improving the high temperature and high humidity storage characteristics and heat resistance. In a case where $X^1$ includes at least two benzene rings, the at least two benzene rings may be condensed. For example, the condensed benzene rings may be naphthalene or anthracene, or the like.

Since $Z^{11}$ and $Z^{12}$ are each independently a hydrogen bonding group, the developer is likely to exist in a state of being gathered to some extent via a hydrogen bond, so that the stability of the developer in the color development layers 24, 27, and 30 is improved.

In a case where Formula (3) and Formula (4) include a hydrocarbon group, the hydrocarbon group is a generic term for groups including carbon (C) and hydrogen (H), and may be a saturated hydrocarbon group or an unsaturated hydrocarbon group. The saturated hydrocarbon group is an aliphatic hydrocarbon group having no carbon-carbon multiple bond, and the unsaturated hydrocarbon group is an aliphatic hydrocarbon group having a carbon-carbon multiple bond (carbon-carbon double bond or carbon-carbon triple bond).

In a case where Formula (3) and Formula (4) include a hydrocarbon group, the hydrocarbon group may be a chain or may contain one or two or more rings. The chain may be a linear chain, or may be a branched chain having one or more side chains, or the like.

($X^0$, $X^1$ Including One Benzene Ring)

$X^0$ in Formula (3) and $X^1$ in Formula (4) are, for example, a divalent group including one benzene ring. The divalent group is represented by, for example, the following Formula (5):

[Chemical Formula 5]

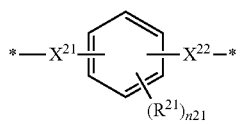
(5)

(where $X^{21}$ may or may not be present, in a case where $X^{21}$ is present, $X^{21}$ is a divalent group, $X^{22}$ may or may not be present, in a case where $X^{22}$ is present, $X^{22}$ is a divalent group, $R^{21}$ is a monovalent group, n21 is an integer of 0 to 4, in a case where n21 is an integer of 2 to 4, $R^{21}$s may be the same as or different from each other, and the symbol "*" represents a bonding portion.)

In Formula (5), the bonding positions of $X^{21}$ and $X^{22}$ to the benzene ring are not limited. That is, the bonding positions of $X^{21}$ and $X^{22}$ to the benzene ring may be any of an ortho position, a meta position, and a para position.

The divalent group including one benzene ring is preferably represented by the following Formula (6) from the viewpoint of improving high temperature and high humidity storage characteristics:

[Chemical Formula 6]

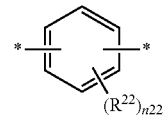
(6)

(where $R^{22}$ is a monovalent group, n22 is an integer of 0 to 4, in a case where n22 is an integer of 2 to 4, $R^{22}$s may be the same as or different from each other, and the symbol "*" represents a bonding portion.)

In a case where $X^0$ in Formula (3) is a divalent group including one benzene ring, the bonding positions of $Z^{01}$ and $Z^{02}$ to the benzene ring in Formula (6) are not limited. That is, the bonding positions of $Z^{01}$ and $Z^{02}$ to the benzene ring may be any of an ortho position, a meta position, and a para position.

In a case where $X^1$ in Formula (4) is a divalent group including one benzene ring, the bonding positions of $Z^{11}$ and $Z^{12}$ to the benzene ring in Formula (6) are not limited. That is, the bonding positions of $Z^{11}$ and $Z^{12}$ to the benzene ring may be any of an ortho position, a meta position, and a para position.

($X^{21}$, $X^{22}$)

$X^{21}$ and $X^{22}$ in Formula (5) may be each independently a divalent group, and are not particularly limited, but are exemplified as a hydrocarbon group optionally having a substituent. The hydrocarbon group is preferably a chain hydrocarbon group. When the hydrocarbon group is a chain hydrocarbon group, the melting point of the developer can be decreased, so that the developer is dissolved by irradiation with laser light, and the coloring compound is easily caused to develop color. From the viewpoint of decreasing the melting point of the developer, among the chain hydrocarbon groups, a normal alkyl chain is particularly preferable.

The number of carbon atoms of the hydrocarbon group optionally having a substituent is, for example, 1 or more and 15 or less, 1 or more and 13 or less, 1 or more and 12 or less, 1 or more and 10 or less, 1 or more and 6 or less, or 1 or more and 3 or less.

In a case where $X^{21}$ and $X^{22}$ in Formula (5) are a normal alkyl group, the number of carbon atoms of the normal alkyl group is preferably 8 or less, more preferably 6 or less, still more preferably 5 or less, and particularly preferably 3 or less from the viewpoint of high-temperature storage stability. It is considered that in a case where the number of carbon atoms of the normal alkyl group is 8 or less, the length of the normal alkyl group is short, so that thermal disturbance is less likely to occur in the developer during high-temperature storage, and a site interacting with the coloring compound such as the leuco dye at the time of color development is less likely to be removed. Therefore, the coloring compound such as the leuco dye is hardly decolored during high-temperature storage, and thus high-temperature storage stability is improved.

Examples of the substituent that is optionally included in the hydrocarbon group include halogen groups (for example, a fluorine group) or alkyl groups having a halogen group (for example, a fluorine group), and the like. The hydrocarbon group optionally having a substituent may be a hydrocarbon group in which a part of carbon of the hydrocarbon group (for example, a part of carbon included in the main chain of the hydrocarbon group) is substituted with an element such as oxygen.

($R^{21}$)

$R^{21}$ in Formula (5) is not particularly limited as long as it is a monovalent group, and is, for example, a halogen group or a hydrocarbon group optionally having a substituent.

The halogen group is, for example, a fluorine group (—F), a chlorine group (—Cl), a bromine group (—Br), or an iodine group (—I)

The number of carbon atoms of the hydrocarbon group optionally having a substituent is, for example, 1 or more and 15 or less, 1 or more and 13 or less, 1 or more and 12 or less, 1 or more and 10 or less, 1 or more and 6 or less, or 1 or more and 3 or less.

Examples of the substituent that is optionally included in the hydrocarbon group include halogen groups (for example, a fluorine group) or alkyl groups having a halogen group (for example, a fluorine group), and the like. The hydrocarbon group optionally having a substituent may be a hydrocarbon group in which a part of carbon of the hydrocarbon group (for example, a part of carbon included in the main chain of the hydrocarbon group) is substituted with an element such as oxygen.

($R^{22}$)

$R^{22}$ in Formula (6) is not particularly limited as long as it is a monovalent group, and is, for example, a halogen group or a hydrocarbon group optionally having a substituent. The halogen group and the hydrocarbon group optionally having a substituent are each similar to $R^{21}$ in Formula (3) described above.

($X^0$, $X^1$ Including Two Benzene Rings)

$X^0$ in Formula (3) and $X^1$ in Formula (4) are, for example, a divalent group including two benzene rings. The divalent group is represented by, for example, the following Formula (7):

[Chemical Formula 7]

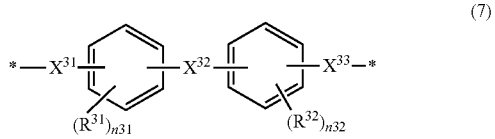

(7)

(where $X^{31}$ may or may not be present, in a case where $X^{31}$ is present, $X^{31}$ is a divalent group, $X^{32}$ may or may not be present, in a case where $X^{32}$ is present, $X^{32}$ is a divalent group, $X^{33}$ may or may not be present, in a case where $X^{33}$ is present, $X^{33}$ is a divalent group, $R^{31}$ and $R^{32}$ are each independently a monovalent group, n31 and n32 are each independently an integer of 0 to 4, in a case where n31 is an integer of 2 to 4, $R^{31}$s may be the same as or different from each other, in a case where n32 is an integer of 2 to 4, $R^{32}$s may be the same as or different from each other, and the symbol "*" represents a bonding portion.)

In Formula (7), the bonding positions of $X^{31}$ and $X^{32}$ to the benzene ring are not limited. That is, the bonding positions of $X^{31}$ and $X^{32}$ to the benzene ring may be any of an ortho position, a meta position, and a para position. Similarly, in Formula (7), the bonding positions of $X^{32}$ and $X^{33}$ to the benzene ring are not limited. That is, the bonding positions of $X^{32}$ and $X^{33}$ to the benzene ring may be any of an ortho position, a meta position, and a para position.

The divalent group including two benzene rings is preferably represented by the following Formula (8) from the viewpoint of improving high temperature and high humidity storage characteristics:

[Chemical Formula 8]

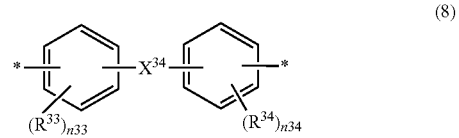

(8)

(where $X^{34}$ is a divalent group, $R^{33}$ and $R^{34}$ are each independently a monovalent group, n33 and n34 are each independently an integer of 0 to 4, in a case where n33 is an integer of 2 to 4, $R^{33}$s may be the same as or different from each other, in a case where n34 is an integer of 2 to 4, $R^{34}$s may be the same as or different from each other, and the symbol "*" represents a bonding portion.)

In a case where $X^0$ in Formula (3) is a divalent group including two benzene rings, the bonding positions of $Z^{01}$ and $X^{34}$ to the benzene ring in Formula (8) are not limited. That is, the bonding positions of $Z^{01}$ and $X^{34}$ to the benzene ring may be any of an ortho position, a meta position, and a para position. Similarly, in Formula (8), the bonding positions of $Z^{02}$ and $X^{34}$ to the benzene ring are not limited. That is, the bonding positions of $Z^{02}$ and $X^{34}$ to the benzene ring may be any of an ortho position, a meta position, and a para position.

In a case where $X^1$ in Formula (4) is a divalent group including two benzene rings, the bonding positions of $Z^{11}$ and $X^{34}$ to the benzene ring in Formula (8) are not limited. That is, the bonding positions of $Z^{11}$ and $X^{34}$ to the benzene ring may be any of an ortho position, a meta position, and a para position. Similarly, in Formula (8), the bonding positions of $Z^{12}$ and $X^{34}$ to the benzene ring are not limited. That is, the bonding positions of $Z^{12}$ and $X^{34}$ to the benzene ring may be any of an ortho position, a meta position, and a para position.

($X^{31}$, $X^{32}$, $X^{33}$)

$X^{31}$, $X^{32}$, and $X^{33}$ in Formula (7) may be each independently a divalent group, and are not particularly limited, but are, for example, a hydrocarbon group optionally having a substituent. The hydrocarbon group is similar to $X^{21}$ and $X^{22}$ in Formula (5) described above.

($X^{34}$)

$X^{34}$ in Formula (8) is not particularly limited as long as it is a divalent group, but is, for example, a hydrocarbon group optionally having a substituent. The hydrocarbon group is similar to $X^{21}$ and $X^{22}$ in Formula (5) described above.

($R^{31}$, $R^{32}$)

$R^{31}$ and $R^{32}$ in Formula (7) are not particularly limited as long as they are a monovalent group, and are, for example, a halogen group or a hydrocarbon group optionally having a substituent. The halogen group and the hydrocarbon group optionally having a substituent are each similar to $R^{21}$ in Formula (5) described above.

($R^{33}$, $R^{34}$)

$R^{33}$ and $R^{34}$ in Formula (8) are not particularly limited as long as they are a monovalent group, and are, for example, a halogen group or a hydrocarbon group optionally having a substituent. The halogen group and the hydrocarbon group optionally having a substituent are each similar to $R^{21}$ in Formula (5) described above.

($Y^{01}$, $Y^{02}$)

$Y^{01}$ and $Y^{02}$ in Formula (3) are each independently, for example, a hydrogen group (—H), a hydroxy group (—OH), a halogen group (—X), a carboxy group (—COOH), an ester group (—COOR), or a hydrocarbon group optionally having a substituent.

The halogen group is, for example, a fluorine group (—F), a chlorine group (—Cl), a bromine group (—Br), or an iodine group (—I)

The number of carbon atoms of the hydrocarbon group optionally having a substituent is, for example, 1 or more and 15 or less, 1 or more and 13 or less, 1 or more and 12 or less, 1 or more and 10 or less, 1 or more and 6 or less, or 1 or more and 3 or less.

Examples of the substituent that is optionally included in the hydrocarbon group include halogen groups (for example, a fluorine group) or alkyl groups having a halogen group (for example, a fluorine group), and the like. The hydrocarbon group optionally having a substituent may be a hydrocarbon group in which a part of carbon of the hydrocarbon group (for example, a part of carbon included in the main chain of the hydrocarbon group) is substituted with an element such as oxygen.

In Formula (3), one of $(Y^{01})_{n01}$ and/or one of $(Y^{02})_{n02}$ is preferably a hydroxy group (—OH). When one of $(Y^{01})_{n01}$ and/or one of $(Y^{02})_{n02}$ is a hydroxy group (—OH), display quality and light resistance can be improved.

($Y^{11}$, $Y^{12}$, $Y^{13}$, $Y^{14}$)

In Formula (4), the bonding positions of $Y^{11}$ and $Y^{12}$ to the benzene ring are not limited. That is, the bonding positions of $Y^{11}$ and $Y^{12}$ to the benzene ring may be any of an ortho position, a meta position, and a para position. Similarly, in Formula (4), the bonding positions of $Y^{13}$ and $Y^{14}$ to the benzene ring are also not limited. That is, the bonding positions of $Y^{13}$ and $Y^{14}$ to the benzene ring may be any of an ortho position, a meta position, and a para position.

In Formula (4), the bonding positions of $Y^{11}$ and $Y^{12}$ to one benzene and the bonding positions of $Y^{13}$ and $Y^{14}$ to the other benzene may be the same or different.

$Y^{11}$, $Y^{12}$, $Y^{13}$, and $Y^{14}$ in Formula (4) each independently represent, for example, a hydrogen group (—H), a hydroxy group (—OH), a halogen group, a carboxy group (—COOH), an ester group (—COOR), or a hydrocarbon group optionally having a substituent. The halogen group and the hydrocarbon group optionally having a substituent are each similar to $Y^{01}$ and $Y^{02}$ in Formula (3) described above.

In Formula (4), $Y^{11}$ and/or $Y^{13}$ are preferably a hydroxy group (—OH). When $Y^{11}$ and/or $Y^{13}$ is a hydroxy group (—OH), display quality and light resistance can be improved.

($Z^{01}$, $Z^{02}$)

$Z^{01}$ and $Z^{02}$ in Formula (3) are each independently, for example, a urea bond (—NHCONH—), an amide bond (—NHCO—, —OCHN—), or a hydrazide bond (—NHCO-CONH—). $Z^{01}$ and $Z^{02}$ are preferably a urea bond from the viewpoint of improving high temperature and high humidity storage characteristics. In a case where $Z^{01}$ is an amide bond, the nitrogen contained in the amide bond may be bonded to benzene, or the carbon contained in the amide bond may be bonded to benzene. In a case where $Z^{02}$ is an amide bond, the nitrogen contained in the amide bond may be bonded to benzene, or the carbon contained in the amide bond may be bonded to benzene.

($Z^{11}$, $Z^{12}$)

$Z^{11}$ and $Z^{12}$ in Formula (4) are each independently, for example, a urea bond (—NHCONH—), an amide bond (—NHCO—, —OCHN—), or a hydrazide bond (—NHCO-CONH—). $Z^{11}$ and $Z^{12}$ are preferably a urea bond from the viewpoint of improving high temperature and high humidity storage characteristics. In a case where $Z^{11}$ is an amide bond, the nitrogen contained in the amide bond may be bonded to benzene, or the carbon contained in the amide bond may be bonded to benzene. In a case where $Z^{12}$ is an amide bond, the nitrogen contained in the amide bond may be bonded to benzene, or the carbon contained in the amide bond may be bonded to benzene.

Specific Examples of Developer

Specifically, a developer, in which $X^0$ in Formula (3) and $X^1$ in Formula (4) include one benzene ring, contains, for example, at least one selected from the group consisting of compounds represented by the following Formulas (9-1) to (9-6).

[Chemical Formula 9]

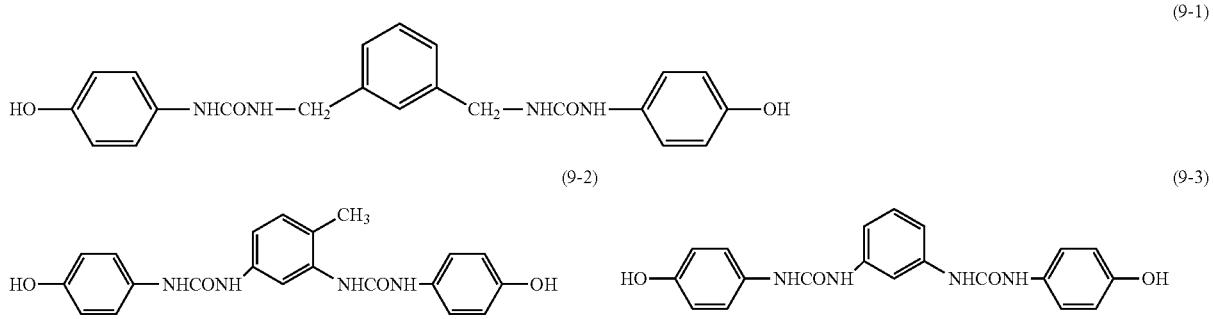

-continued
(9-4)
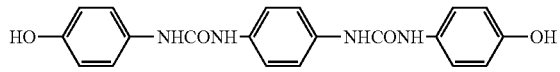
(9-5)
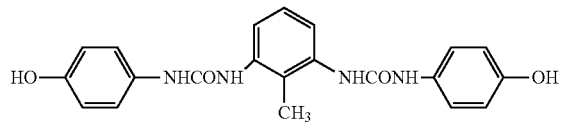
(9-6)
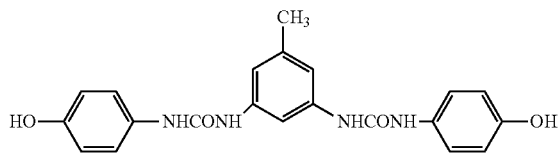
Specifically, a developer, in which $X^0$ in Formula (3) and $X^1$ in Formula (4) include two benzene rings, contains, for example, at least one selected from the group consisting of compounds represented by the following Formulas (10-1) to (10-8).
[Chemical Formula 10]
(10-1)
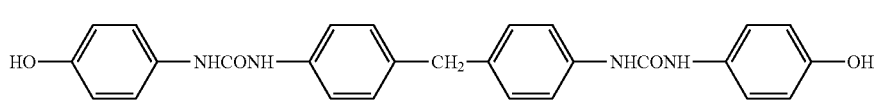
(10-2)
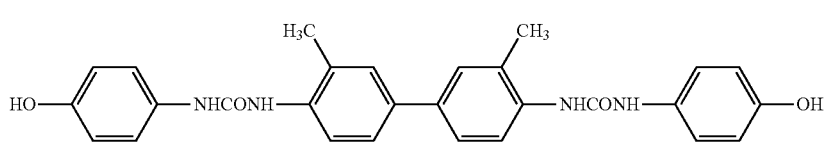
(10-3)
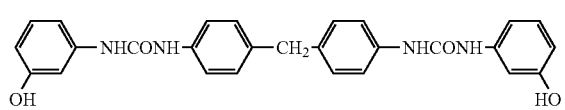
(10-4)
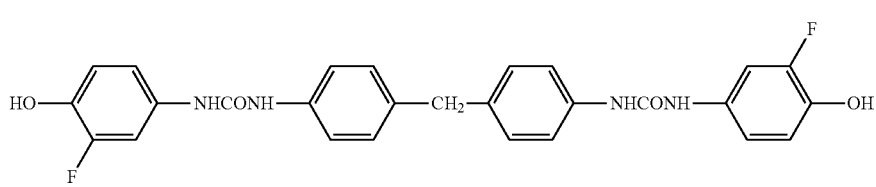
(10-5)
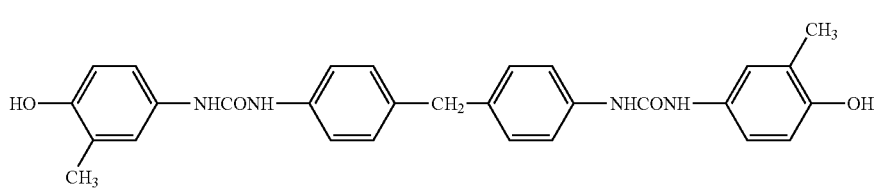
(10-6)
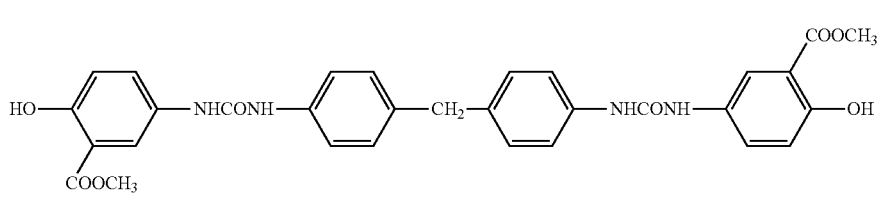
(10-7)
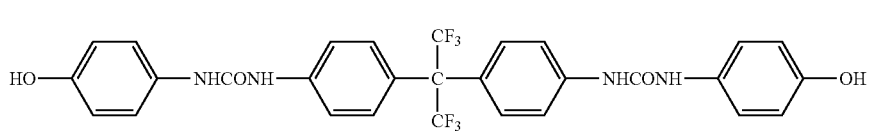

-continued

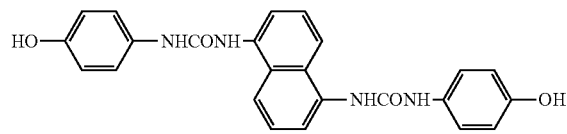

(10-8)

Modification Example 6

Figure 18:
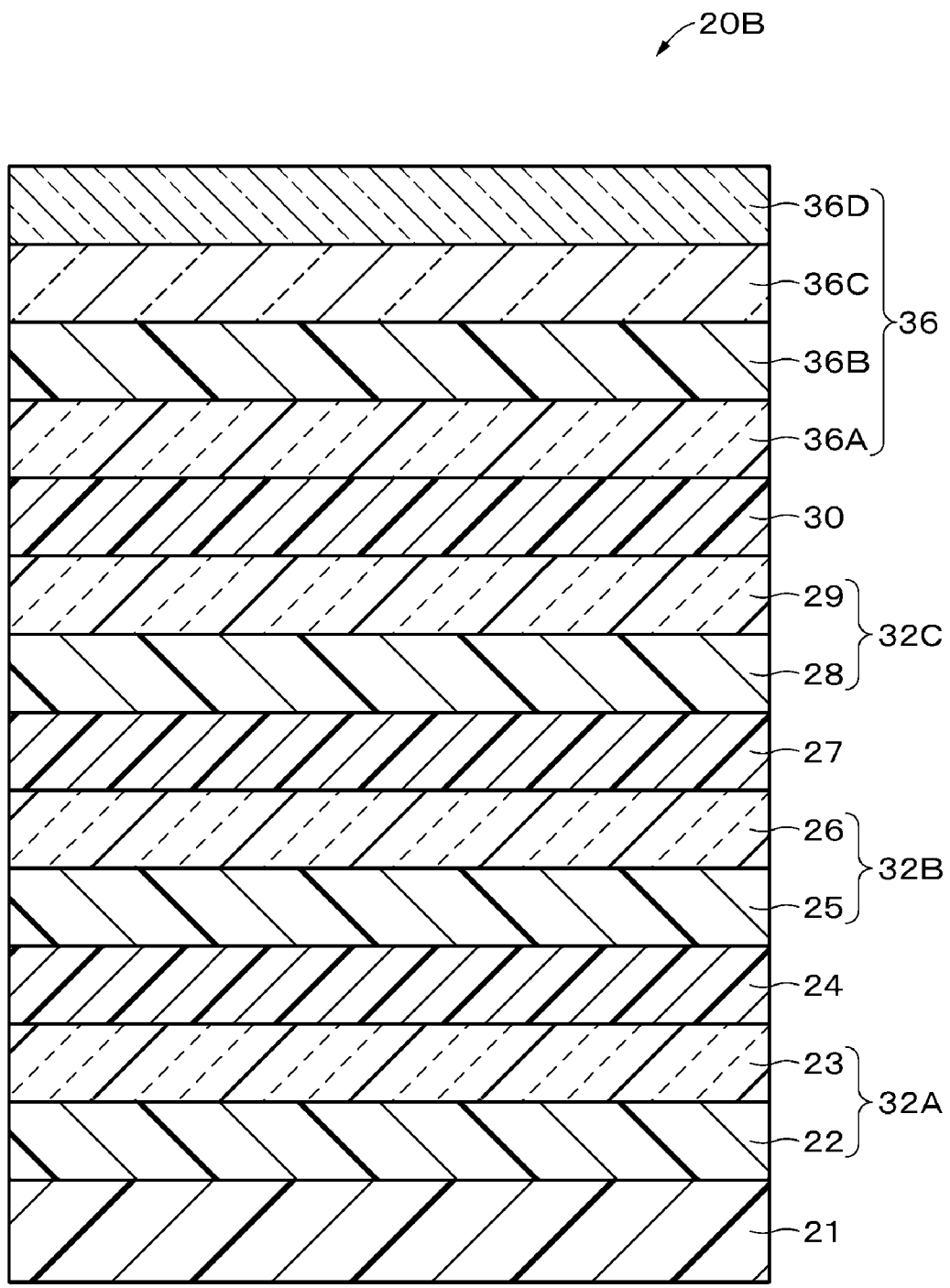
FIG. 18 is a cross-sectional view of a recording medium.

In the first embodiment, an example in which the laminate 10 includes the recording medium 20 (see, FIG. 3) has been described, but the laminate 10 may include a recording medium 20B illustrated in FIG. 18 instead of the recording medium 20. The recording medium 20B is different from the recording medium 20 in that the recording medium 20B includes the protective layer 36 instead of the protective layer 31. The protective layer 36 is as described in the third embodiment. Similarly in the second embodiment, the laminate 40 may include the recording medium 20B illustrated in FIG. 18 instead of the recording medium 20.

Modification Example 7

Figure 19:
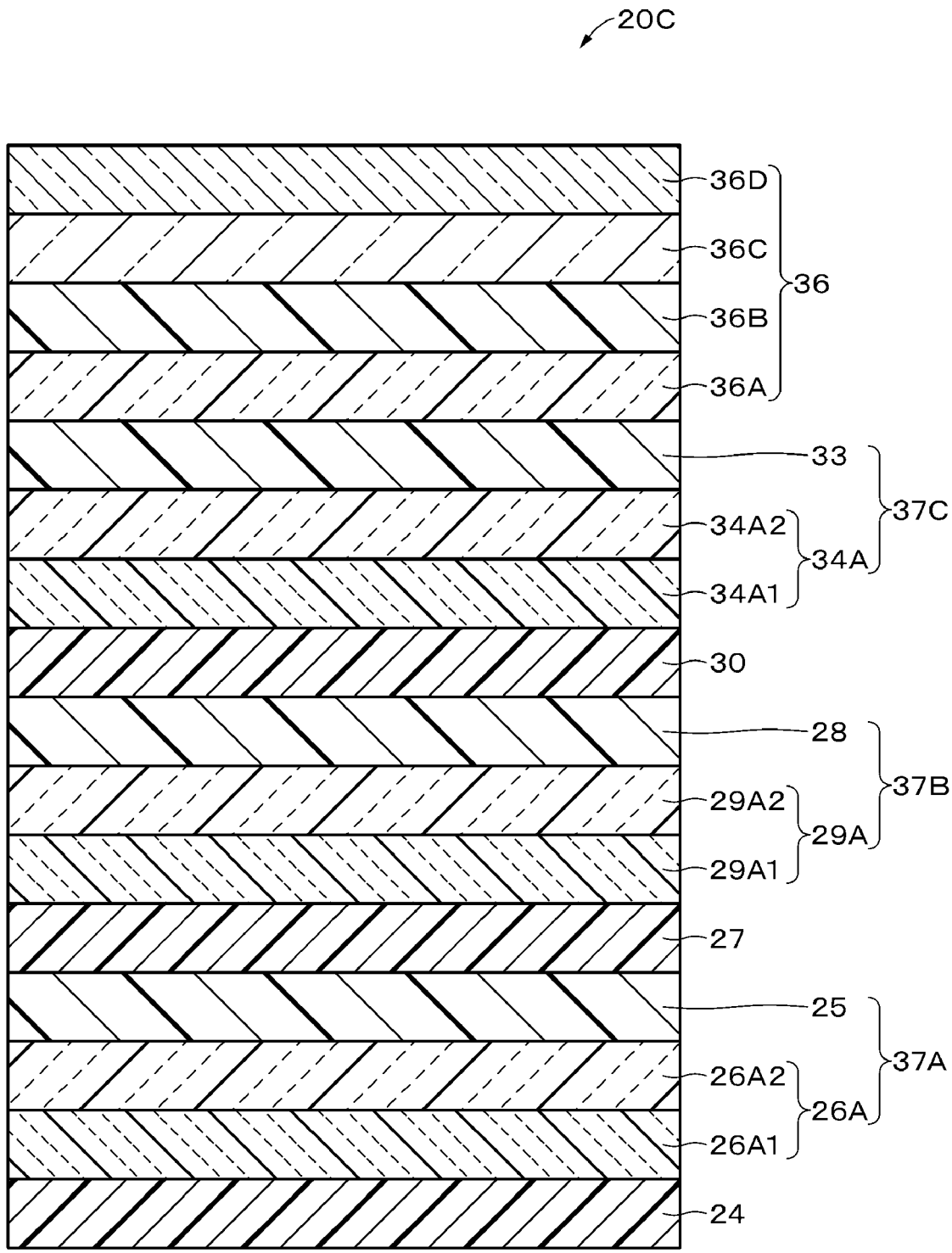
FIG. 19 is a cross-sectional view of a recording medium.

In the third embodiment, an example in which the laminate 10A includes the recording medium 20A has been described, but the laminate 10A may include a recording medium 20C illustrated in FIG. 19 instead of the recording medium 20A (see, FIG. 15). The recording medium 20C is different from the recording medium 20A in that the recording medium 20C includes intermediate layers 37A, 37B, and 37C instead of the intermediate layers 35A, 35B, and 35C. The recording medium 20C does not necessarily include the base material 21 and the pressure-sensitive adhesive layer 22.

The intermediate layer 37A includes a heat insulating layer 26A and the pressure-sensitive adhesive layer 25 in order on one main surface of the color development layer 24. The heat insulating layer 26A includes a resin layer 26A1 and an ultraviolet curable resin layer 26A2 in order on one main surface of the color development layer 24. The resin layer 26A1 is provided between the color development layer 24 and the ultraviolet curable resin layer 26A2. The resin layer 26A1 can improve the adhesion between the color development layer 24 and the ultraviolet curable resin layer 26A2. The resin layer 26A1 contains the same type of resin material as the matrix polymer contained in the color development layer 24. For example, in a case where the color development layer 24 contains a polycarbonate-based resin as a matrix polymer, the resin layer 26A1 contains a polycarbonate-based resin. The ultraviolet curable resin layer 26A2 is similar to the ultraviolet curable resin layer of the heat insulating layer 26 in the third embodiment.

The intermediate layer 37B includes a heat insulating layer 29A and the pressure-sensitive adhesive layer 28 in order on one main surface of the color development layer 27. The heat insulating layer 29A includes a resin layer 29A1 and an ultraviolet curable resin layer 29A2 in order on one main surface of the color development layer 27. The resin layer 29A1 is provided between the color development layer 27 and the ultraviolet curable resin layer 29A2. The resin layer 29A1 can improve the adhesion between the color development layer 27 and the ultraviolet curable resin layer 29A2. The resin layer 29A1 contains the same type of resin material as the matrix polymer contained in the color development layer 27. For example, in a case where the color development layer 27 contains a polycarbonate-based resin as a matrix polymer, the resin layer 29A1 contains a polycarbonate-based resin. The ultraviolet curable resin layer 29A2 is similar to the ultraviolet curable resin layer of the heat insulating layer 29 in the third embodiment.

The intermediate layer 37C includes a heat insulating layer 34A and the pressure-sensitive adhesive layer 33 in order on one main surface of the color development layer 30.

The heat insulating layer 34A includes a resin layer 34A1 and an ultraviolet curable resin layer 34A2 in order on one main surface of the color development layer 30. The resin layer 34A1 is provided between the color development layer 30 and the ultraviolet curable resin layer 34A2. The resin layer 34A1 can improve the adhesion between the color development layer 30 and the ultraviolet curable resin layer 34A2. The resin layer 34A1 contains the same type of resin material as the matrix polymer contained in the color development layer 30. For example, in a case where the color development layer 30 contains a polycarbonate-based resin as a matrix polymer, the resin layer 34A1 contains a polycarbonate-based resin. The ultraviolet curable resin layer 34A2 is similar to the ultraviolet curable resin layer of the heat insulating layer 34 in the third embodiment.

The reason why the resin layer 26A1 is provided between the color development layer 24 and the ultraviolet curable resin layer 26A2 is as follows. In a case where the color development layer 24 contains a particulate developer, the particulate developer is distributed on the surface of the color development layer 24. Therefore, in a case where the color development layer 24 and the ultraviolet curable resin layer 26A2 are adjacent to each other, the adhesion may be reduced. As described above, since the resin layer 34A1 is adjacent to the color development layer 24 and the resin layer 34A1 contains the same type of resin material as the matrix polymer contained in the color development layer 24, the adhesion at the interface other than the portion where the developer is distributed can be improved. Therefore, it is possible to compensate for a decrease in adhesion due to the particulate developer.

The reason why the resin layer 29A1 is provided between the color development layer 27 and the ultraviolet curable resin layer 29A2 and the reason why the resin layer 34A1 is provided between the color development layer 30 and the ultraviolet curable resin layer 34A2 are similar to the reason why the resin layer 26A1 is provided between the color development layer 24 and the ultraviolet curable resin layer 26A2.

Modification Example 8

Figure 20:
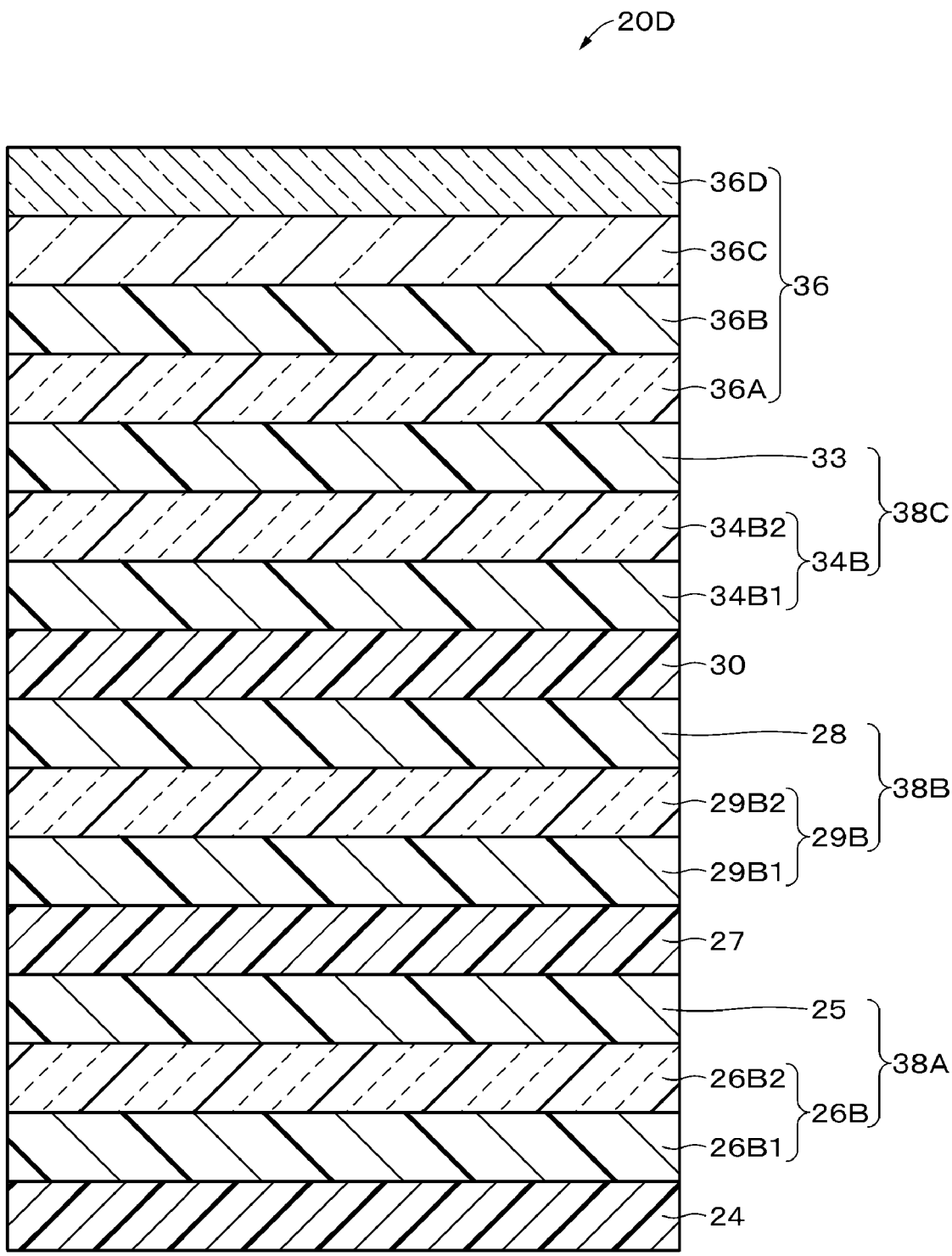
FIG. 20 is a cross-sectional view of a recording medium.

In the third embodiment, an example in which the laminate 10A includes the recording medium 20A has been described, but the laminate 10A may include a recording medium 20D illustrated in FIG. 20 instead of the recording medium 20A (see, FIG. 15). The recording medium 20D is different from the recording medium 20A in that the recording medium 20D includes intermediate layers 38A, 38B, and 38C instead of the intermediate layers 35A, 35B, and 35C.

The intermediate layer 38A includes a heat insulating layer 26B and the pressure-sensitive adhesive layer 25 in order on one main surface of the color development layer 24.

The heat insulating layer 26B includes a pressure-sensitive adhesive layer 26B1 and an ultraviolet curable resin layer 26B2 in order on one main surface of the color development layer 24. The pressure-sensitive adhesive layer 26B1 is provided between the color development layer 24 and the ultraviolet curable resin layer 26B2. The pressure-sensitive adhesive layer 26B1 can bond the color development layer 24 and the ultraviolet curable resin layer 26B2 to each other. Since the pressure-sensitive adhesive layer 26B1 is provided between the color development layer 24 and the ultraviolet curable resin layer 26B2, it is possible to compensate for a decrease in adhesive force due to the developer contained in the color development layer 24. As the material of the pressure-sensitive adhesive layer 26B1, materials similar to those of the pressure-sensitive adhesive layers 22, 25, and 28 can be exemplified.

The intermediate layer 38B includes a heat insulating layer 29B and the pressure-sensitive adhesive layer 28 in order on one main surface of the color development layer 27.

The heat insulating layer 29B includes a pressure-sensitive adhesive layer 29B1 and an ultraviolet curable resin layer 29B2 in order on one main surface of the color development layer 27. The pressure-sensitive adhesive layer 29B1 is provided between the color development layer 27 and the ultraviolet curable resin layer 29B2. The pressure-sensitive adhesive layer 29B1 can bond the color development layer 27 and the ultraviolet curable resin layer 29B2 to each other. Since the pressure-sensitive adhesive layer 29B1 is provided between the color development layer 27 and the ultraviolet curable resin layer 29B2, it is possible to compensate for a decrease in adhesive force due to the developer contained in the color development layer 27. As the material of the pressure-sensitive adhesive layer 29B1, materials similar to those of the pressure-sensitive adhesive layers 22, 25, and 28 can be exemplified.

The intermediate layer 38C includes a heat insulating layer 34B and the pressure-sensitive adhesive layer 33 in order on one main surface of the color development layer 30.

The heat insulating layer 34B includes a pressure-sensitive adhesive layer 34B1 and an ultraviolet curable resin layer 34B2 in order on one main surface of the color development layer 30. The pressure-sensitive adhesive layer 34B1 is provided between the color development layer 30 and the ultraviolet curable resin layer 34B2. The pressure-sensitive adhesive layer 34B1 can bond the color development layer 30 and the ultraviolet curable resin layer 34B2 to each other. Since the pressure-sensitive adhesive layer 34B1 is provided between the color development layer 30 and the ultraviolet curable resin layer 34B2, it is possible to compensate for a decrease in adhesive force due to the developer contained in the color development layer 30. As the material of the pressure-sensitive adhesive layer 34B1, materials similar to those of the pressure-sensitive adhesive layers 22, 25, and 28 can be exemplified.

Modification Example 9

Figure 21:
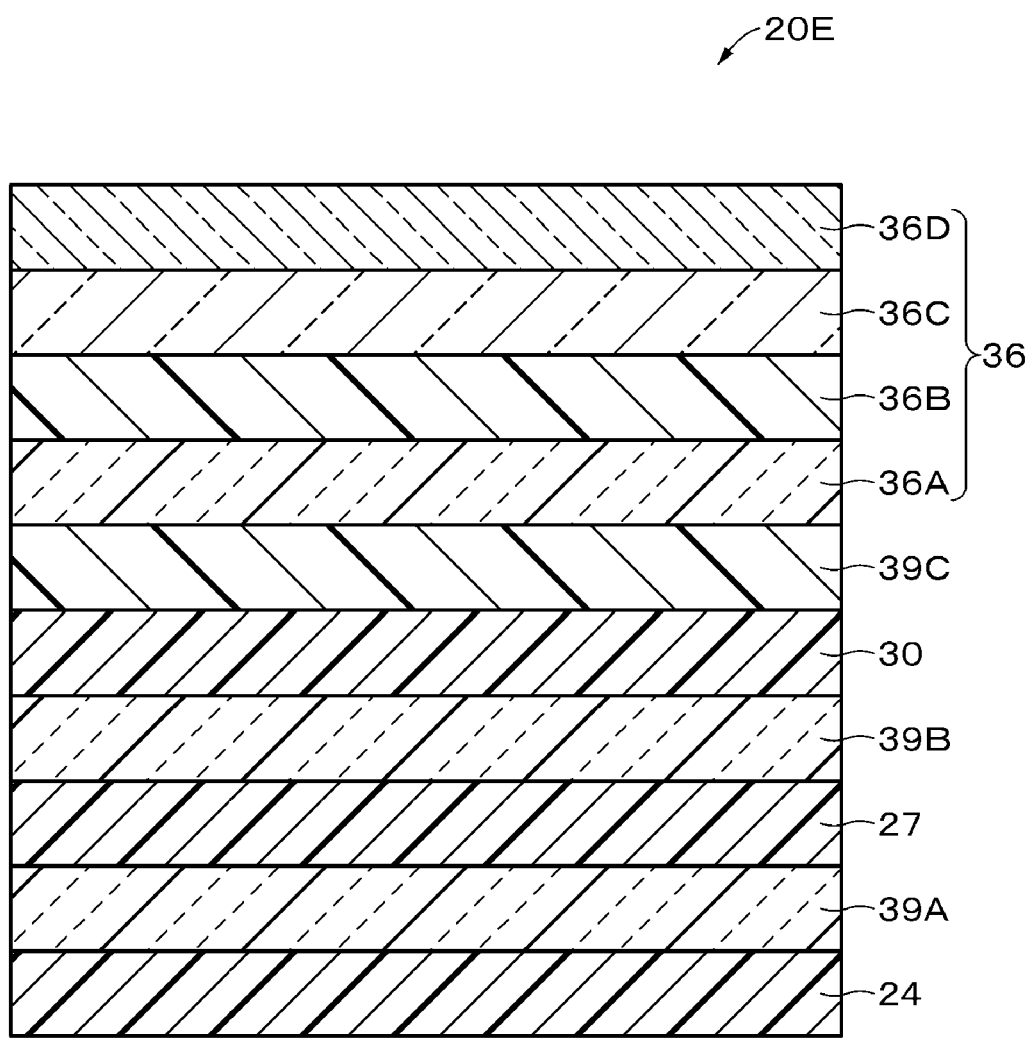
FIG. 21 is a cross-sectional view of a recording medium.

In the third embodiment, an example in which the laminate 10A includes the recording medium 20A has been described, but the laminate 10A may include a recording medium 20E illustrated in FIG. 21 instead of the recording medium 20A (see, FIG. 15). The recording medium 20E is different from the recording medium 20A in that the recording medium 20E includes intermediate layers 39A, 39B, and 39C instead of the intermediate layers 35A, 35B, and 35C. The recording medium 20E does not necessarily include the base material 21 and the pressure-sensitive adhesive layer 22.

The intermediate layers 39A and 39B are a film. The film is preferably a film subjected to easy adhesion treatment. As the material of the film, materials similar to those of the base material 11 can be exemplified. Examples of the easy adhesion treatment include primer treatment, active energy ray irradiation treatment, plasma treatment, corona treatment, vapor deposition treatment, etching treatment, sandblast treatment, and the like. One or a combination of two or more can be selected from these treatments. The primer treatment may be primer treatment with a resin, a silane coupling agent, tetraalkoxysilane, or the like.

Since the film subjected to easy adhesion treatment is provided as the intermediate layer 39A between the color development layer 24 and the color development layer 27, it is possible to compensate for a decrease in adhesion due to the developer contained in the color development layer 24. Since the film subjected to easy adhesion treatment is provided as the intermediate layer 39B between the color development layer 27 and the color development layer 30, it is possible to compensate for a decrease in adhesion due to the developer contained in the color development layer 27.

The intermediate layer 39C is a pressure-sensitive adhesive layer. As the material of the pressure-sensitive adhesive layer, materials similar to those of the pressure-sensitive adhesive layers 22, 25, and 28 can be exemplified. Since the pressure-sensitive adhesive layer is provided as the intermediate layer 39C between the color development layer 30 and the protective layer 36, it is possible to compensate for a decrease in adhesion due to the developer contained in the color development layer 30.

Modification Example 10

Figure 22:
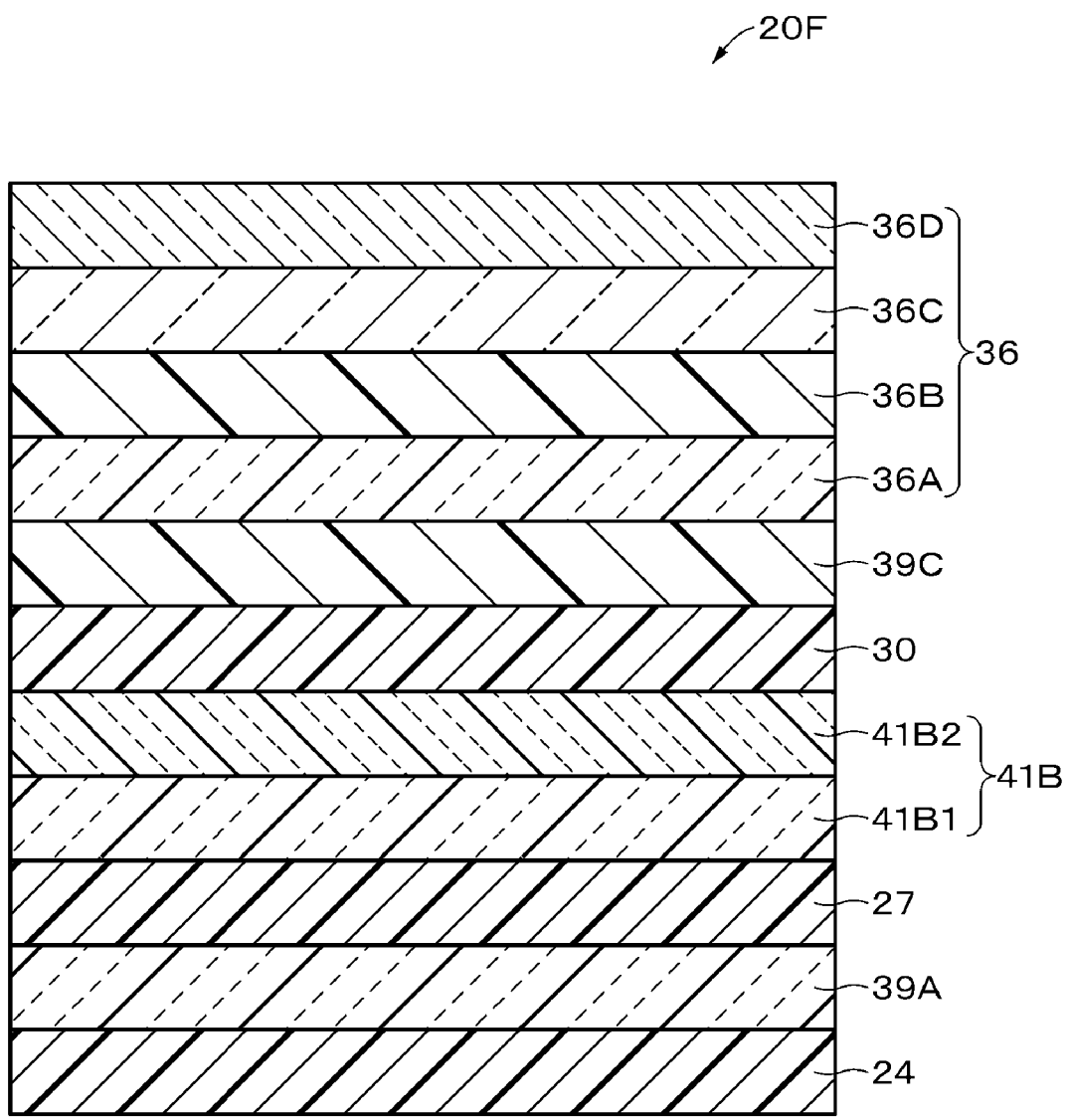
FIG. 22 is a cross-sectional view of a recording medium.

In the third embodiment, an example in which the laminate 10A includes the recording medium 20A has been described, but the laminate 10A may include a recording medium 20F illustrated in FIG. 22 instead of the recording medium 20A (see, FIG. 15). The recording medium 20F is different from the recording medium 20E in Modification Example 9 in that the recording medium 20F includes an intermediate layer 41B instead of the intermediate layer 39B.

The intermediate layer 41B includes a resin layer 41B1 and a resin layer 41B2 in order on one main surface of the color development layer 27. The resin layer 41B1 contains the same type of resin material as the matrix polymer contained in the color development layer 27. For example, in a case where the color development layer 27 contains a polycarbonate-based resin as a matrix polymer, the resin layer 41B1 contains a polycarbonate-based resin. The resin layer 41B2 is a film. The film is preferably a film subjected to easy adhesion treatment. As the material of the film, materials similar to those of the base material 11 can be exemplified.

As described above, since the resin layer 41B1 is provided between the color development layer 27 and the resin layer 41B2, it is possible to compensate for a decrease in adhesion due to the developer contained in the color development layer 27.

Modification Example 11

Figure 23:
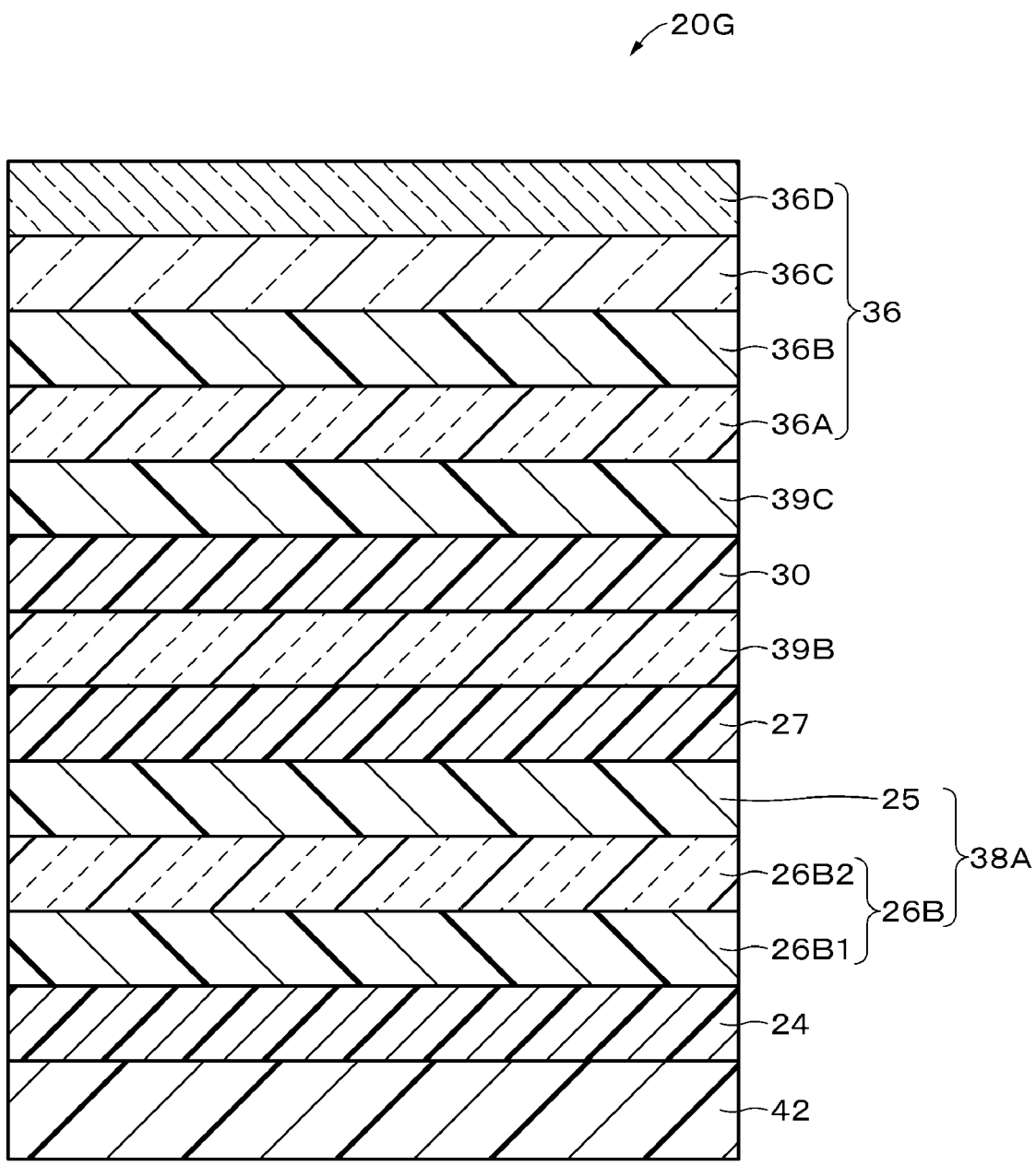
FIG. 23 is a cross-sectional view of a recording medium.

In the third embodiment, an example in which the laminate 10A includes the recording medium 20A has been described, but the laminate 10A may include a recording medium 20G illustrated in FIG. 23 instead of the recording medium 20A (see, FIG. 15). The recording medium 20G is different from the recording medium 20E in Modification Example 9 in that the recording medium 20G includes the intermediate layer 38A instead of the intermediate layer 39A, and includes a base material 42.

The intermediate layer 38A is as described in Modification Example 8 (see, FIG. 20). The base material 42 is provided adjacent to the other surface of the color development layer 24. The base material 42 is a film subjected to easy adhesion treatment. As the material of the film, materials similar to those of the base material 11 can be exemplified.

Modification Example 12

Figure 24:
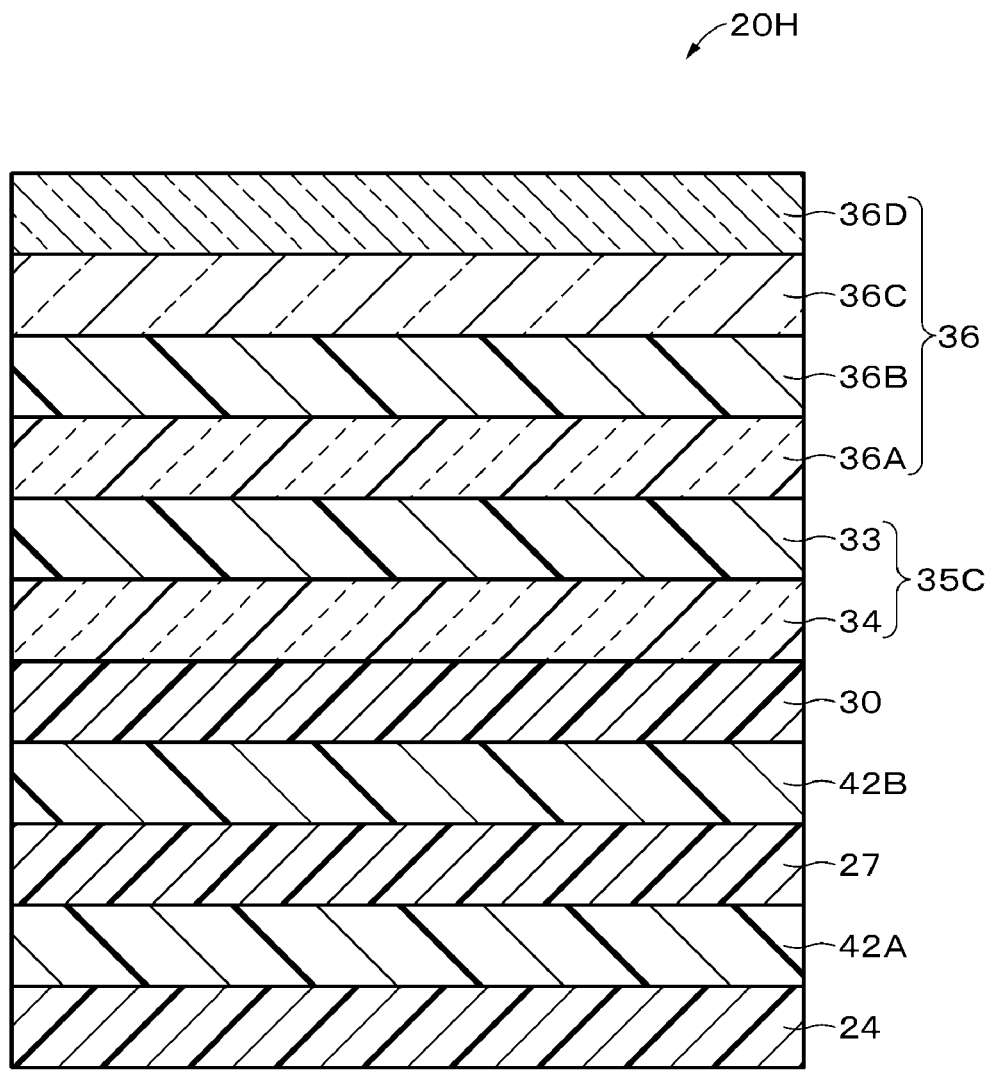
FIG. 24 is a cross-sectional view of a recording medium.

In the third embodiment, an example in which the laminate 10A includes the recording medium 20A has been described, but the laminate 10A may include a recording medium 20H illustrated in FIG. 24 instead of the recording medium 20A (see, FIG. 15). The recording medium 20H is different from the recording medium 20A in that the recording medium 20H includes intermediate layers 42A and 42B instead of the intermediate layers 35A and 35B.

The intermediate layers 42A and 42B are a pressure-sensitive adhesive layer. As the material of the pressure-sensitive adhesive layer, materials similar to those of the pressure-sensitive adhesive layers 22, 25, and 28 can be exemplified.

Modification Example 13

In the first and second embodiments, examples in which the laminate 10 includes the recording medium 20 have been described, but the laminate 10 may include the recording medium 20A instead of the recording medium 20.

Modification Example 14

In the third and fourth embodiments, examples in which the laminate 10A includes the recording medium 20A have been described, but the laminate 10A may include the recording medium 20 instead of the recording medium 20A.

Modification Example 15

In Modification Examples 7, 8, 9, 10, 11, and 12 described above, examples in which the laminate 10A according to the third embodiment includes any one of the recording media 20C, 20D, 20E, 20F, 20G, and 20H instead of the recording medium 20A have been described, but the present disclosure is not limited thereto. For example, the laminate 10 according to the first embodiment may include any one of the recording media 20C, 20D, 20E, 20F, 20G, and 20H instead of the recording medium 20. The laminate 40 according to the second embodiment may include any one of the recording media 20C, 20D, 20E, 20F, 20G, and 20H instead of the recording medium 20. The laminate 40A according to the fourth embodiment may include any one of the recording media 20C, 20D, 20E, 20F, 20G, and 20H instead of the recording medium 20A.

Modification Example 16

In the first, second, third, and fourth embodiments and the modification examples thereof, examples in which the laminates 10, 40, 10A, and 40A are applied to cards have been described, but the laminates 10, 40, 10A, and 40A may be applied to housings of medical supplies, automobile parts, automobiles, toys, foods, cosmetics, clothing items, documents (for example, passport and the like), exterior components, electronic devices, and the like. Specific examples of the exterior component include an interior or exterior of a wall and the like of a building, an exterior of furniture such as a desk and the like. Specific examples of the electronic device include personal computers (hereinafter referred to as "PC"), mobile devices, mobile phones (for example, a smartphone), tablet computers, display apparatuses, imaging apparatuses, audio devices, game devices, industrial devices, medical devices, robots, wearable terminals, and the like. Specific examples of the wearable terminal include clothing items such as watches (wristwatches), bags, clothes, hats, glasses, and shoes.

Hereinafter, specific examples in which the laminates 10, 40, 10A, and 40A are applied to a smartphone, a notebook personal computer, and a decorative container will be described.

Example of Smartphone

Figure 7:
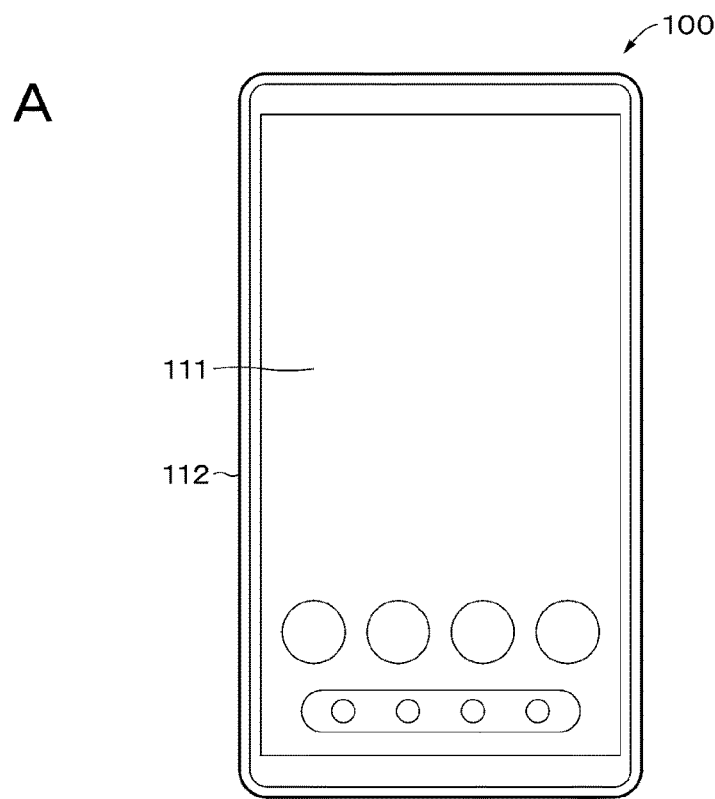
FIG. 7A is a plan view of a front surface of a smartphone.
FIG. 7B is a plan view of a back surface of the smartphone.
Figure 7:
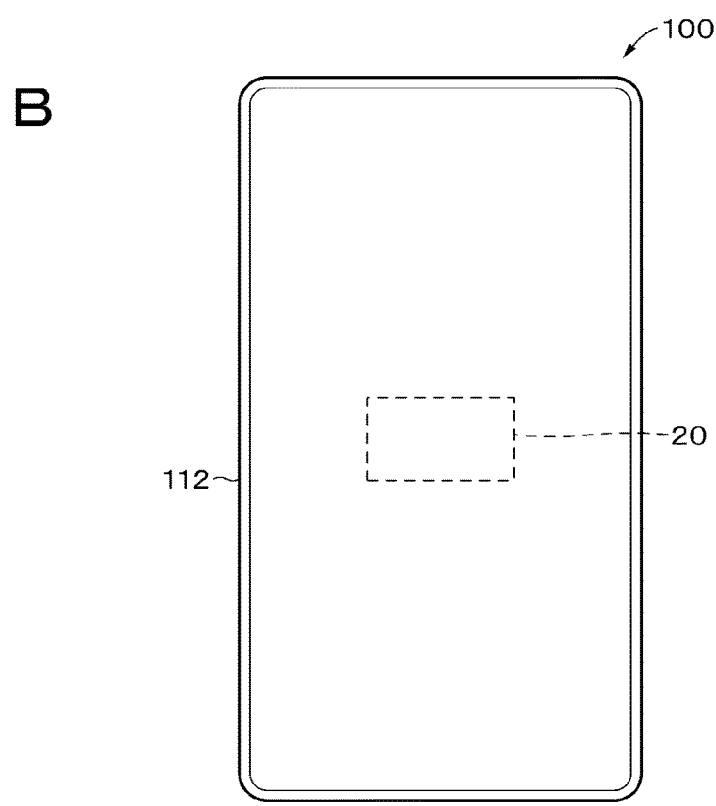

FIG. 7A illustrates an external configuration of the front surface of a smartphone 100, and FIG. 7B illustrates an external configuration of the back surface of the smartphone 100 illustrated in FIG. 7A. The smartphone 100 includes, for example, a display part 111 and a housing 112. The recording medium 20 is provided on the back side of the housing 112. The housing 112 includes a laminate. This laminate is similar to any one of the laminates 10, 40, 10A, and 40A according to the first, second, third, and fourth embodiments and the modification examples thereof except that the base material has a housing shape of the smartphone 100. Accordingly, the forgery preventing property and the like of the smartphone 100 can be improved.

Example of Notebook PC

Figure 8:
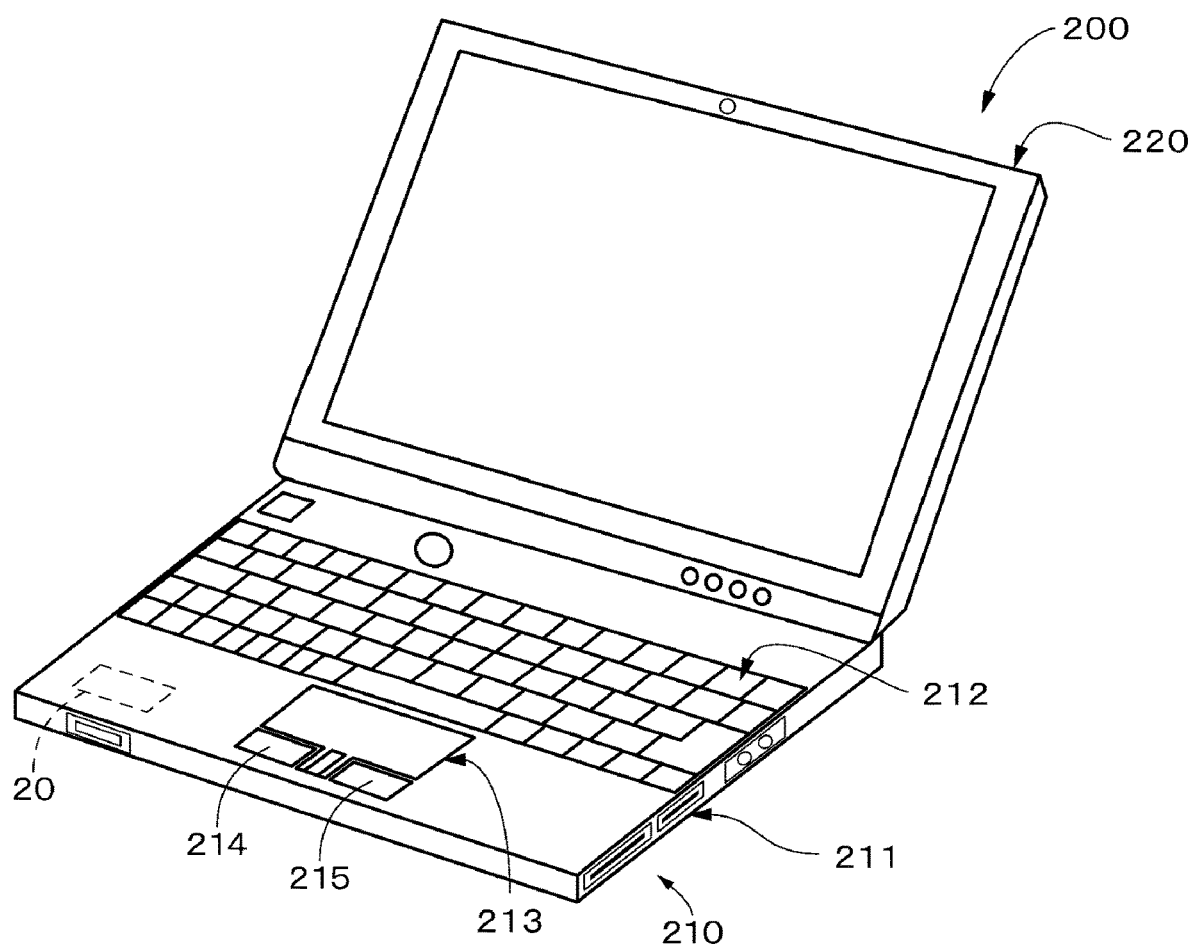
FIG. 8 is a perspective view of a notebook personal computer.

FIG. 8 illustrates an external configuration of a notebook PC 200. The notebook PC 200 includes a computer main body 210 and a display 220. The computer main body 210 includes a housing 211, a keyboard 212, a wheel/pad operation part 213, and click buttons 214 and 215. The housing 112 is provided with the recording medium 20. The housing 211 includes a laminate. This laminate is similar to any one of the laminates 10, 40, 10A, and 40A according to the first, second, third, and fourth embodiments and the modification examples thereof except that the base material has a housing shape of the notebook PC 200. Accordingly, the forgery preventing property and the like of the notebook PC 200 can be improved.

Example of Decorative Container

Figure 9:
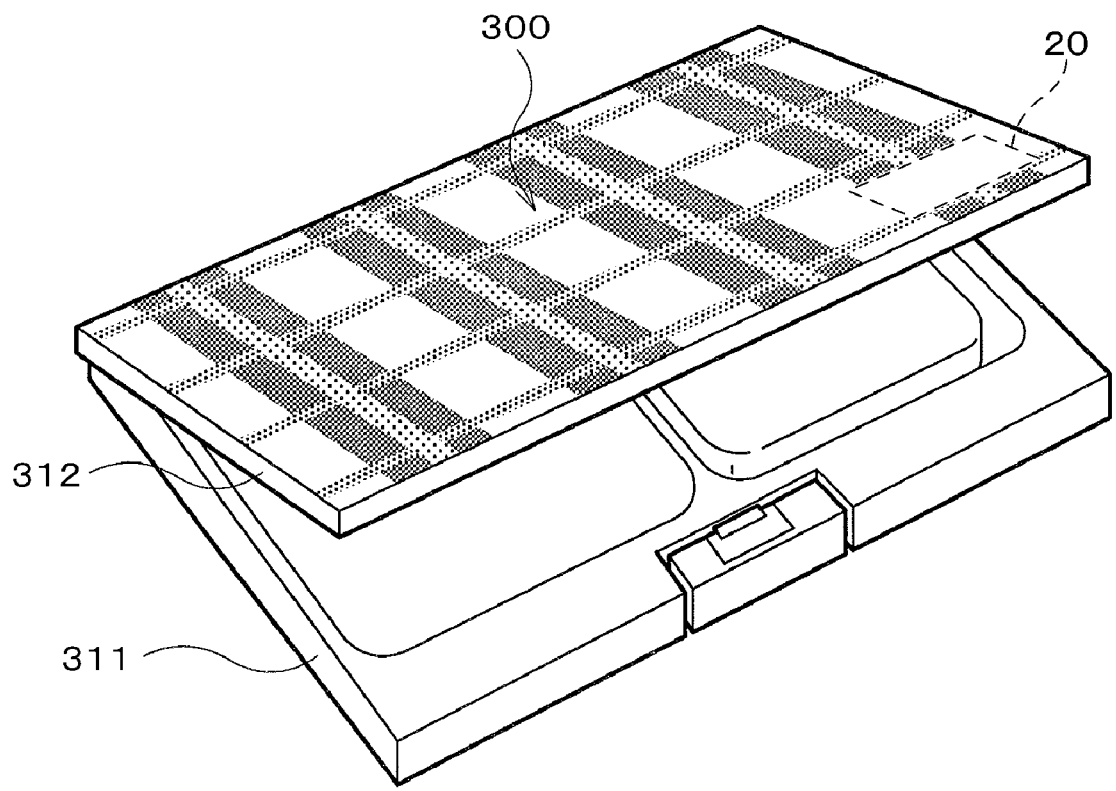
FIG. 9 is a perspective view of a decorative container.

FIG. 9 illustrates an appearance of a decorative container 300. The decorative container 300 includes an accommodation part 311 and a lid 312 that covers the accommodation part 311. The lid 312 is provided with the recording medium 20. The lid 312 includes a laminate. This laminate is similar to any one of the laminates 10, 40, 10A, and 40A according to the first, second, third, and fourth embodiments and the modification examples thereof except that the base material has a shape corresponding to the lid 312. Accordingly, the forgery preventing property and the like of the decorative container 300 can be improved.

Example of Passport

Figure 25:
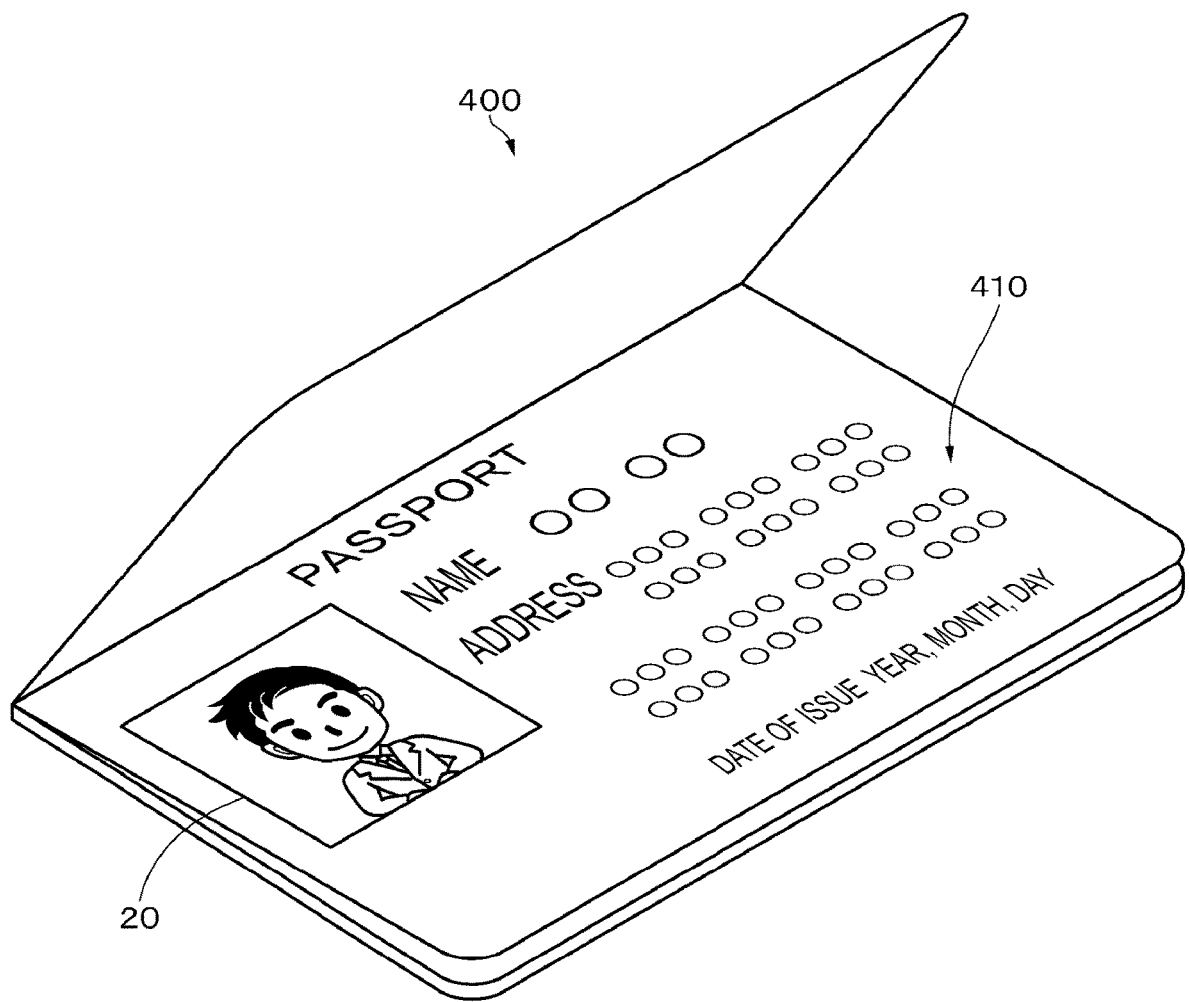
FIG. 25 is a perspective view of a booklet.

FIG. 25 illustrates an appearance of a booklet 400. The booklet 400 is a passport. The passport is an example of a booklet-type identification card. The booklet 400 includes a plurality of sheets 410. The plurality of sheets 410 is saddle-stitched. The recording medium 20 and the like are provided on at least one surface or both surfaces of the sheet 410. A face photograph or the like is drawn on the recording medium 20 and the like. The sheet 410 is similar to any one of the laminates 10, 40, 10A, and 40A according to the first, second, third, and fourth embodiments and the modification examples thereof. In this case, the base material 11 may be paper or the like.

Although the embodiments and modification examples of the present disclosure have been specifically described above, the present disclosure is not limited to the embodiments and modification examples described above, and various modifications based on the technical idea of the present disclosure are possible.

For example, the configurations, methods, processes, shapes, materials, numerical values, and the like described in the embodiments and modification examples described above are merely examples, and different configurations, methods, processes, shapes, materials, numerical values, and the like may be used as necessary. The configurations, methods, processes, shapes, materials, numerical values, and the like of the embodiments and modification examples described above can be combined with each other without departing from the gist of the present disclosure.

In the numerical range described in stages in the embodiments and modification examples described above, the upper limit or the lower limit of the numerical range of a certain stage may be replaced with the upper limit or the lower limit of the numerical range of another stage. The materials exemplified in the embodiments and modification examples described above can be used alone or in combination of two or more unless otherwise specified.

Furthermore, the present disclosure can adopt the following configurations.

(1)

A laminate including:
a base material;
an intermediate layer provided on the base material and having an accommodation part;
a recording medium provided in the accommodation part; and
an overlay layer provided on the intermediate layer, in which
the accommodation part is provided in a part of a plane of the intermediate layer,
the accommodation part is a through hole penetrating in a thickness direction of the intermediate layer or a recess recessed in a thickness direction of the intermediate layer,
the recording medium is configured to be capable of changing a colored state by an external stimulus, and
the base material and the intermediate layer are bonded to each other by fusion or a thermal adhesive, and the intermediate layer and the overlay layer are bonded to each other by fusion or a thermal adhesive.

(2)

The laminate according to (1), in which the thermal adhesive contains a thermosetting resin.

(3)

The laminate according to (1), in which
the base material and the intermediate layer are fused, and the intermediate layer and the overlay layer are fused, and
the base material, the intermediate layer, and the overlay layer contain a thermoplastic resin.

(4)

The laminate according to any one of (1) to (3), in which the recording medium is fitted in the accommodation part.

(5)

The laminate according to any one of (1) to (4), in which the external stimulus is laser light.

(6)

The laminate according to any one of (1) to (5), in which a change in the colored state is an irreversible change.

(7)

The laminate according to any one of (1) to (6), in which
the recording medium includes a first color development layer to an nth color development layer, (provided that, n is an integer of 2 or more), and
the first color development layer to the nth color development layer contain coloring compounds developing colors of different hues from one another.

(8)

The laminate according to any one of (1) to (6), in which
the recording medium includes a first color development layer, a second color development layer, and a third color development layer, and
the first color development layer, the second color development layer, and the third color development layer contain coloring compounds developing colors of different hues from one another.

(9)

The laminate according to any one of (1) to (6), in which the recording medium includes a color development layer containing three types of microcapsules developing colors of different hues from one another.

(10)

The laminate according to any one of (1) to (6), in which
the recording medium includes a color development layer, and
the color development layer contains:
a coloring compound having an electron donating property;
a developer having an electron accepting property; and
a photothermal conversion material.

(11)

A card including the laminate according to any one of (1) to (10).

(12)

A housing including the laminate according to any one of (1) to (10).

Furthermore, the present disclosure can adopt the following configurations.

(21)

A laminate including:
a base material;
a first intermediate layer provided on the base material and having an accommodation part;
a recording medium provided in the accommodation part; and
an overlay layer provided on the first intermediate layer, in which
the accommodation part is provided in a part of a plane of the first intermediate layer, the accommodation part is a through hole penetrating in a thickness direction of the first intermediate layer or a recess recessed in a thickness direction of the first intermediate layer, the recording medium includes a color development layer containing: a coloring compound having an electron donating property; a developer having an electron accepting property; and a matrix resin, the base material, the first intermediate layer, and the overlay layer contain the same type of resin material, and the base material and the first intermediate layer are bonded to each other by fusion, and the first intermediate layer and the overlay layer are bonded to each other by fusion.

(22)

A laminate including:

a base material;

a first intermediate layer provided on the base material and having an accommodation part;

a recording medium provided in the accommodation part; and an overlay layer provided on the first intermediate layer, in which the accommodation part is provided in a part of a plane of the first intermediate layer, the accommodation part is a through hole penetrating in a thickness direction of the first intermediate layer or a recess recessed in a thickness direction of the first intermediate layer, the recording medium includes a color development layer containing: a coloring compound having an electron donating property; a developer having an electron accepting property; and a matrix resin, the base material, the first intermediate layer, and the overlay layer contain the same type of resin material, and the base material and the first intermediate layer are bonded to each other by a thermal adhesive, and the first intermediate layer and the overlay layer are bonded to each other by a thermal adhesive.

(23)

The laminate according to (21) or (22), in which the resin material contains a thermoplastic resin.

(24)

The laminate according to (21) or (22), in which the resin material contains a polycarbonate-based resin.

(25)

The laminate according to (21) or (22), in which the resin material contains a polyethylene terephthalate-based resin.

(26)

The laminate according to (22), in which the thermal adhesive contains a thermosetting resin.

(27)

The laminate according to any one of (21) to (26), in which the color development layer is configured to be capable of changing a colored state by laser light, and a change in the colored state is an irreversible change.

(28)

The laminate according to any one of (21) to (27), in which the color development layer further contains a photothermal conversion material.

(29)

The laminate according to any one of (21) to (28), in which the recording medium includes a plurality of the color development layers, and the plurality of color development layers contain coloring compounds developing colors of different hues from one another.

(30)

The laminate according to any one of (21) to (28), in which the recording medium includes a plurality of the color development layers and a plurality of second intermediate layers, and each of the plurality of second intermediate layers is provided between the color development layers adjacent to each other.

(31)

The laminate according to (30), in which at least one of the plurality of second intermediate layers includes an ultraviolet curable resin layer and a pressure-sensitive adhesive layer.

(32)

The laminate according to (30), in which at least one of the plurality of second intermediate layers includes a resin layer, an ultraviolet curable resin layer, and a pressure-sensitive adhesive layer, the ultraviolet curable resin layer is provided between the resin layer and the pressure-sensitive adhesive layer, and the resin layer contains a resin material of the same type as the matrix resin.

(33)

The laminate according to (30), in which at least one of the plurality of second intermediate layers includes a first pressure-sensitive adhesive layer, an ultraviolet curable resin layer, and a second pressure-sensitive adhesive layer in order.

(34)

The laminate according to (30), in which at least one of the plurality of second intermediate layers is a film subjected to easy adhesion treatment.

(35)

The laminate according to any one of (21) to (28), in which the recording medium includes a plurality of the color development layers, a plurality of second intermediate layers, and a protective layer, the plurality of color development layers includes a first color development layer, a second color development layer, and a third color development layer, the first color development layer, the second intermediate layer, the second light emitting layer, the second intermediate layer, the third color development layer, the second intermediate layer, and the protective layer are laminated in this order, and the first color development layer, the second color development layer, and the third color development layer contain coloring compounds developing colors of different hues from one another.

(36)

The laminate according to any one of (21) to (35), in which a proportion of the developer in a total amount of the developer and the matrix resin is 16 mass % or less.

(37)

A card including the laminate according to any one of (21) to (36).

(38)

A housing including the laminate according to any one of (21) to (36).

6 Reference Examples and Examples

Hereinafter, the present disclosure will be specifically described with reference examples and examples, but the present disclosure is not limited to these reference examples and examples.

Reference Example 1-1

First, a first adhesive layer was disposed on a base material, and then an intermediate layer was disposed on the first adhesive layer. Next, a second adhesive layer was disposed on the intermediate layer, and then an overlay layer was disposed on the second adhesive layer to obtain a laminated structure. Next, the laminated structure was heated and pressurized at a temperature of 120° C. to bond the base material and the intermediate layer to each other with the first adhesive layer interposed therebetween, and to bond the intermediate layer and the overlay layer to each other with the second adhesive layer interposed therebetween. As described above, an intended laminate was obtained.

As the base material, the first adhesive layer, the intermediate layer, the second adhesive layer, and the overlay layer, the following materials were used.
- Overlay layer: 50 µm-thick polycarbonate film (hereinafter, referred to as "PC film")
- Second intermediate layer: 5 µm-thick epoxy-based resin layer (thermosetting resin layer)
- Intermediate layer: 100 µm-thick PC film
- First adhesive layer: 5 µm-thick epoxy-based resin layer (thermosetting resin layer)
- Base material: 25 µm-thick PC film Reference Example 1-2

A laminate was obtained in a similar manner to Reference 1-1, except that the followings were used as the base material, the intermediate layer, and the overlay layer.
- Overlay layer: 50 µm-thick polyvinyl chloride film (hereinafter, referred to as "PVC film")
- Intermediate layer: 100 µm-thick PVC vinyl film
- Base material: 25 µm-thick PVC vinyl film Reference Example 1-3

A laminate was obtained in a similar manner to Reference 1-1, except that the followings were used as the base material, the intermediate layer, and the overlay layer.
- Overlay layer: 50 µm-thick polyethylene terephthalate film (hereinafter, referred to as "PET film")
- Intermediate layer: 100 µm-thick PET film
- Base material: 25 µm-thick PET film Reference Example 1-4

A laminate was obtained in a similar manner to Reference 1-1, except that the followings were used as the base material, the intermediate layer, and the overlay layer.
- Overlay layer: 50 µm-thick PC film
- Intermediate layer: 100 µm-thick PVC film
- Base material: 25 µm-thick PC film Reference Examples 2-1, 2-2, 2-3, 2-4

Laminates were obtained in a similar manner to Reference Examples 1-1, 1-2, 1-3, and 1-4, except that the base material, the intermediate layer, and the overlay layer were sequentially laminated to obtain a laminated structure, and then the laminated structure was heated and pressurized at a temperature of 180° C. to fuse the base material and the intermediate layer and fuse the intermediate layer and the overlay layer.

[Evaluation]

The adhesion, environmental consideration, and durability of the laminates obtained as described above were evaluated as follows.

(Adhesion)

First, the average peel strength between the base material and the intermediate layer and the average peel strength between the intermediate layer and the overlay layer were measured. The average peel strength was measured by the method for measuring the average peel strength of the laminate described in the first embodiment. Next, the measured average peel strength was evaluated according to the following criteria. The evaluation results are shown in Table 1.

⊙: The average peel strength between the base material and the intermediate layer and the average peel strength between the intermediate layer and the overlay layer are both 5.0 N/cm or more.

○: The average peel strength between the base material and the intermediate layer and the average peel strength between the intermediate layer and the overlay layer are both 3.5 N/cm or more.

x: The average peel strength between the base material and the intermediate layer and the average peel strength between the intermediate layer and the overlay layer are both less than 3.5 N/cm.

(Environmental Consideration)

The environmental consideration of the laminate was evaluated according to the following criteria. The evaluation results are shown in Table 1.

○: There is no possibility that harmful substances (particularly, dioxin) are generated when the laminate is treated with insufficient equipment.

x: There is a possibility that harmful substances (particularly, dioxin) are generated when the laminate is treated with insufficient equipment.

(Durability)

In accordance with ISO/IEC 10373-1, the durability of the laminate was evaluated according to the following criteria. The evaluation results are shown in Table 1.

○: a case where there is no change (warpage) in appearance after heating x: a case where appearance change (warpage) occurs after heating

TABLE 1

|  | Reference Example 1-1 | Reference Example 1-2 | Reference Example 1-3 | Reference Example 1-4 | Reference Example 2-1 | Reference Example 2-2 | Reference Example 2-3 | Reference Example 2-4 |
|---|---|---|---|---|---|---|---|---|
| Overlay layer | PC | PVC | PET | PC | PC | PVC | PET | PC |
| Second adhesive layer | Thermosetting resin (epoxy-based resin) | | | | | | None | |
| Intermediate layer | PC | PVC | PET | Vinyl chloride | PC | PVC | PET | Vinyl chloride |
| First adhesive layer | Thermosetting resin (epoxy-based resin) | | | | | | None | |
| Base material | PC | PVC | PET | PC | PC | PVC | PET | PC |
| Adhesion | ○ | ○ | ○ | ○ | ⊙ | ⊙ | ⊙ | ⊙ |
| Environmental consideration | ○ | X | ○ | X | ○ | X | ○ | X |
| Durability* | ○ | ○ | ○ | X | ○ | ○ | ○ | X |

*Change in appearance after heating (warpage)

The following can be seen from Table 1.

When the base material and the intermediate layer, and the intermediate layer and the overlay layer are respectively bonded by a thermosetting resin or fusion, good adhesion can be obtained.

From the viewpoint of improving adhesion, it is preferable to bond the base material and the intermediate layer and bond the intermediate layer and the overlay layer by fusion.

From the viewpoint of environmental consideration, it is preferable to use a PC film or a PET film as the base material, the intermediate layer, and the overlay layer.

From the viewpoint of improving durability, it is preferable to use a PC film or a PVC film as the base material, the intermediate layer, and the overlay layer.

From the viewpoint of improving environmental consideration and durability, it is preferable to use a PC film as the base material, the intermediate layer, and the overlay layer.

Examples 1 to 3

First, the layers shown in Table 2 were laminated to thereby prepare a recording medium having the layer configuration illustrated in FIG. 15. Next, a 100 μm-thick PET film having a frame shape (see FIG. 16) was prepared as an intermediate layer, and a recording medium was fitted in the frame of the PET film. The thickness of the recording medium and the PET film was set to be substantially the same. Next, a laminate was obtained in a similar manner to Reference Example 2-1 except that the intermediate layer in which the recording medium was fitted as described above was used. Note that the interface of the recording medium is also bonded by a heating and pressurizing process after the base material, the intermediate layer, and the overlay layer are laminated.

Example 4

A laminate was obtained in a similar manner to Example 1 except that a recording medium having the layer configuration illustrated in FIG. 24 was prepared by laminating the layers shown in Table 3.

Example 5

A laminate was obtained in a similar manner to Example 1 except that a recording medium having the layer configuration illustrated in FIG. 19 was prepared by laminating the layers shown in Table 3.

Example 6

A laminate was obtained in a similar manner to Example 1 except that a recording medium having the layer configuration illustrated in FIG. 20 was prepared by laminating the layers shown in Table 3.

Example 7

A laminate was obtained in a similar manner to Example 1 except that a recording medium having the layer configuration illustrated in FIG. 21 was prepared by laminating the layers shown in Table 4.

Example 8

A laminate was obtained in a similar manner to Example 1 except that a recording medium having the layer configuration illustrated in FIG. 22 was prepared by laminating the layers shown in Table 4.

Example 9

A laminate was obtained in a similar manner to Example 1 except that a recording medium having the layer configuration illustrated in FIG. 21 was prepared by laminating the layers shown in Table 4.

Example 10

A laminate was obtained in a similar manner to Example 1 except that a recording medium having the layer configuration illustrated in FIG. 23 was prepared by laminating the layers shown in Table 4.

[Evaluation]

The adhesion and durability of the laminates obtained as described above were evaluated as follows.

(Adhesion)

First, the average peel strength between the layers of the laminate was measured. The average peel strength was measured by the method for measuring the average peel strength of the laminate described in the first embodiment. Next, the measured average peel strength was evaluated according to the following criteria. Among the average peel strengths between the layers of the laminate, the lowest average peel strength is shown in Tables 2, 3, and 4. In addition, the position of the interface having the lowest average peel strength is shown in Tables 2, 3, and 4.
  ○: The average peel strengths between the layers are all 3.5 N/cm or more.
  x: At least one of the average peel strengths between the layers is less than 3.5 N/cm.

(Forgery Preventing Property)

The forgery preventing property of the laminate was evaluated according to the following criteria.
- ○: At least one of the following condition (1) or condition (2) is satisfied.
- x: The following conditions (1) and (2) are not satisfied.

Condition (1): The average peel strengths between the layers of the laminate are all 3.5 N/cm or more.

Condition (2): An interface having the lowest average peel strength is located between the color development layer and the color development layer.

(Maximum color development OD)

First, the maximum color development OD of the laminate was measured with a spectrophotometer/densitometer, eXact (manufactured by X-Rite, Incorporated). Next, color developability was evaluated according to the following criteria. The evaluation results are shown in Tables 2, 3, and 4.

- ○: The maximum color development OD is 1.0 or more. The OD value of 1.0, at which a person can be recognized when a person is drawn, is used as a reference.
- x: The maximum color development OD is less than 1.0. With an OD value of less than 1.0, it is difficult to recognize a person when a person is drawn.

(Color Gamut Retention after Heating)

First, the color gamut retention after heating was measured with a spectrophotometer/densitometer, eXact. Next, the color gamut retention after heating was evaluated according to the following criteria. The evaluation results are shown in Tables 2, 3, and 4.

- ○: The color gamut retention after heating is 80% or more.
- x: The color gamut retention after heating is less than 80%.

Note that, with a color gamut retention of 80% or more, color representation of a person is sufficient when a person is drawn.

TABLE 2

|  |  | Example 1 | Example 2 | Example 3 |
|---|---|---|---|---|
| Recording medium | Overlay layer | PC | PC | PC |
|  | (12) Protective layer | PET | PC | PC |
|  |  | OCA | OCA | OCA |
|  |  | UV cut layer | UV cut layer | UV cut layer |
|  |  | UV resin | UV resin | UV resin |
|  | (11) Pressure-sensitive adhesive layer | OCA | OCA | OCA |
|  | (10) Heat insulating layer | UV resin | UV resin | UV resin |
|  | (9) Color development layer | Color development layer Y1 | Color development layer Y1 | Color development layer Y2 |
|  | (8) Pressure-sensitive adhesive layer | OCA | OCA | OCA |
|  | (7) Heat insulating layer | UV resin | UV resin | UV resin |
|  | (6) Color development layer | Color development layer C1 | Color development layer C1 | Color development layer C2 |
|  | (5) Pressure-sensitive adhesive layer | OCA | OCA | OCA |
|  | (4) Heat insulating layer | UV resin | UV resin | UV resin |
|  | (3) Color development layer | Color development layer M1 | Color development layer M1 | Color development layer M2 |
|  | (2) Pressure-sensitive adhesive layer | OCA | OCA | OCA |
|  | (1) Base material | PET | PC | PC |
| Base material |  | PC | PC | PC |
| Adhesion | Average peel strength [N/cm] | 0.3 | 0.3 | 7.0 |
|  | Evaluation result | X | X | ○ |
|  | Interface with lowest average peel strength | Interface between (6) color development layer and (7) heat insulating layer | Interface between (6) color development layer and (7) heat insulating layer | Interface between UV cut layer and OCA in (12) protective layer |
| Forgery preventing property | Evaluation result | ○ | ○ | ○ |
| Color developability | Evaluation result | ○ | ○ | X |
| Color gamut | Evaluation result | ○ | ○ | ○ |

TABLE 3

|  |  | Example 2 | Example 4 | Example 5 | Example 6 |
|---|---|---|---|---|---|
| Recording medium | Overlay layer | PC | PC | PC | PC |
|  | (12) Protective layer | PC | PC | PC | PC |
|  |  | OCA | OCA | OCA | OCA |
|  |  | UV cut layer | UV cut layer | UV cut layer | UV cut layer |
|  |  | UV resin | UV resin | UV resin | UV resin |
|  | (11) Pressure-sensitive adhesive layer | OCA | OCA | OCA | DCA |

TABLE 3-continued

|  |  | Example 2 | Example 4 | Example 5 | Example 6 |
|---|---|---|---|---|---|
|  | (10) Heat insulating layer | UV resin | UV resin | UV resin Matrix polymer layer | UV resin OCA |
|  | (9) Color development layer | Color development layer Y1 | Color development layer Y1 | Color development layer Y1 | Color development layer Y1 |
|  | (8) Pressure-sensitive adhesive layer | OCA | OCA | OCA | OCA |
|  | (7) Heat insulating layer | UV resin | None | UV resin Matrix polymer layer | UV resin OCA |
|  | (6) Color development layer | Color development layer C1 | Color development layer C1 | Color development layer C1 | Color development layer 1 |
|  | (5) Pressure-sensitive adhesive layer | OCA | OCA | OCA | OCA |
|  | (4) Heat insulating layer | UV resin | None | UV resin Matrix polymer layer | UV resin OCA |
|  | (3) Color development layer | Color development layer M1 | Color development layer M1 | Color development layer M1 | Color development layer M1 |
|  | (2) Pressure-sensitive adhesive layer | OCA | None | None | None |
|  | (1) Base material | PC | None | None | None |
| Base material |  | PC | PC | PC | PC |
| Adhesion | Average peel strength [N/cm] | 0.3 | 6.5 | 5.0 | 7.0 |
|  | Evaluation result | X | ◯ | ◯ | ◯ |
|  | Interface with lowest average peel strength | Interface between (6) color development layer and (7) heat insulating layer | Interface between UV cut layer and OCA in (12) protective layer | Interface between UV cut layer and OCA in (12) protective layer | Interface between UV cut layer and OCA in (12) protective layer |
| Forgery preventing property | Evaluation result | ◯ | ◯ | ◯ | ◯ |
| Color developability | Evaluation result | ◯ | ◯ | X | ◯ |
| Color gamut | Evaluation result | ◯ | X | ◯ | ◯ |

TABLE 4

|  |  | Example 2 | Example 7 | Example 8 | Example 9 | Example 10 |
|---|---|---|---|---|---|---|
|  | Overlay layer | PC | PC | PC | PC | PET |
| Recording medium | (12) Protective layer | PC OCA UV cut layer UV resin | PC OCA UV cut layer UV resin | PC OCA UV cut layer UV resin | PC OCA UV cut layer UV resin | PET OCA UV cut layer UV resin |
|  | (11) Pressure-sensitive adhesive layer | OCA | OCA | OCA | OCA | OCA |
|  | (10) Heat insulating layer | UV resin | None | None | None | None |
|  | (9) Color development layer | Color development layer Y1 | Color development layer Y1 | Color development layer Y1 | Color development layer Y1 | Color development layer Y1 |
|  | (8) Pressure-sensitive adhesive layer | OCA | None | None | None | None |
|  | (7) Heat insulating layer | UV resin | PC | PC Matrix polymer layer | Easy adhesion-treated PET | Easy adhesion-treated PET |
|  | (6) Color development layer | Color development layer C1 | Color development layer C1 | Color development layer C1 | Color development layer C1 | Color development layer C1 |
|  | (5) Pressure-sensitive adhesive layer | OCA | None | None | None | OCA |
|  | (4) Heat insulating layer | UV resin | PC | PC | PC | UV resin OCA |
|  | (3) Color development layer | Color development layer M1 | Color development layer M1 | Color development layer M1 | Color development layer M1 | Color development layer M1 |

TABLE 4-continued

|  |  | Example 2 | Example 7 | Example 8 | Example 9 | Example 10 |
|---|---|---|---|---|---|---|
|  | (2) Pressure-sensitive adhesive layer | OCA | None | None | None | None |
|  | (1) Base material | PC | None | None | None | Easy adhesion-treated PET |
|  | Base material | PC | PC | PC | PC | PET |
| Adhesion | Average peel strength [N/cm] | 0.3 | 1.0 | 6.0 | 7.0 | 7.0 |
|  | Evaluation result | X | X | ○ | ○ | ○ |
|  | Interface with lowest average peel strength | Interface between (6) color development layer and (7) heat insulating layer | Interface between (6) color development layer and (7) heat insulating layer | Interface between UV cut layer and OCA layer in (12) protective layer | Interface between UV cut layer and OCA layer in (12) protective | Interface between UV cut layer and OCA layer in (12) protective |
| Forgery preventing property | Evaluation result | ○ | ○ | ○ | ○ | ○ |
| Color developability | Evaluation result | ○ | ○ | ○ | ○ | ○ |
| Color gamut | Evaluation result | ○ | ○ | ○ | ○ | ○ |

Details of each member described in Tables 2, 3, and 4 are as follows.
PC: PC film
PET: PET film
Easy adhesion-treated PET: PET film subjected to easy adhesion treatment (DIAFOIL (registered trademark) manufactured by Mitsubishi Chemical Corporation)
OCA: optical clear adhesive
UV resin: ultraviolet curable resin layer (acrylic resin layer for hard coat)
Matrix polymer layer: resin layer (specifically, polycarbonate-based resin layer) containing the same type of polymer as matrix polymer contained in adjacent color development layer
Color development layer Y1: color development layer containing: leuco dye that develops yellow color; developer; and polycarbonate-based resin, in which the content of the polycarbonate-based resin in the color development layer is 58 mass %
Color development layer Y2: color development layer containing: leuco dye that develops yellow color; developer; and polycarbonate-based resin, in which the content of the polycarbonate-based resin in the color development layer is 58 mass %
Color development layer C1: color development layer containing: leuco dye that develops cyan color; developer; and polycarbonate-based resin, in which the content of the polycarbonate-based resin in the color development layer is 65 mass %
Color development layer C2: color development layer containing: leuco dye that develops cyan color; developer; and polycarbonate-based resin, in which the content of the polycarbonate-based resin in the color development layer is 65 mass %
Color development layer M1: color development layer containing: leuco dye that develops magenta color; developer; and polycarbonate-based resin, in which the content of the polycarbonate-based resin in the color development layer is 58 mass %
Color development layer M2: color development layer containing: leuco dye that develops magenta color; developer; and polycarbonate-based resin, in which the content of the polycarbonate-based resin in the color development layer is 58 mass %

The following can be seen from Tables 2, 3, and 4.

When the intermediate layer between the color development layers includes the matrix polymer layer, the ultraviolet curable resin layer, and the pressure-sensitive adhesive layer, adhesion between the color development layer and the intermediate layer can be improved (see, the evaluation results of Example 5).

When the intermediate layer between the color development layers includes the pressure-sensitive adhesive layer, the ultraviolet curable resin layer, and the pressure-sensitive adhesive layer, the adhesion between the color development layer and the intermediate layer can be improved (see, the evaluation results of Examples 6 and 10).

When the intermediate layer between the color development layers includes the matrix polymer layer and the film, the adhesion between the color development layer and the intermediate layer can be improved (see, the evaluation results of Example 8).

When the intermediate layer between the color development layers includes the easily adhesion-treated film, the adhesion between the color development layer and the intermediate layer can be improved (see, the evaluation results of Examples 9 and 10).

Reference Examples 3-1 to 3-8

A PC film having a thickness of 25 μm, a polycarbonate-based resin-containing layer having a thickness of 5 μm, and a PC film having a thickness of 25 μm were laminated, and then the laminate was heated and pressurized at a temperature of 180° C. to be fused, thereby obtaining a sample. As the polycarbonate-based resin-containing layer, a layer having the composition shown in Table 5 was used.

(Adhesion)

First, the average peel strength between the layers of the sample was measured. The average peel strength was measured by the method for measuring the average peel strength of the laminate described in the first embodiment. Next, the measured average peel strength was evaluated according to the following criteria.

○: The average peel strengths between the layers are all 3.5 N/cm or more.

x: At least one of the average peel strengths between the layers is less than 3.5 N/cm.

Figure 26:
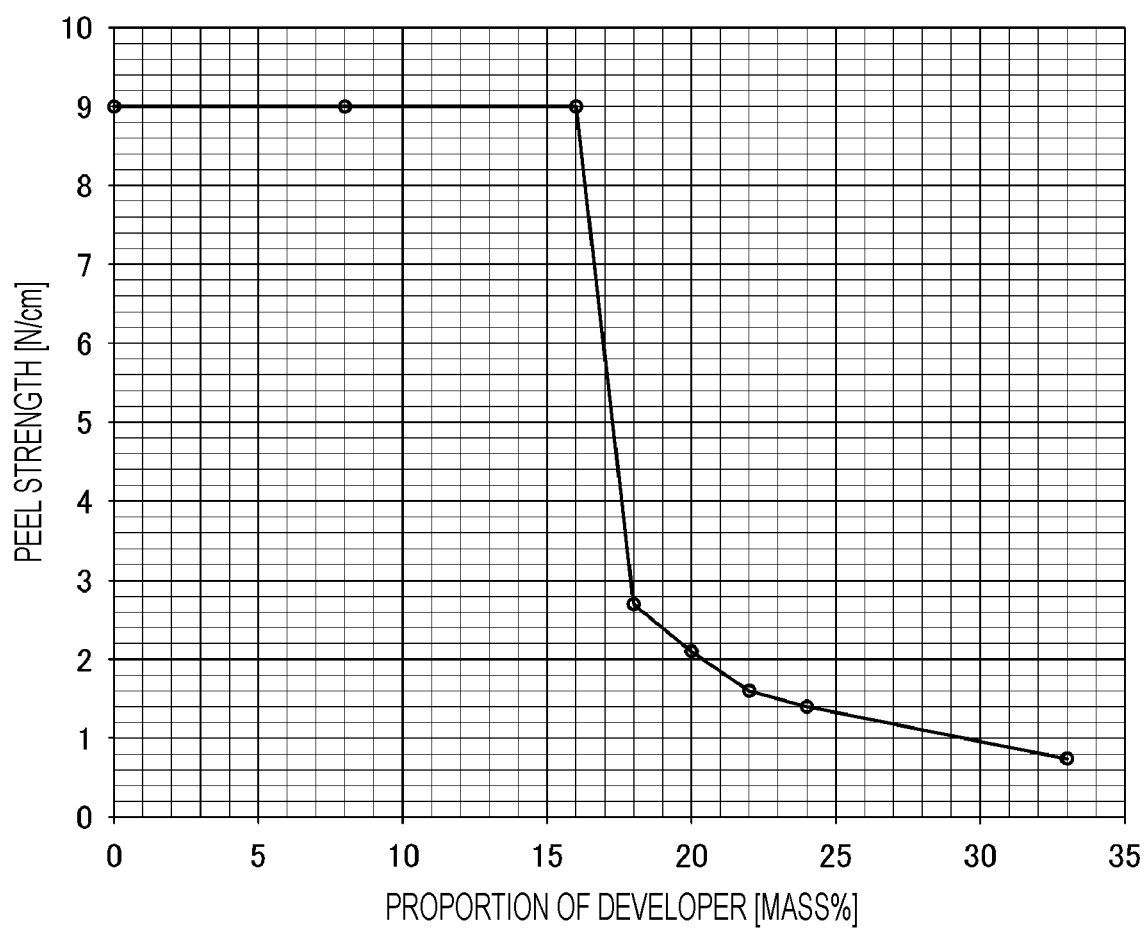
FIG. 26 is a graph showing measurement results of peel strength of a sample.

The evaluation results are shown in Table 5 and FIG. 26. Note that the average peel strength shown in Table 5 represents the average peel strength between the polycarbonate-based resin-containing layer and the PC film.

TABLE 5

| | | Reference Example 3-1 | Reference Example 3-2 | Reference Example 3-3 | Reference Example 3-4 | Reference Example 3-5 | Reference Example 3-6 | Reference Example 3-7 | Reference Example 3-8 |
|---|---|---|---|---|---|---|---|---|---|
| Layer configuration of sample | | PC film (thickness: 25 μm) PC-based resin-containing layer (thickness: 5 μm) PC film (thickness: 25 μm) | | | | | | | |
| Composition of PC-based resin-containing layer | Matrix polymer [mass %] | 100 | 92 | 84 | 82 | 80 | 78 | 76 | 67 |
| | Developer [mass %] | 0 | 8 | 16 | 18 | 20 | 22 | 24 | 33 |
| Adhesion | Average peel strength [N/cm] | 9.0 | 9.0 | 9.0 | 2.7 | 2.1 | 1.6 | 1.4 | 0.7 |
| | Evaluation result | ○ | ○ | ○ | X | X | X | X | X |

Details of each member and each material described in Table 5 are as follows.

OCA: optical clear adhesive

Ultraviolet curable resin layer: acrylic resin layer for hard coat

Matrix polymer: polycarbonate-based resin

Developer: compound represented by Formula (3)

Table 5 and FIG. 26 show that when the proportion of the developer in the total amount of the developer and the matrix polymer is 16 mass % or less, the peel strength can be 3.5 N/cm or more.

REFERENCE SIGNS LIST 10, 10A, 40, 40A Laminate
11, 21, 51 Base material
12, 14 Adhesive layer
13, 16 Intermediate layer
13A, 16A Accommodation part
15 Overlay layer
20, 20A, 20B, 20C, 20D, 20E, 20F, 20G, 20H, 50 Recording medium
22, 25, 28, 33 Pressure-sensitive adhesive layer
23, 26, 29, 34, 26A, 29A, 34A, 26B, 29B, 34B Heat insulating layer
24, 27, 30, 52 Color development layer
26A1, 29A1, 34A1 Resin layer
26A2, 29A2, 34A2, 26B2, 29B2, 34B2 Ultraviolet curable resin layer
26B1, 29B1, 34B1 Pressure-sensitive adhesive layer
31, 36 Protective layer
32A, 32B, 32C, 35A, 35B, 35C, 37A, 37B, 37C, 38A, 38B,
38C Intermediate layer
36A Ultraviolet curable resin layer
36B UV cut layer
36C Pressure-sensitive adhesive layer
36D Base material
52C, 52M, 52Y Microcapsule
60 Test piece
60A, 60B Adherend
61 Tension member
62 Clamp apparatus
71 Test stand
72 Jig
73A, 73B Movable roll
100 Smartphone
200 Notebook personal computer
300 Decorative container
400 Booklet

The invention claimed is:

1. A laminate comprising:
a base material;
a first intermediate layer provided on the base material and having an accommodation part;
a recording medium provided in the accommodation part; and
an overlay layer provided on the first intermediate layer, wherein
the accommodation part is provided in a part of a plane of the first intermediate layer,
the accommodation part is a through hole penetrating in a thickness direction of the first intermediate layer or a recess recessed in a thickness direction of the first intermediate layer,
the recording medium includes a color development layer containing: a coloring compound having an electron donating property; a developer having an electron accepting property; and a matrix resin,
the base material, the first intermediate layer, and the overlay layer contain a resin material including a polycarbonate-based resin, and
the base material and the first intermediate layer are bonded to each other by fusion, and the first intermediate layer and the overlay layer are bonded to each other by fusion.

2. The laminate according to claim 1, wherein the resin material further includes a polyethylene terephthalate-based resin.

3. The laminate according to claim 1, wherein
the color development layer is configured to be capable of changing a colored state by laser light, and
a change in the colored state is an irreversible change.

4. The laminate according to claim 1, wherein the color development layer further contains a photothermal conversion material.

5. The laminate according to claim 1, wherein
the recording medium includes a plurality of the color development layers, and
the plurality of color development layers contains coloring compounds developing colors of different hues from one another.

6. The laminate according to claim 1, wherein
the recording medium includes a plurality of the color development layers and a plurality of second intermediate layers, and
each of the plurality of second intermediate layers is provided between the color development layers adjacent to each other.

7. The laminate according to claim 6, wherein at least one of the plurality of second intermediate layers includes an ultraviolet curable resin layer and a pressure-sensitive adhesive layer.

8. The laminate according to claim 6, wherein
at least one of the plurality of second intermediate layers includes a resin layer, an ultraviolet curable resin layer, and a pressure-sensitive adhesive layer,
the ultraviolet curable resin layer is provided between the resin layer and the pressure-sensitive adhesive layer, and
the resin layer contains a resin material of a same material as the matrix resin.

9. The laminate according to claim 6, wherein at least one of the plurality of second intermediate layers includes a first pressure-sensitive adhesive layer, an ultraviolet curable resin layer, and a second pressure-sensitive adhesive layer in order.

10. The laminate according to claim 6, wherein at least one of the plurality of second intermediate layers is a film subjected to easy an adhesion treatment.

11. The laminate according to claim 1, wherein
the recording medium includes a plurality of the color development layers, a plurality of second intermediate layers, and a protective layer,
the plurality of color development layers includes a first color development layer, a second color development layer, and a third color development layer,
the first color development layer, a first layer of the plurality of second intermediate layers, the second color development layer, a second layer of the plurality of second intermediate layers, the third color development layer, a third layer of the plurality of second intermediate layers, and the protective layer are laminated in this order, and
the first color development layer, the second color development layer, and the third color development layer contain coloring compounds developing colors of different hues from one another.

12. The laminate according to claim 1, wherein a proportion of the developer in a total amount of the developer and the matrix resin is 16 mass % or less.

13. A card comprising the laminate according to claim 1.

14. A housing comprising the laminate according to claim 1.

15. A laminate comprising:
a base material;
a first intermediate layer provided on the base material and having an accommodation part;
a recording medium provided in the accommodation part; and
an overlay layer provided on the first intermediate layer, wherein
the accommodation part is provided in a part of a plane of the first intermediate layer,
the accommodation part is a through hole penetrating in a thickness direction of the first intermediate layer or a recess recessed in a thickness direction of the first intermediate layer,
the recording medium includes a color development layer containing: a coloring compound having an electron donating property; a developer having an electron accepting property; and a matrix resin,
the base material, the first intermediate layer, and the overlay layer contain a resin material including a polycarbonate-based resin, and
the base material and the first intermediate layer are bonded to each other by a thermal adhesive, and the first intermediate layer and the overlay layer are bonded to each other by a thermal adhesive.

16. The laminate according to claim 15, wherein the thermal adhesive contains a thermosetting resin.

* * * * *